US012647910B2

(12) United States Patent
Simon et al.

(10) Patent No.:  US 12,647,910 B2
(45) Date of Patent:  Jun. 2, 2026

(54) ATSC 3.0 AND D2M BROADCAST CO-EXIST ALIGNED 5G O-RAN

(71) Applicant: Sinclair Broadcast Group, LLC, Hunt Valley, MD (US)

(72) Inventors: Michael J. Simon, Frederick, MD (US); Mark A. Aitken, Parkton, MD (US); Louis Herbert Libin, Woodmere, NY (US)

(73) Assignee: Sinclair Broadcast Group, LLC, Hunt Valley, MD (US)

( * ) Notice: Subject to any disclaimer, the term of this patent is extended or adjusted under 35 U.S.C. 154(b) by 602 days.

(21) Appl. No.: 18/164,364

(22) Filed: Feb. 3, 2023

(65) Prior Publication Data

US 2023/0337156 A1     Oct. 19, 2023

Related U.S. Application Data

(60) Provisional application No. 63/306,333, filed on Feb. 3, 2022.

(51) Int. Cl.
*H04W 56/00* (2009.01)
*H04W 72/30* (2023.01)

(52) U.S. Cl.
CPC ......... *H04W 56/001* (2013.01); *H04W 72/30* (2023.01)

(58) Field of Classification Search
CPC ..... H04W 56/001; H04W 72/30; H04W 4/06; H04N 21/2381; H04N 21/6131
See application file for complete search history.

(56) References Cited

U.S. PATENT DOCUMENTS

| | | | |
|---|---|---|---|
| 9,843,845 | B2 | 12/2017 | Aitken |
| 10,560,756 | B2 | 2/2020 | Aitken |
| 10,951,334 | B2 | 3/2021 | Simon |
| 2011/0214157 | A1 | 9/2011 | Korsunsky et al. |
| 2012/0240185 | A1 | 9/2012 | Kapoor et al. |
| 2014/0313908 | A1 | 10/2014 | da Silva et al. |
| 2016/0269873 | A1 | 9/2016 | Choi et al. |
| 2018/0295407 | A1 | 10/2018 | Michael et al. |
| 2019/0082491 | A1 | 3/2019 | Shelby et al. |
| 2019/0124397 | A1 | 4/2019 | Takahashi et al. |

(Continued)

OTHER PUBLICATIONS

3rd Generation Partnership Project; Technical Specification Group Radio Access Network; NG-RAN; Architecture description (Release 16), 3GPP TS 38.401 V16.4.0, Jan. 2021, 78 pages.

(Continued)

*Primary Examiner* — Eric Myers
(74) *Attorney, Agent, or Firm* — Sterne, Kessler, Goldstein & Fox P.L.L.C.

(57) ABSTRACT

Disclosed herein are method and apparatus for Advanced Television Systems Committee (ATSC) 3.0 and non-ATSC 3.0 broadcast Direct to Mobile (D2M) co-exist aligned open radio access network (O-RAN). One aspect of this disclosure operates by generating a broadcast frame conforming to a first communications protocol, where the broadcast frame conforming to the first communication protocol includes a slice start (SS) portion. The embodiment further generates a broadcast virtual frame container including the broadcast frame conforming to the first communication protocol and a broadcast frame conforming to a second communication protocol, where the broadcast virtual frame container further includes a virtual frame start (VFS) portion, and transmits the broadcast virtual frame container.

17 Claims, 63 Drawing Sheets

(56) References Cited

U.S. PATENT DOCUMENTS

| | | | |
|---|---|---|---|
| 2019/0141146 A1 | 5/2019 | Abdala et al. |
| 2019/0171187 A1 | 6/2019 | Cella et al. |
| 2019/0199460 A1 | 6/2019 | Simon et al. |
| 2019/0268777 A1 | 8/2019 | Simon |
| 2019/0356520 A1 | 11/2019 | Silverman et al. |
| 2020/0077425 A1 | 3/2020 | Silverman et al. |
| 2020/0178121 A1 | 6/2020 | Simon et al. |
| 2020/0288325 A1 | 9/2020 | Simon |
| 2020/0344332 A1 | 10/2020 | Hwang et al. |
| 2021/0168429 A1 | 6/2021 | Okada et al. |
| 2021/0250642 A1 | 8/2021 | Okada et al. |
| 2022/0038945 A1 | 2/2022 | Dalmiya et al. |
| 2022/0070042 A1 | 3/2022 | Simon |
| 2022/0264525 A1 | 8/2022 | Simon et al. |

OTHER PUBLICATIONS

3rd Generation Partnership Project; Technical Specification Group Services and System Aspects; System architecture for the 5G System (5GS); Stage 2 (Release 16), 3GPP TS 23.501 V16.7.0, Dec. 2020, 450 pages.

Aijaz, A., "Packet Duplication in Dual Connectivity Enabled 5G Wireless Networks: Overview and Challenges," IEEE Communications Standards Magazine, arXiv:1804.01058v2 [cs.NI], May 29, 2019, 9 pages.

Albanese, A. et al., "Enabling 5G Neutral Hosts: 5GCity Architecture and Business Model," 5GCity White Paper, Apr. 15, 2020, 16 pages.

ATSC Standard: A/321, System Discovery and Signaling, Doc. A/321:2016, Mar. 23, 2016, 28 pages.

ATSC Standard: Link-Layer Protocol (A/330), Doc. A/330:2019, May 3, 2019, 60 pages.

ATSC Standard: Physical Layer Protocol, Doc. A/322:2021, Jan. 20, 2021, 263 pages.

ATSC Standard: Scheduler / Studio to Transmitter Link, Doc. A/324:2018, Jan. 5, 2018, 83 pages.

Authorizing Permissive Use of the "Next Generation" Broadcast Standard, Federal Register Notice vol. 85, No. 138, Jul. 17, 2020, p. 43478 - 43492.

Common Public Radio Interface: eCPRI Interface Specification, eCPRI Specification V1.1, Jan. 10, 2018, 62 pages.

Federal Communication Commission, Report and Oder No. FCC 20-181, In the Matter of Promoting Broadcast Internet Innovation through ATSC 3.0, Dec. 10, 2020, 33 pages.

Federal Communication Commission, Report and Oder No. FCC 21-21, In the Matter of Rules Governing the Use of Distributed Transmission System Technologies, and Authorizing Permissive Use of the "Next Generation" Broadcast Standard, Jan. 19, 2021, 35 pages.

Garro Crevillén, E. et al., Layered Division Multiplexing With Multi-Radio-Frequency Channel Technologies. IEEE Transactions on Broadcasting. 62(2):365-374. doi:10.1109/TBC.2015.2492474, 2016, 10 pages.

Neutral Host Solutions for 5G Multi-Operator Deployments in Managed Spaces, Alliance for Telecommunications Industry Solutions, ATIS-I-0000073, Copyright 2019, 49 pages.

ONAP Home Page, printed Oct. 30, 2023 from https://www.onap.org, 2 pages.

O-RAN Home Page, printed Oct. 30, 2023 from https://www.o-ran.org, 6 pages.

O-RAN Software Community (SC), printed Oct. 30, 2023 from https://o-ran-sc.org, 4 pages.

The 5G Functional Split Overview Poster, printed Oct. 30, 2023 from https://solutions.cubeoptics.com/5g-functional-split, 2 pages.

International Search Report and Written Opinion, for PCT Appl. No. PCT/US2023/061969, 13 pages, mailed Jul. 4, 2023.

FIG 2

Note: (304 – 305) Layer 2 Split across STLTP (A/324)

Simplified View RU and Hybrid Physical Layer Split eCPRI
Time Multiplexing I/Q Symbols into Broadcast Slices Virtual Frame Broadcast Virtual Frame

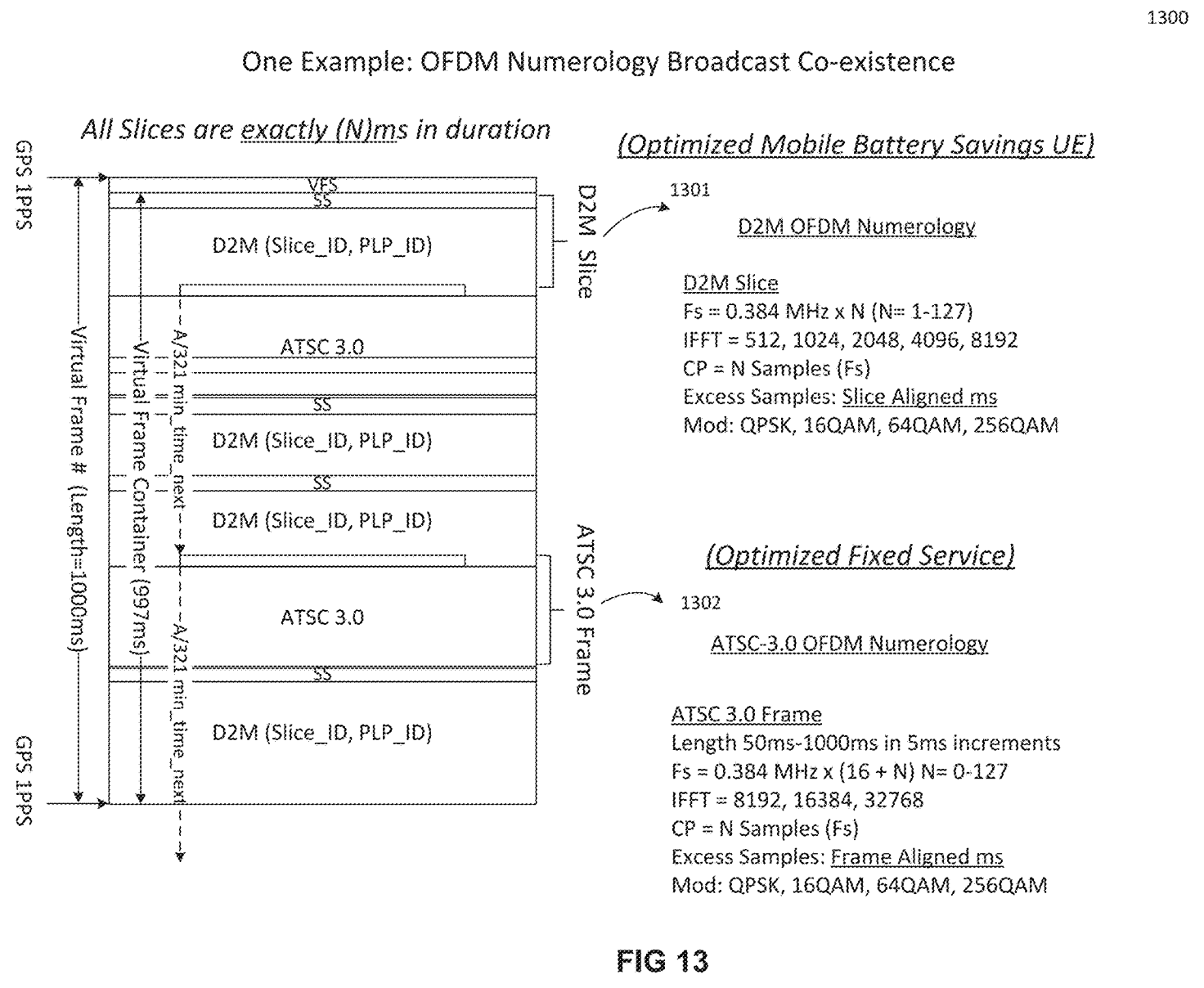

1300

One Example: OFDM Numerology Broadcast Co-existence

*All Slices are exactly (N)ms in duration*

*(Optimized Mobile Battery Savings UE)*

D2M OFDM Numerology

1301

D2M Slice
Fs = 0.384 MHz x N (N== 1-127)
IFFT = 512, 1024, 2048, 4096, 8192
CP = N Samples (Fs)
Excess Samples: Slice Aligned ms
Mod: QPSK, 16QAM, 64QAM, 256QAM

*(Optimized Fixed Service)*

ATSC-3.0 OFDM Numerology

1302

ATSC 3.0 Frame
Length 50ms-1000ms in 5ms increments
Fs = 0.384 MHz x (16 + N) N= 0-127
IFFT = 8192, 16384, 32768
CP = N Samples (Fs)
Excess Samples: Frame Aligned ms
Mod: QPSK, 16QAM, 64QAM, 256QAM

FIG 13

D2M Slice

ATSC 3.0 Frame

VFS
SS

D2M (Slice_ID, PLP_ID)

ATSC 3.0

SS

D2M (Slice_ID, PLP_ID)

SS

D2M (Slice_ID, PLP_ID)

ATSC 3.0

SS

D2M (Slice_ID, PLP_ID)

‹- - A/321 min_time_next - - -›‹- - - A/321 min_time_next - - -›

‹—————Virtual Frame Container (997ms)—————›

‹————————Virtual Frame # (Length=1000ms)————————›

GPS 1PPS                                          GPS 1PPS

One Example: D2M Spectrum Slice = Exactly (N)ms Length (N symbols) − 1.5ms

1402

1400

(Last Symbol in Slice)

1403

Postfix

CP

TU

CP

CP

CP

CP

L1-SS

CP 1.5ms

L1 SS- Slice Start 1401

Exact (N) milli-second Slice

1405

Fs = 0.384 MHz x N (N= 0-127)

FFT= (512, 1024, 2048, 4096, 8192)

CP= (N) x 1/Fs

TU = FFT x 1/Fs

Postfix = (N) x 1/Fs (ensure ms length)

1404

Fs /FFT = Δ Hz

1/Δ Hz = TU

*(N) Time Aligned Virtual Broadcast Spectrum Slice Rosters* 1500

ATSC 3.0 and D2M Spectrum <u>Dynamically Shared</u> (N) RF Carriers

Note: Sharing OFDM Resources Slices is Orchestrated from Cloud for (N) Broadcast Virtual Network Operators

1700

One example: L1 (Virtual Frame Start) 1st Symbol (CAB)
Mapping Frequency and Time Domains One Example: L1 (Virtual Frame Start) 2$^{nd}$ Symbol (BCA)
High Priority Signaling
Mapping Frequency and Time Domains

1900

| Syntax | No. of Bits |
|---|---|
| L1_Virtual_Frame_Start_Signaling () { | |
| RF_ID | 16 |
| Virtual_frame_num_seconds_since_PTP_epoch | 48 |
| Offset_PTP_UTC | 6 |
| UTC_timezone_offset | 7 |
| Daylight_savings_flag | 1 |
| Emergency_Alert_Active | 4 |
| Alert_Info, RF_ID, VF#, Slice_ID, Slice_Offset, PLP_ID, SID_ID | 98 |
| Num_Slices | 8 |
| for (j=0; j <num_slices; j ++ | |
| PLP_ID | 8 |
| Slice_Start_Offset_ms | 10 |
| SS_PN_Init_Slice_Profile | 16 |
| Num_SS_L1 Signal_Symbols_and Param | 8 |
| Slice_profile_OFDM_Num | 8 |
| Num_ATSC_3_0_Frames | 5 |
| for (j=0; j <num_ATSC; j ++ | |
| ATSC_Frame_Num | 5 |
| Num_ms_VFS_to_A_321_bootstrap_start | 10 |
| reserved | as needed |
| CRC | 32 |
| } | |

1903 → D2M UE Sync NTP

Emergency Alert Signaling 1904 →

1905 → Locate Start Slice_ID in VF

1906 → Locate Start ATSC 3.0

1902

L1 Signaling (Polar Code)
L1 Signaling (Polar Code)
A/321 (BCA)
A/321 (CAB)

VFS L1 RRC

1901

←——— 4.5 MHz ———→

Fs = .384 MHz x (16) = 6.144 MHz
IFFT = 2048
Sub-Carrier Spacing = 3000 Hz
QPSK, Polar Code
Bandwidth = 5.742 MHz
TU = 666.66µs
CP = 333.33µs
Symbol Length = 1000µs

1907 →

Note: When UE is Synchronized PTP/NTP has RRC signaling  UE can then go directly to Start Slice_ID# in VF without accessing L1 VFS (Quick Access)

FIG 19

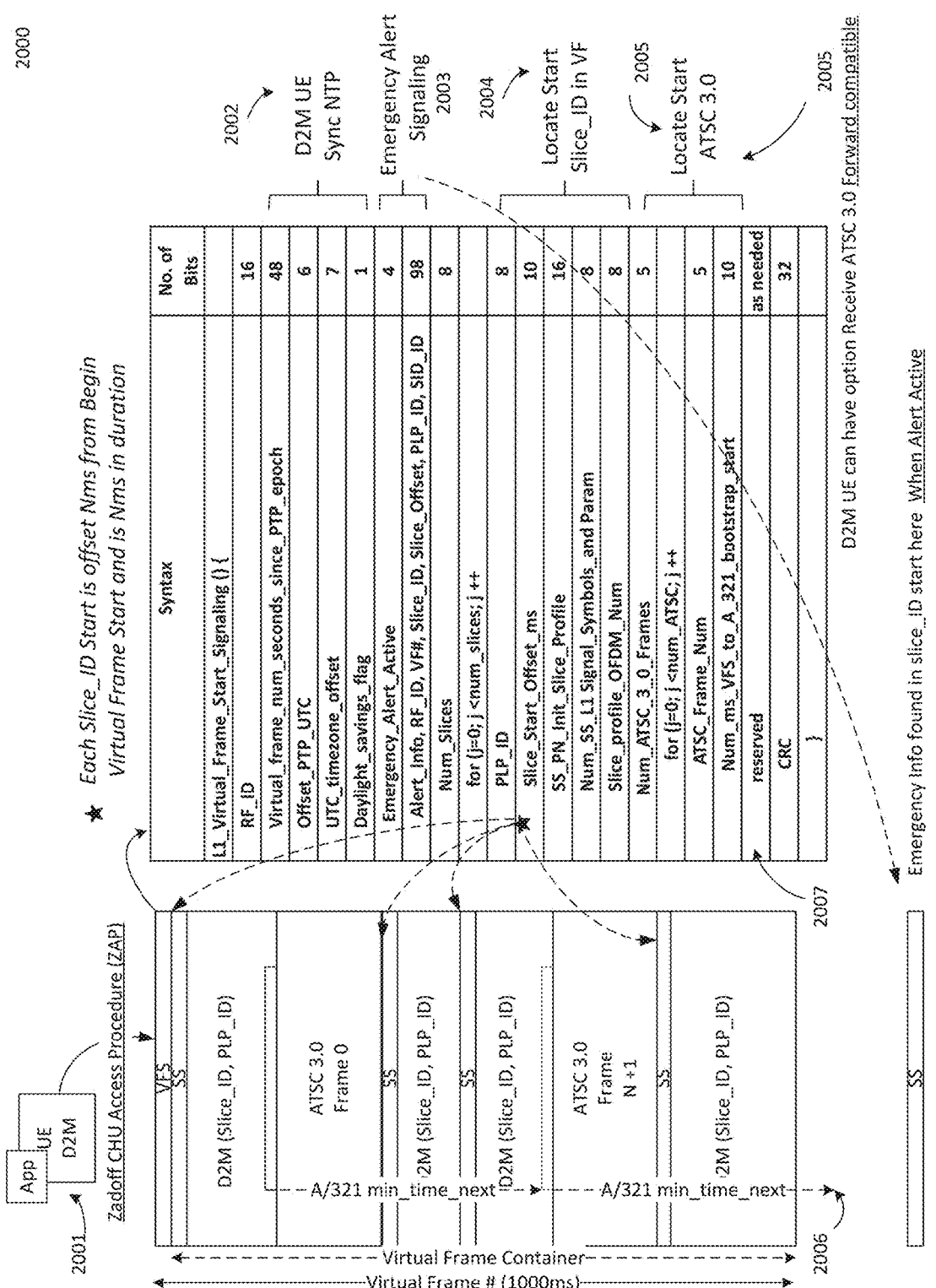

2000

★ Each Slice_ID Start is offset Nms from Begin Virtual Frame Start and is Nms in duration D2M UE Sync NTP　2002

Emergency Alert Signaling 2003

Locate Start Slice_ID in VF　2004

Locate Start ATSC 3.0　2005

2005

| Syntax | No. of Bits |
|---|---|
| L1_Virtual_Frame_Start_Signaling () { | |
| RF_ID | 16 |
| Virtual_frame_num_seconds_since_PTP_epoch | 48 |
| Offset_PTP_UTC | 6 |
| UTC_timezone_offset | 7 |
| Daylight_savings_flag | 1 |
| Emergency_Alert_Active | 4 |
| Alert_Info, RF_ID, VF#, Slice_ID, Slice_Offset, PLP_ID, SID_ID | 98 |
| Num_Slices | 8 |
| for (j=0; j <num_slices; j ++ | |
| PLP_ID | 8 |
| Slice_Start_Offset_ms | 10 |
| SS_PN_Init_Slice_Profile | 16 |
| Num_SS_L1_Signal_Symbols_and_Param | 8 |
| Slice_profile_OFDM_Num | 8 |
| Num_ATSC_3_0_Frames | 5 |
| for (j=0; j <num_ATSC; j ++ | |
| ATSC_Frame_Num | 5 |
| Num_ms_VFS_to_A_321_bootstrap_start | 10 |
| reserved | as needed |
| CRC | 32 |
| } | |

2007

D2M UE can have option Receive ATSC 3.0 Forward compatible

D2M UE start here  When Alert Active

Emergency info found in slice_ID start active

FIG 20

App UE D2M

Zadoff CHU Access Procedure (ZAP)

2001

VFS SS

D2M (Slice_ID, PLP_ID)

ATSC 3.0 Frame 0

SS

D2M (Slice_ID, PLP_ID)

SS

D2M (Slice_ID, PLP_ID)

ATSC 3.0 Frame N +1

SS

D2M (Slice_ID, PLP_ID)

SS

←--- A/321 min_time_next ---→ ←--- A/321 min_time_next ---→

2006

←------- Virtual Frame Container -------→

←------- Virtual Frame # (1000ms) -------→

2200
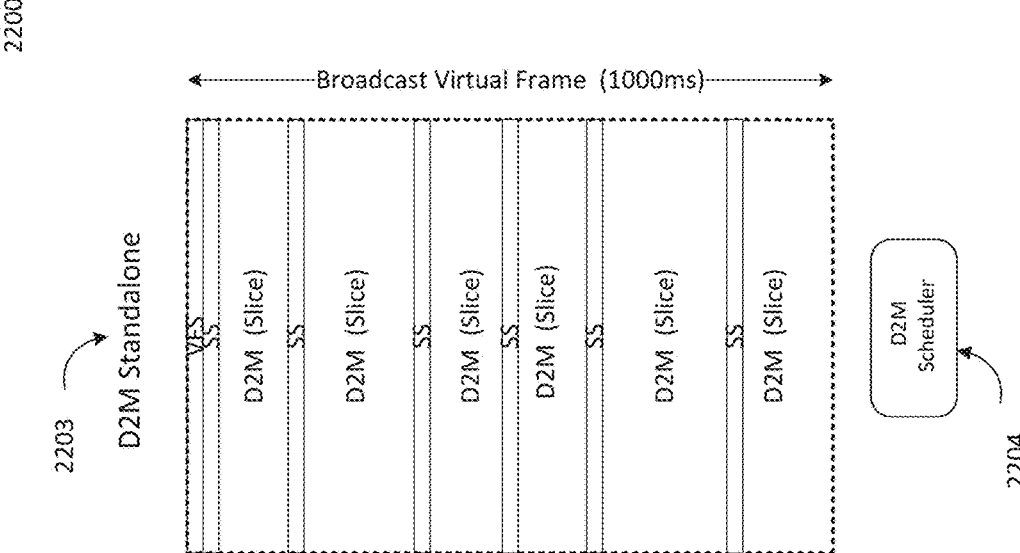
2203
D2M Standalone
2204
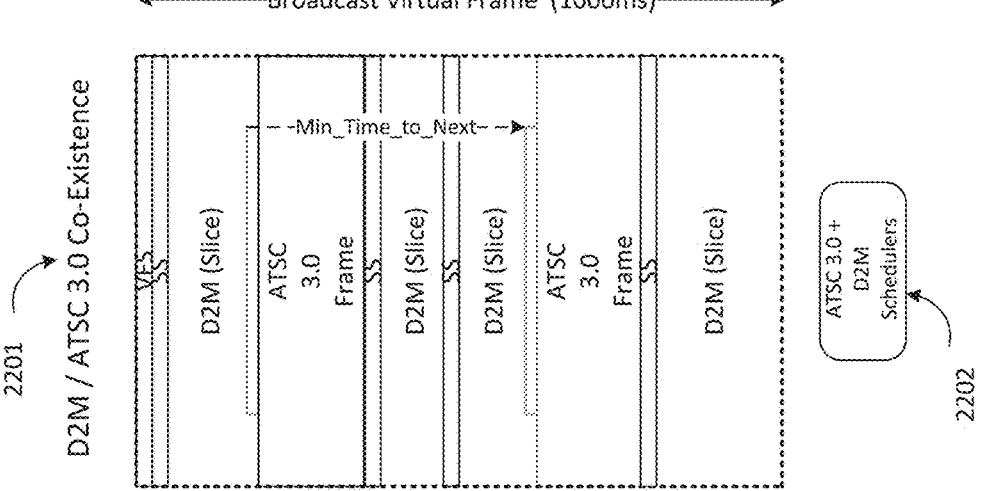
2201
D2M / ATSC 3.0 Co-Existence
2202
FIG 22

Figure 24:
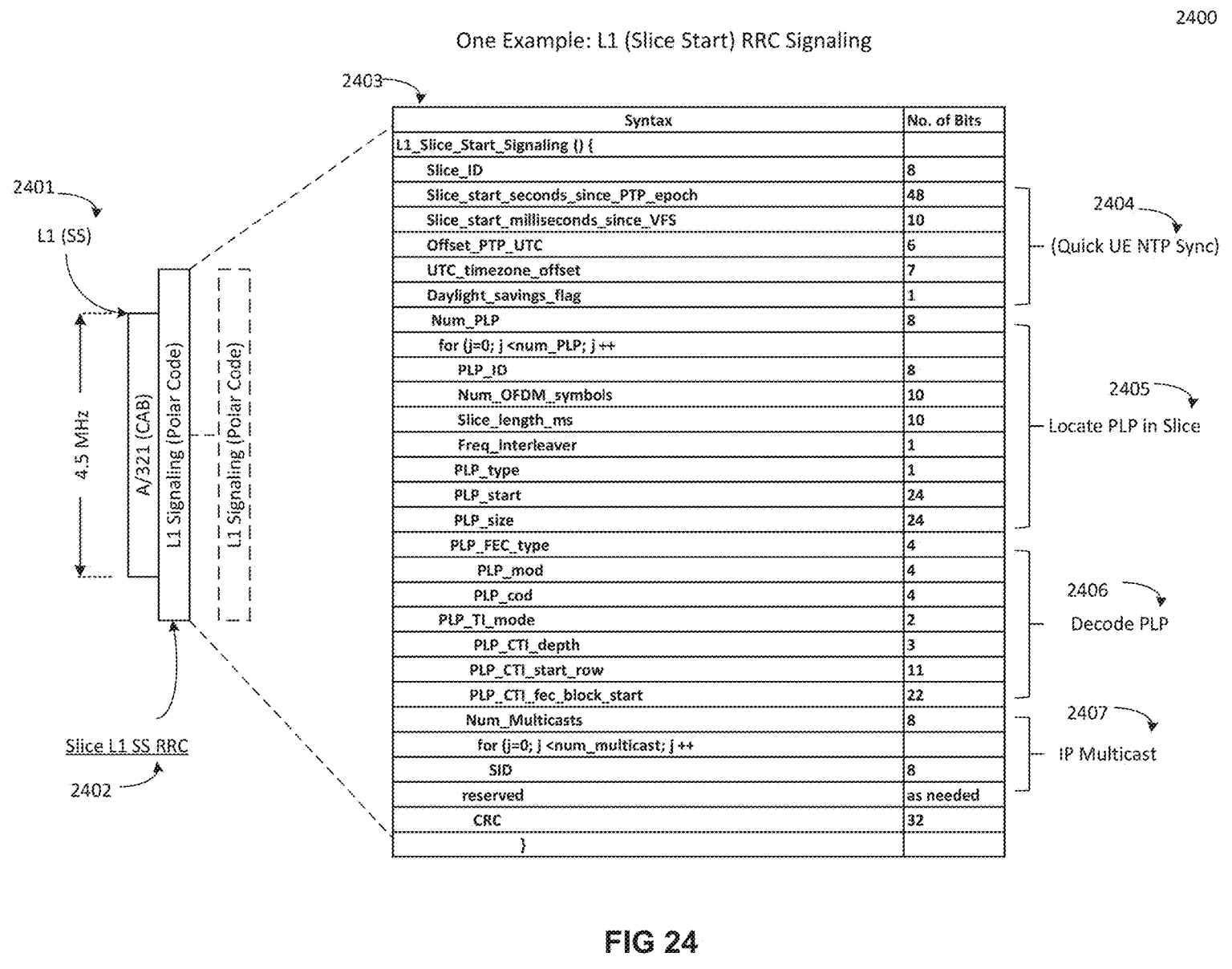

One Example: L1 (Slice Start) RRC Signaling

| Syntax | No. of Bits |
|---|---|
| L1_Slice_Start_Signaling () { | |
| Slice_ID | 8 |
| Slice_start_seconds_since_PTP_epoch | 48 |
| Slice_start_milliseconds_since_VFS | 10 |
| Offset_PTP_UTC | 6 |
| UTC_timezone_offset | 7 |
| Daylight_savings_flag | 1 |
| Num_PLP | 8 |
| for (j=0; j <num_PLP; j ++ | |
| PLP_ID | 8 |
| Num_OFDM_symbols | 10 |
| Slice_length_ms | 10 |
| Freq_Interleaver | 1 |
| PLP_type | 1 |
| PLP_start | 24 |
| PLP_size | 24 |
| PLP_FEC_type | 4 |
| PLP_mod | 4 |
| PLP_cod | 4 |
| PLP_TI_mode | 2 |
| PLP_CTI_depth | 3 |
| PLP_CTI_start_row | 11 |
| PLP_CTI_fec_block_start | 22 |
| Num_Multicasts | 8 |
| for (j=0; j <num_multicast; j ++ | |
| SID | 8 |
| reserved | as needed |
| CRC | 32 |
| } | |

2404 — (Quick UE NTP Sync)

2405 — Locate PLP in Slice

2406 — Decode PLP

2407 — IP Multicast

2400

2403

L1 Signaling (Polar Code)

L1 Signaling (Polar Code)

A/321 (CAB)

4.5 MHz

2401

L1 (SS)

Slice L1 SS RRC

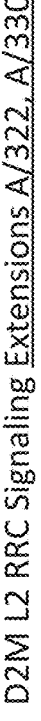

D2M L2 RRC Signaling Extensions A/322, A/330

★ A/330 (L2) New ALP Link Layer RRC Signaling Tables

New ALP Signaling Tables

| signaling_type | ALP Signaling Table |
|---|---|
| 0x00 | Mobile Link Mapping Table |
| 0x01 | File Table |
| 0x02 | File CH Bonding Table (Plain) |
| 0x03 | File CH Bonding Table (SNR Avg) |
| 0x04 | MFN Handover (File) |
| 0x05 | Media Table |
| 0x06 | Media CH Bonding Table (Plain) |
| 0x07 | Media CH Bonding Table (SNR Avg) |
| 0x08 | MFN Handover (Media) |
| 0x09 | NB Multi-Media _ioT |
| 0xFF | Reserved() |

| packet_type Value | ALP Packet Type |
|---|---|
| 000 | IPv4 packet |
| 001 | Reserved |
| 010 | Reserved |
| 011 | Reserved |
| 100 | Link layer signaling packet |
| 101 | Reserved |
| 110 | Reserved |
| 111 | Reserved |

Sub-Stream ID
(SID) ALP Ext Header IP Packets

2804

ALP Packet

ALP Packet

ALP Packet

ALP Packet

ALP Packet

2802

Baseband Packet

Header

Payload

256 New ALP Signaling tables Possible 10 shown

2803

| MODE (1b) | | |
| 0 | Pointer (LSB) (7b) | Pointer (MSB) (6b) |
| 1 | Pointer (LSB) (7b) | OFI (2b) |

Short Extension Mode

| EXT TYPE (3b) | EXT LEN (5b) | Extension (0-31 bytes) | Payload |

Up to 32 Bytes RRC Signaling

2801

★ A/322 (L2) Baseband Packet RRC Signaling (Extension)

Figure 31:
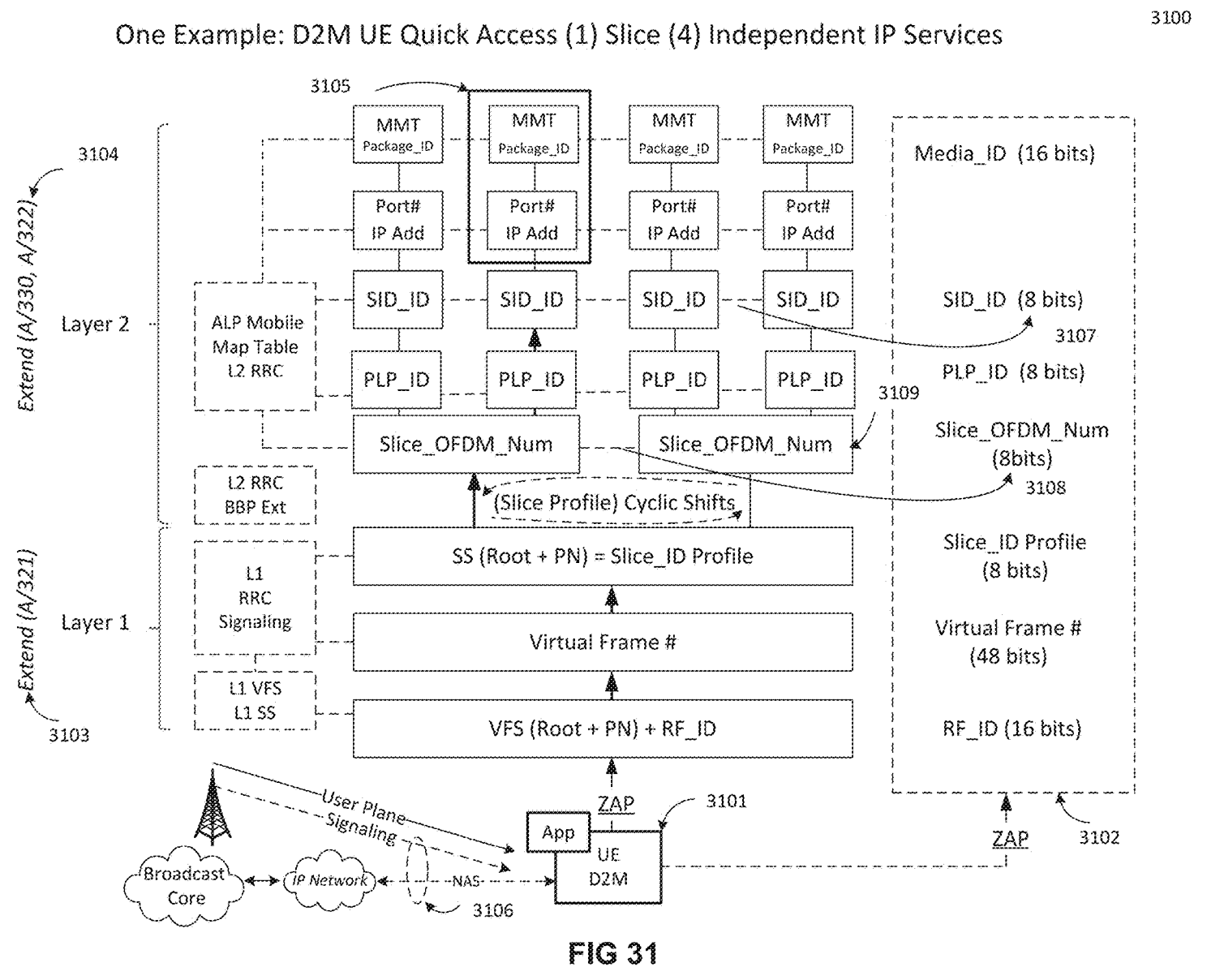

One Example: D2M UE Quick Access (1) Slice (4) Independent IP Services

| Media_ID (16 bits) | |
| SID_ID (8 bits) | 3107 |
| PLP_ID (8 bits) | |
| Slice_OFDM_Num (8bits) | 3108 |
| Slice_ID Profile (8 bits) | |
| Virtual Frame # (48 bits) | |
| RF_ID (16 bits) | |

3102

ZAP

3109

| MMT Package_ID | MMT Package_ID | MMT Package_ID | MMT Package_ID |
| Port# IP Add | Port# IP Add | Port# IP Add | Port# IP Add |
| SID_ID | SID_ID | SID_ID | SID_ID |
| PLP_ID | PLP_ID | PLP_ID | PLP_ID |

3105

Slice_OFDM_Num

Slice_OFDM_Num (Slice Profile) Cyclic Shifts (Slice Profile) Cyclic Shifts

SS (Root + PN) = Slice_ID Profile

Virtual Frame #

VFS (Root + PN) + RF_ID

3101

ZAP

UE D2M

App

3106

User Plane Signaling

NAS

IP Network

Broadcast Core

ALP Mobile Map Table L2 RRC

L2 RRC BBP Ext

L1 RRC Signaling

L1 VFS L1 SS

3104

Layer 2

Extend (A/330, A/322)

Layer 1

Extend (A/321)

One Example: Intelligent RAN Modes Aligned 5G O-RAN with (L2) A/322 Signaling Extension

FIG 38

Figure 41:
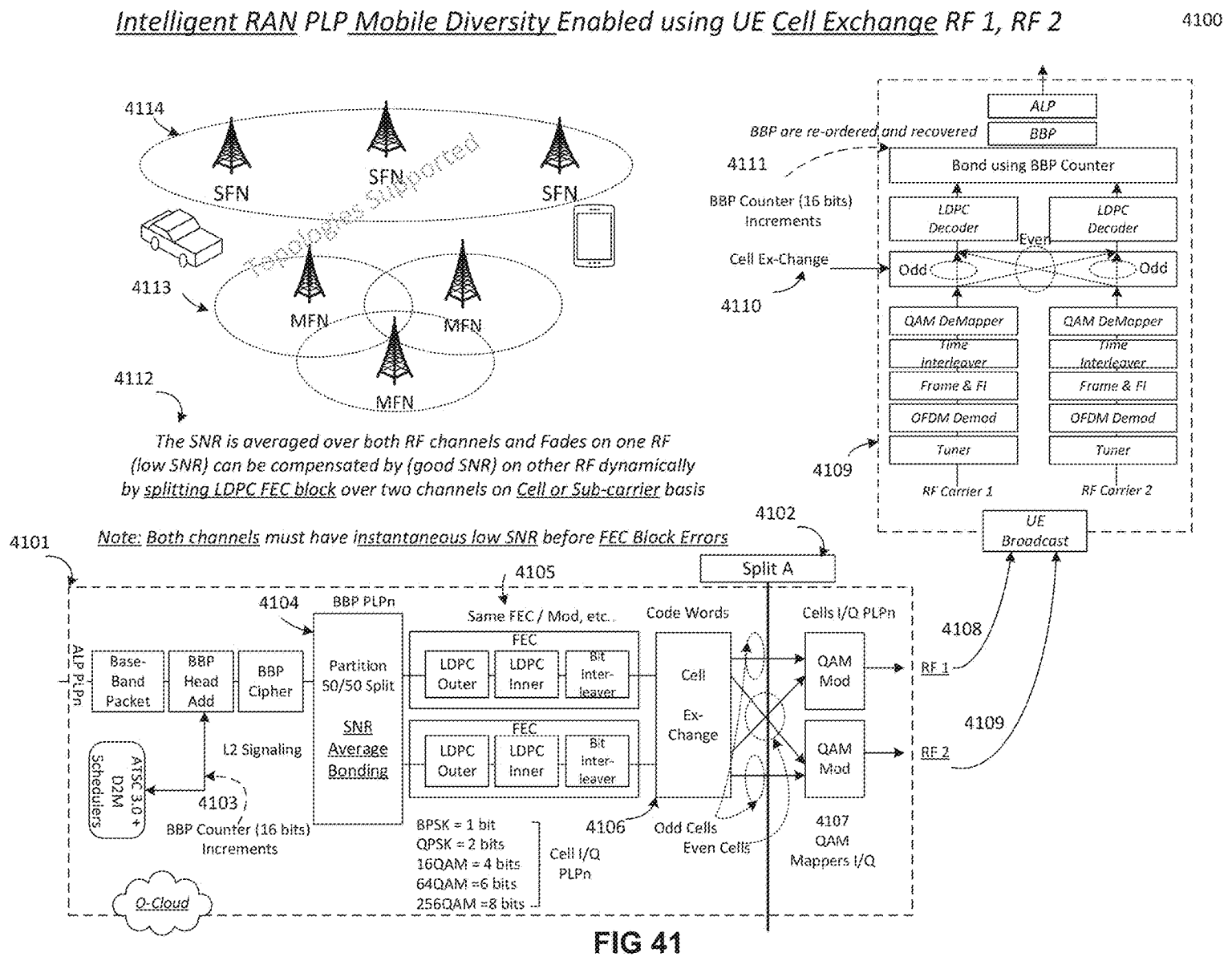

Intelligent RAN PLP Mobile Diversity Enabled using UE Cell Exchange RF 1, RF 2

The SNR is averaged over both RF channels and Fades on one RF (low SNR) can be compensated by (good SNR) on other RF dynamically by splitting LDPC FEC block over two channels on Cell or Sub-carrier basis Note: Both channels must have instantaneous low SNR before FEC Block Errors

Figure 43:
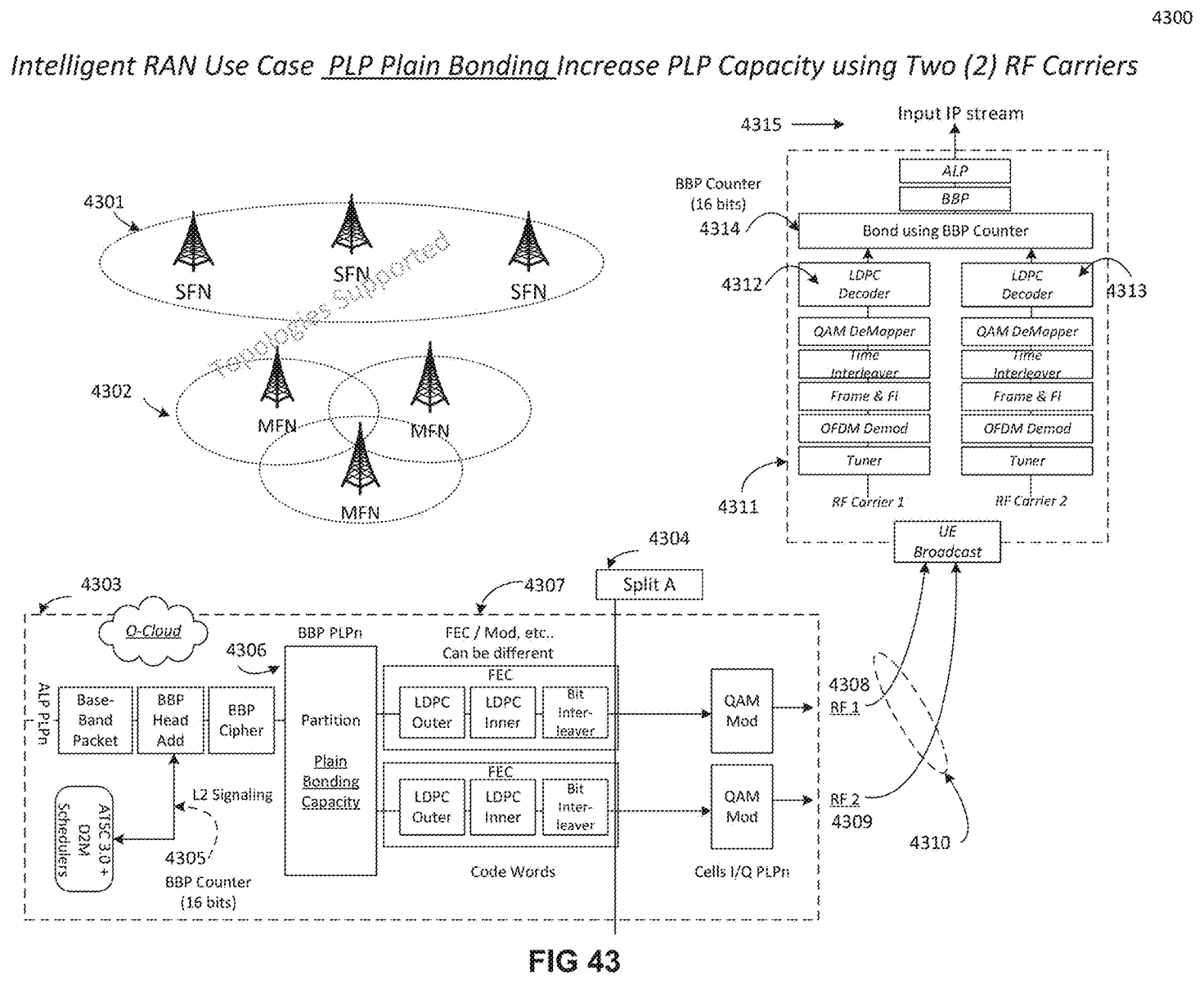

Intelligent RAN Use Case  PLP Plain Bonding Increase PLP Capacity using Two (2) RF Carriers Input IP stream

ALP
BBP

Bond using BBP Counter

4313

LDPC Decoder

QAM DeMapper
Time Interleaver
Frame & FI
OFDM Demod
Tuner

RF Carrier 2

LDPC Decoder

QAM DeMapper
Time Interleaver
Frame & FI
OFDM Demod
Tuner

RF Carrier 1

4315

BBP Counter (16 bits)

4314

4312

4311

UE Broadcast

4308
RF 1

RF 2
4309

4310

SFN

SFN

SFN

MFN

MFN

MFN

MFN

SFN

4301

4302

Cells I/Q PLPn

QAM Mod

QAM Mod

Split A

4304

FEC / Mod, etc.
Can be different

FEC

LDPC Outer
LDPC Inner
Bit Inter-leaver

FEC

LDPC Outer
LDPC Inner
Bit Inter-leaver

Code Words

4307

BBP PLPn

Partition

Plain Bonding Capacity

4306

Base-Band Packet

BBP Head Add

BBP Cipher

O-Cloud

L2 Signaling

4305
BBP Counter (16 bits)

ATSC 3.0 + D2M Schedulers

4303

ALP PLPn

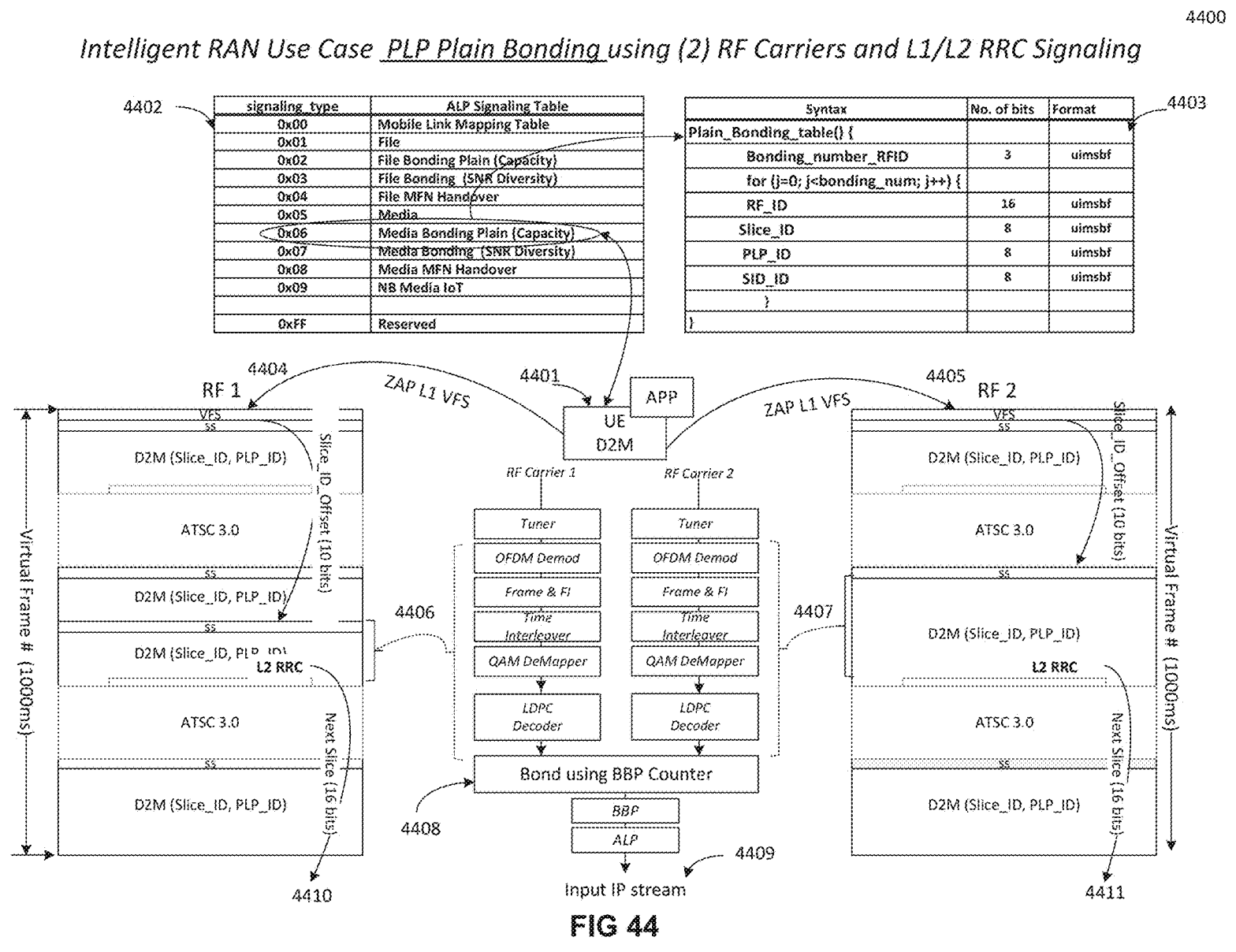

*Intelligent RAN Use Case  PLP Plain Bonding using (2) RF Carriers and L1/L2 RRC Signaling*

4403

| Syntax | No. of bits | Format |
|---|---|---|
| Plain_Bonding_table() { | | |
| Bonding_number_RFID | 3 | uimsbf |
| for (j=0; j<bonding_num; j++) { | | |
| RF_ID | 16 | uimsbf |
| Slice_ID | 8 | uimsbf |
| PLP_ID | 8 | uimsbf |
| SID_ID | 8 | uimsbf |
| } | | |
| } | | |

ALP Signaling Table

| signaling_type | Mobile Link Mapping Table |
|---|---|
| 0x00 | File |
| 0x01 | File Bonding Plain (Capacity) |
| 0x02 | File Bonding (SNR Diversity) |
| 0x03 | File MFN Handover |
| 0x04 | Media |
| 0x05 | Media Bonding Plain (Capacity) |
| 0x06 | Media Bonding (SNR Diversity) |
| 0x07 | Media MFN Handover |
| 0x08 | NB Media IoT |
| 0x09 | |
| 0xFF | Reserved |

4402

4404  ZAP L1 VFS

4405  ZAP L1 VFS

4401  UE  D2M  APP

RF 2

Virtual Frame #  (1000ms)

Slice_ID_Offset (10 bits)

Next Slice (16 bits)    4411

VFS  SS  D2M (Slice_ID, PLP_ID)  ATSC 3.0  SS  D2M (Slice_ID, PLP_ID)  L2 RRC  ATSC 3.0  SS  D2M (Slice_ID, PLP_ID)

4407

RF Carrier 2  Tuner  OFDM Demod  Frame & FI  Time Interleaver  QAM DeMapper  LDPC Decoder Bond using BBP Counter RF Carrier 1  Tuner  OFDM Demod  Frame & FI  Time Interleaver  QAM DeMapper  LDPC Decoder

4406

4408

BBP  ALP    4409

Input IP stream

RF 1

Slice_ID_Offset (10 bits)

Next Slice (16 bits)    4410

VFS  SS  D2M (Slice_ID, PLP_ID)  ATSC 3.0  SS  D2M (Slice_ID, PLP_ID)  SS  D2M (Slice_ID, PLP_ID)  L2 RRC  ATSC 3.0  SS  D2M (Slice_ID, PLP_ID)

Virtual Frame #  (1000ms)

FIG 44

One Example: Type B + C Split Intelligent RAN: Hybrid Use Case (2) PLP SNR Bond + Plain Bond + LDM (NOMA)

ATSC 3.0 AND D2M BROADCAST CO-EXIST ALIGNED 5G O-RAN

CROSS-REFERENCE TO RELATED APPLICATIONS

This application claims priority to U.S. Provisional Patent Application No. 63/306,333, filed Feb. 3, 2022, which is incorporated herein by reference in its entirety for all purposes.

This application is related to U.S. Pat. No. 9,843,845, issued Dec. 12, 2017; U.S. Pat. No. 10,560,756, issued Feb. 11, 2020; U.S. Pat. No. 10,951,334, issued Mar. 16, 2021; U.S. Patent Application Publication No. 2020/0288325, published Sep. 10, 2020; U.S. Patent Application Publication No. 2019/0268777, published Aug. 29, 2019; U.S. Patent Application Publication No. 2019/0199460, published Jun. 27, 2019; U.S. Patent Application Publication No. 2022/0070042, published Mar. 3, 2022; and U.S. Provisional Patent Application No. 63/072,477, filed Aug. 31, 2020, all of which are incorporated herein by reference in their entireties for all purposes.

BRIEF SUMMARY

In one aspect, a method is disclosed. The method includes generating a broadcast frame conforming to a first communications protocol, where the broadcast frame conforming to the first communication protocol includes a slice start (SS) portion. The method further includes generating a broadcast virtual frame container that includes the broadcast frame conforming to the first communication protocol and a broadcast frame conforming to a second communication protocol, wherein the broadcast virtual frame container further comprises a virtual frame start (VFS) portion, and transmitting the broadcast virtual frame container. The VFS portion includes a first portion of the VFS having information corresponding to user equipment (UE) synchronization, and a second portion of the VFS having information corresponding to UE radio resource control (RRC) signaling. Further, the second portion of the VFS further includes information corresponding to identifying the start of the broadcast frame conforming to the first communication protocol and the start of the broadcast frame conforming to the second communication protocol. The SS portion includes a first portion of SS including information corresponding to a slice identifier, and a second portion of SS including information corresponding to identifying and decoding a physical layer pipe (PLP) within the broadcast frame conforming to the second communication protocol. Further, the broadcast frame conforming to the second communication protocol includes a bootstrap portion having information corresponding to identifying the start of another broadcast frame conforming to the second communication protocol in the broadcast virtual frame container. In one aspect, the first communication protocol is Direct to Mobile (D2M), New Radio (NR), Long Term Evolution (LTE), Universal Mobile Telecommunications System (UMTS), or Global System for Mobile communications (GSM). In one aspect, the second communication protocol is Advanced Television Systems Committee (ATSC) 3.0 standard.

In one aspect, an apparatus is disclosed. The apparatus includes a processor configured to generate a broadcast frame conforming to a first communications protocol, where the broadcast frame conforming to the first communication protocol includes a SS portion. The processor is further configured to generate a broadcast virtual frame container that includes the broadcast frame conforming to the first communication protocol and a broadcast frame conforming to a second communication protocol, where the broadcast virtual frame container further comprises a VFS portion, and transmit the broadcast virtual frame container.

In one aspect, another method is disclosed. The method includes receiving a broadcast virtual frame container including a broadcast frame conforming to a first communication protocol and a broadcast frame conforming to a second communication protocol. The method further includes parsing a VFS portion of the broadcast virtual frame container and parsing a SS portion of the broadcast frame conforming to the first communication protocol. The parsing the VFS portion includes parsing a first portion of the VFS to identify information corresponding to UE synchronization, and parsing a second portion of the VFS to identify information corresponding to UE RRC signaling. The parsing the SS portion includes parsing a first portion of SS to identify information corresponding to a slice identifier, and parsing a second portion of SS to identify information corresponding to identifying and decoding a PLP within the broadcast frame conforming to the second communication protocol

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. Elements shown as a single component can be replaced with multiple components, and elements shown as multiple components can be replaced with a single component. The drawings are not to scale, and the proportion of certain elements can be exaggerated for illustration.

FIG. 2 illustrates the ATSC 3.0 A/324 protocol Studio to Transmitter Link Transport Protocol (STLTP) for implementing the broadcast physical layer with no awareness of cloud (Software Defined Networking (SDN)/Network Function Virtualization (NFV)) or 5G Open Radio Access Network (O-RAN) principles, according to some aspects of this disclosure.

FIG. 13 illustrates virtual frame and one example of ATSC 3.0 and D2M virtual broadcast slices inside virtual frame container and the Orthogonal Frequency Division Multiplexing (OFDM) numerology, according to some aspects of this disclosure.

FIG. 19 illustrates one example VFS L1 RRC signaling for a paradigm of D2M access of broadcast services, according to some aspects of this disclosure.

FIG. 20 illustrates virtual frame and virtual frame container with ATSC 3.0 and D2M slices and VFS L1 RRC signaling as part of the initial access procedure, according to some aspects of this disclosure.

FIG. 22 illustrates two methods that D2M can be implemented co-existing with ATSC 3.0 in same spectrum or standalone in spectrum, according to some aspects of this disclosure.

FIG. 24 illustrates one example L1 SS symbol and radio resource control (RRC) signaling syntax to quickly locate and receive services inside D2M broadcast slice, according to some aspects of this disclosure.

FIG. 28 illustrates D2M L2 RRC signaling achieved by extensions of A/330 and A/322 standards, according to some aspects of this disclosure.

FIG. 31 illustrates one example of D2M and virtual frame with one broadcast slice with four independent IP services and receiving one service quickly using L1 and L2 RRC signaling achieved by extending A/321, A/322, A/330 standards, according to some aspects of this disclosure.

FIG. 38 illustrates one example intelligent broadcast RAN modes aligned 5G O-RAN principles and using L2 RRC signaling extension A/322 standard, according to some aspects of this disclosure.

FIG. 41 illustrates intelligent broadcast RAN mobile diversity using two RF carriers and PLP Signal-to-Noise Ratio (SNR) averaging bonding processed in cloud eCPRI split for MFN or Single Frequency Network (SFN) topology, according to some aspects of this disclosure.

FIG. 43 illustrates Broadcast Intelligent RAN and PLP Plain bonding in cloud using (N) RF carriers to increase service capacity, according to some aspects of this disclosure.

FIG. 44 illustrates Broadcast Intelligent RAN and PLP Plain bonding in cloud using L1 and L2 RRC signaling for virtual frame and (N) RF carriers to increase service capacity, according to some aspects of this disclosure.

FIG. 49 illustrates one example of the receivers UE for hybrid use case (2) PLP+SNR bonding+plain bonding using LDM (NOMA) on (2) RF carriers, according to some aspects of this disclosure.

FIG. 56 illustrates D2M (QoS) Broadcast seamless handover 5G MBS to D2M converged UE using synchronization at MMT application layer, PDCP packet layer and physical layer frames, according to some aspects of this disclosure.

DETAILED DESCRIPTION

This disclosure is directed to enable Advanced Television Systems Committee (ATSC) 3.0 radio frequency (RF) frames co-existence with Direct to Mobile (D2M) broadcast RF frames optimized for mobile using ATSC 3.0 as baseline and dynamically sharing the same broadcast spectrum. In some aspects, a D2M frame is a non-ATSC 3.0 frame.

This proposal is made both backward and forward compatible by using A/321, A/322, A/322 standards extended for D2M mobile service. Mobile L1 and L2 signaling are enabled and introduced for using virtual frame reception paradigm for mobile. No changes are proposed to standards for ATSC 3.0 and the current ATSC 3.0 receivers will not be impacted. Being agnostic to both the virtual frame and L1 and L2 signaling used to enable D2M broadcast optimized for mobile battery powered receiver devices or user equipment UE.

ATSC 3.0 is optimized mostly for fixed television 4K Ultra High Definition Television (UHDTV). It currently lacks both needed broadcast waveform (e.g., D2M) and L1, L2 signaling to support mobile and battery savings on broadcast (e.g., UE) devices for use cases and this gap is addressed.

The D2M mobile discussed is mostly based on ATSC 3.0 as baseline. An ATSC 3.0 Advanced receiver (e.g., an ATSC 3.0 receiver that supports D2M based extensions to A/321, A/322, A/330 standards) can receive both ATSC 3.0 and D2M mobile services that co-exist in the same spectrum forward compatible.

A broadcast intelligent Radio Access Network (RAN) aligned with 5G Open Radio Access Network (O-RAN) principles and intelligent broadcast core network is proposed.

This broadcast architecture is aligned with concept of the Open Radio Access Network (O-RAN) ALLIANCE (o-ra-n.org). The O-RAN architecture uses cloud native computing to make wireless networks open and smarter than any previous wireless networks.

Therefore, the spirit of disclosure is broadcast virtual network operators (BVNO) sharing spectrum and infrastructure under automation with broadcast core network for use cases including mobile aligned 5G O-RAN principles.

Figure 1:
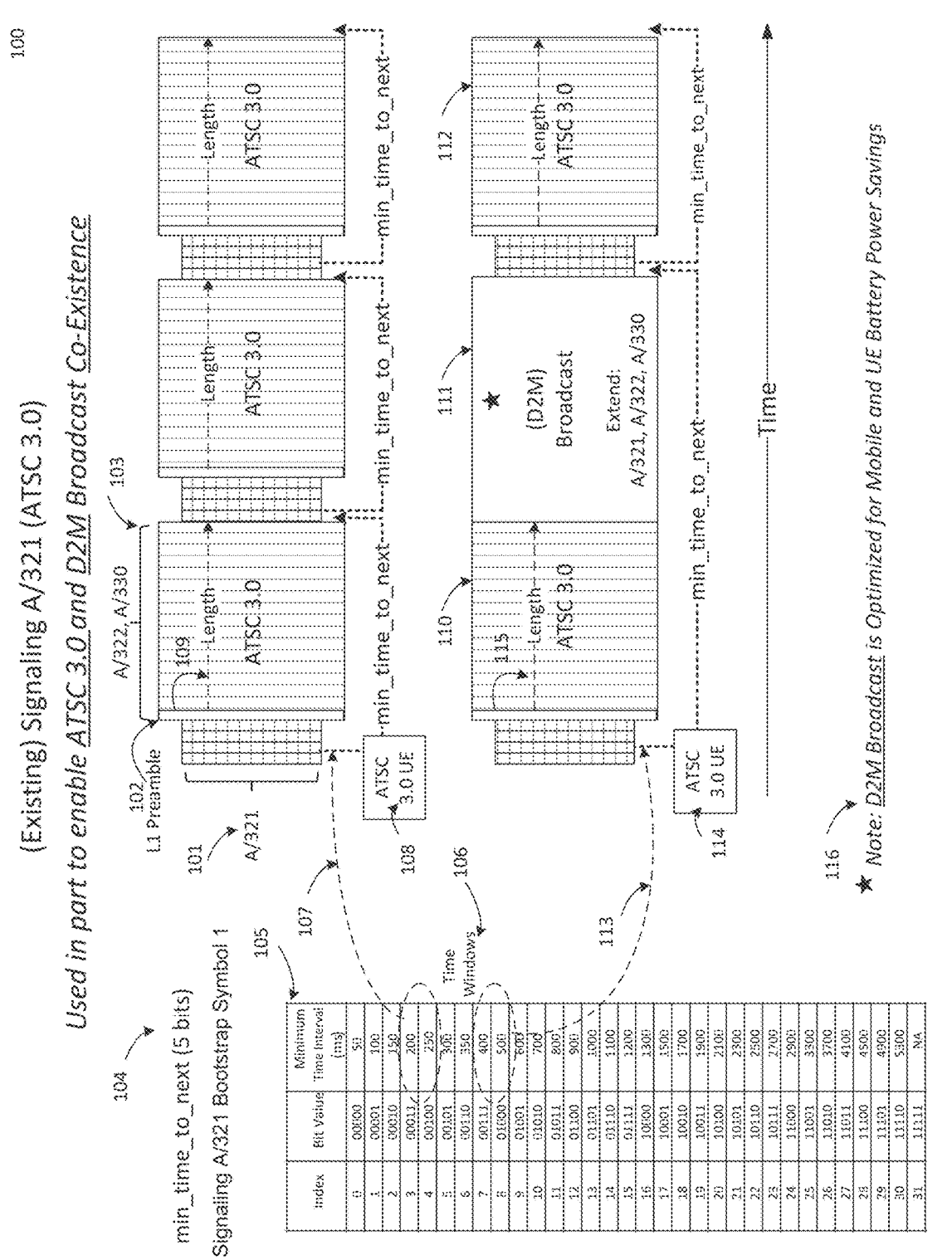
FIG. 1 illustrates the extensible A/321 signaling that is used in part to enable Advanced Television Systems Committee 3.0 (ATSC 3.0) and Direct to Mobile (D2M) broadcast co-existence in the same spectrum, according to some aspects of this disclosure.

FIG. 1 illustrates exemplary ATSC 3.0 broadcast frames which begin with A/321 symbols 101 (e.g., 4 symbols) for synchronization and L1 signaling, according to some aspects of this disclosure. The A/321 signaling, as will be discussed, can be used to time division multiplex ATSC 3.0 frames and D2M broadcast frames together in a backward compatible manner. According to some aspects, this A/321 signaling is one component used to enable ATSC 3.0 and D2M broadcast co-existence and dynamic spectrum sharing.

In some aspects, the D2M broadcast frames are optimized for mobile use cases and UE battery savings and the design disclosed extends A/321, A/322, and A/330 standards. Introducing L1 and L2 D2M signaling needed to support mobile and UE battery savings and intelligent broadcast RAN modes aligned 5G O-RAN principles. The D2M broadcast can be designed to stand alone and have no dependence on ATSC 3.0 broadcast. This can be forward compatible with receivers capable of receiving both ATSC 3.0 and D2M broadcast services. The existing ATSC 3.0 receivers already in market may continue working and may not be impacted. Because no changes in ATSC 3.0 standard is proposed, and legacy ATSC 3.0 receivers are agnostic to existence of D2M broadcast.

In some aspects, a broadcast virtual network operator determines the ratio of ATSC 3.0 and D2M broadcast services using their licensed spectrum being pooled and shared as will be discussed. It should be appreciated in United States the FCC adopted A/321 and A/322 standards into its rules but the FCC does not mandate its use for television service. In U.S., ATSC 3.0 is market driven, not mandated, and FCC encourages broadcasters to innovate while sharing spectrum.

The ATSC 3.0 broadcast frame is composed of A/321 101 and Preamble 102 both L1 signaling and a payload section of frame A/322 and A/330 103 for the L1 and L2 layers. The signaling for the time division multiplexing of ATSC 3.0 frames is discussed first as specified in the standard.

According to some aspects, the A/321 101 first symbol is used by receiver or UE for synchronization and for identification of frame type as ATSC 3.0. The second symbol of A/321 101 has signaling 5 bits (indicated as 104) and informs UE when the next frame of type ATSC 3.0 may occur in time from the start of current A/321. Exemplary signaling syntax is shown in table 105 and is termed min_time_to_next given in milliseconds and is shown in right column of table 105. The minimum time in this example is 200 ms and together with next higher value in column 250 ms forms a time window 106 for occurrence 107 of next frame of type ATSC 3.0 from beginning of current A/321 101 and is signaled to UE 108.

According to some aspects, the UE 108 then receives L1 preamble 102 signaling, and along with other data, the length 109 of current frame becomes known to UE 108. Therefore, given the time window for next occurrence of ATSC 3.0 frame and length 109 of current ATSC 3.0 frame the UE 108 knows when next ATSC 3.0 frame type will occur.

This signaling of time windows 106 for occurrence of next ATSC 3.0 frame type will now be used to introduce second example of a D2M frame type inserted between two ATSC 3.0 frames, in some aspects.

The second example to be discussed shows ATSC 3.0 frame 110 and D2M frame type 111 and ATSC 3.0 frame type 112 time division multiplexed. Given, the previous discussion, a time window 113 for the occurrence of next ATSC 3.0 frame type is used in this second example.

According to some aspects, the A/321 first symbol is used by receiver or UE for synchronization and for identification of frame type 110 as ATSC 3.0. The second symbol of A/321 has signaling 5 bits and informs UE when the next frame of type ATSC 3.0 will occur in time from the start of current A/321 101. The minimum time in this second example is 400 ms and with next higher value in column 500 ms forms a 113 time window for occurrence of next frame 112 of type ATSC 3.0 from beginning of current A/321 101 in frame 110 and this is signaled to UE 114.

According to some aspects, the preamble L1 signaling 115 informs UE 114 of length of current ATSC 3.0 frame 110. Therefore, given 113 and 115, the UE 114 knows when to expect next ATSC 3.0 frame type in time. Assuming current ATSC 3.0 frame 110 is 250 ms in duration and given 113 the UE 114 should expect the next ATSC 3.0 frame type to occur in a window 150 ms-250 ms after the end of current ATSC 3.0 frame 110 as provided in this A/321 signaling.

In second example, this opens up a time slot of 250 ms for insertion of a D2M frame type without disrupting normal ATSC 3.0 receivers as existing A/321 signaling was designed to anticipate such evolution. The remainder of this disclosure discloses the details for enabling D2M frame type insertion and a paradigm for D2M reception that are backward and can be forward compatible to ATSC 3.0. It should be appreciated that the D2M broadcast 116 is designed using A/321, A/322, A/330, and layers 1 and 2 as a baseline and adding extensions for D2M broadcast only when needed. The D2M broadcast is optimized for mobile battery savings and is envisioned to co-exist in same spectrum with ATSC 3.0 in an intelligent broadcast RAN.

Figure 2:
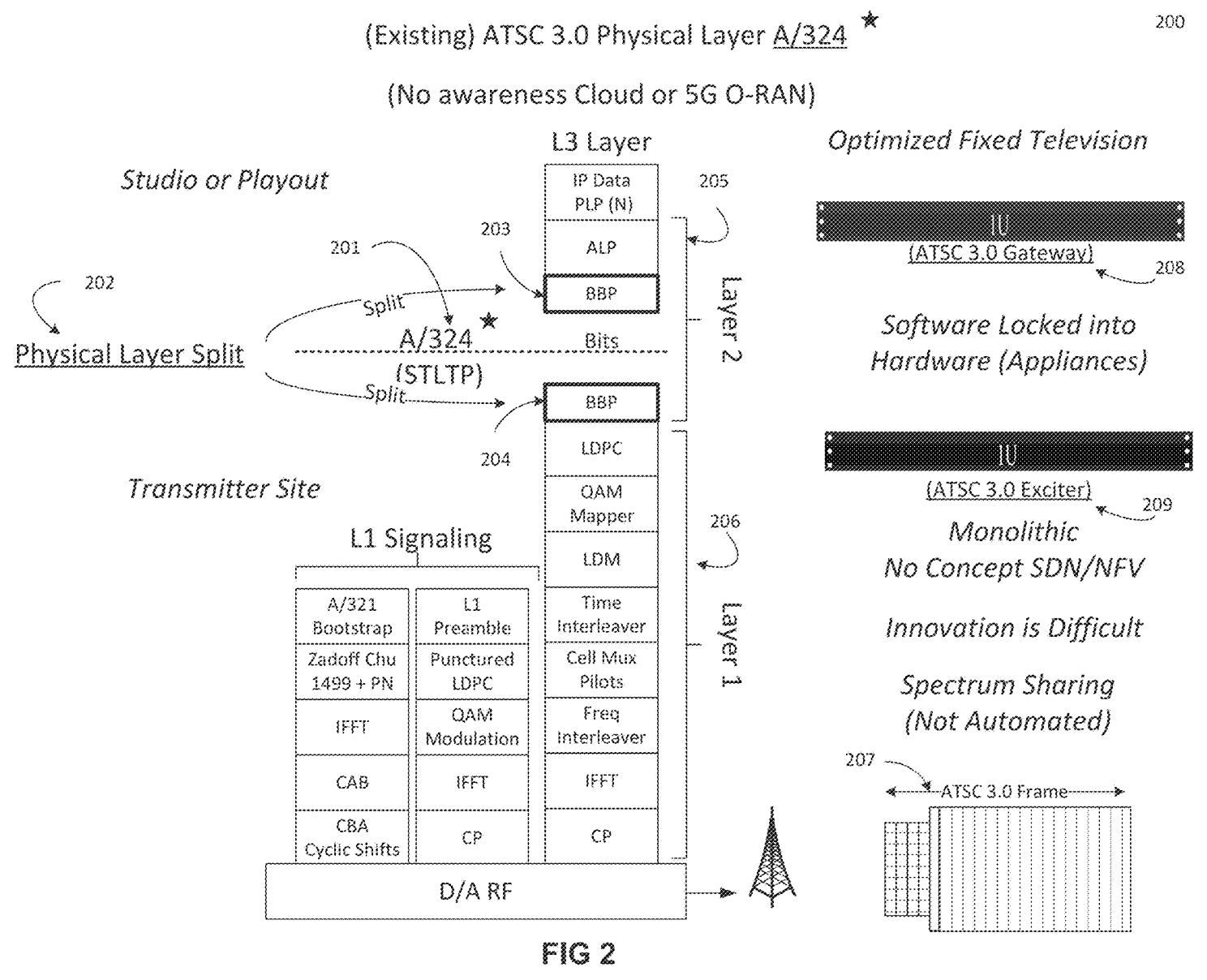

FIG. 2 illustrates system 200 including ATSC 3.0 implementation specified in the A/324 standard, according to some aspects of this disclosure. It should be appreciated the ATSC 3.0 call for proposal was issued in 2013 and A/324 was designed without requirements of the cloud, spectrum sharing and the emergence of 5G O-RAN a popular wireless.

According to some aspects, the A/324 STLTP protocol 201 defines physical layer split 202 in to splits 203, 204 of layer 2 205 into the ATSC 3.0 Gateway 208 located at studio or playout location that schedules ATSC 3.0 frames 207. The other portion 205, and layer 1 206 processing is located in ATSC 3.0 Exciter 209 at transmitter site and also creates the RF signal.

Figure 3:
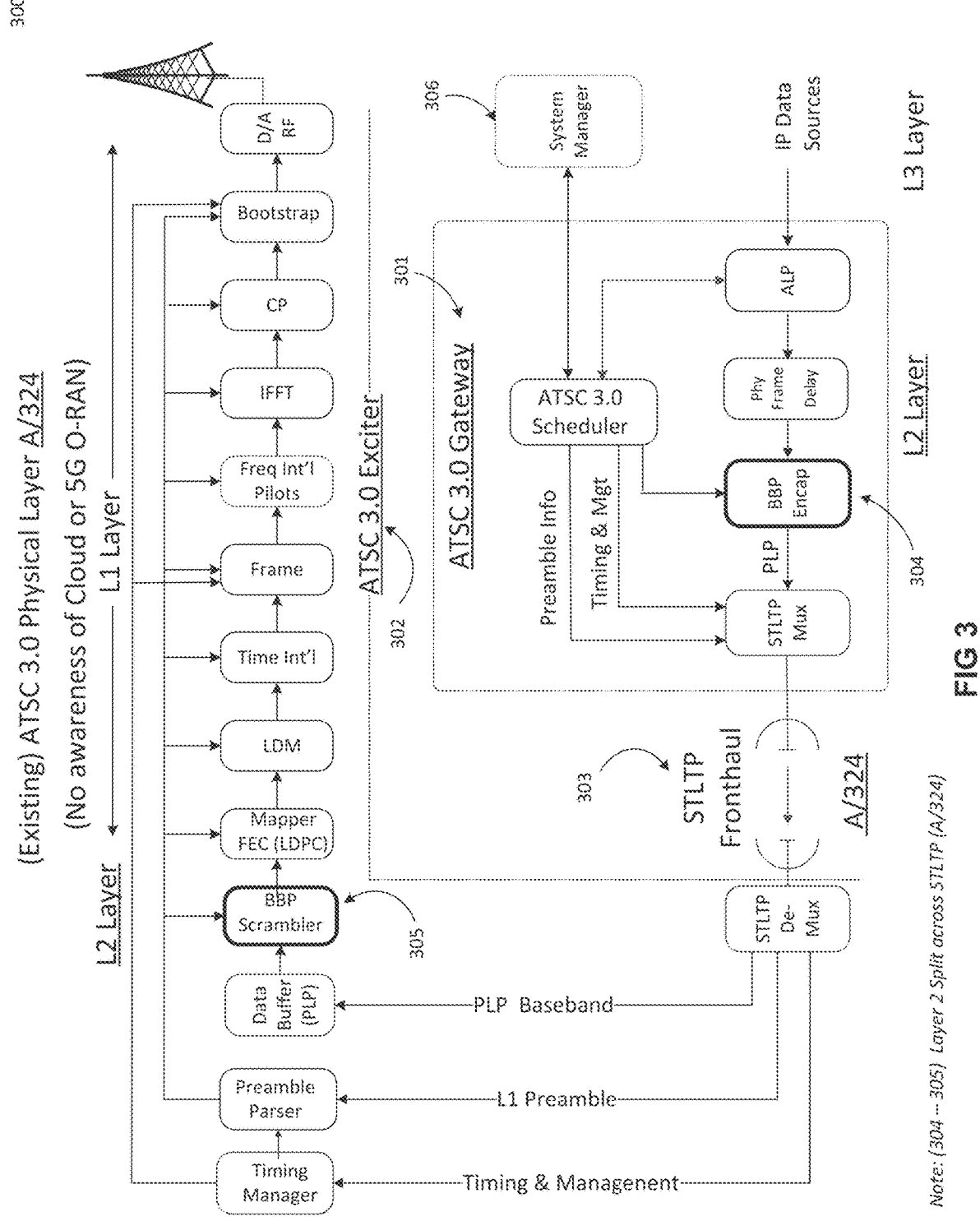
FIG. 3 illustrates block diagram using A/324 with the ATSC 3.0 Gateway and ATSC 3.0 Exciter connected by A/324 STLTP fronthaul, according to some aspects of this disclosure.

FIG. 3 illustrates system 300 including a block diagram of A/324 with ATSC 3.0 Gateway 301 controlled by system manager 306 that is manually operated through interface and in could evolve towards automation, according to some aspects of this disclosure. According to some aspects, the layer 2 split 304 is shown as is Studio to Transmitter Link Protocol (STLTP) 303 of A/324 as a link to 302 ATSC 3.0 Exciter and remaining 305 Layer 2 and layer 1 and creation of the RF signal.

According to some aspects, the A/324 and STLTP can be replaced with another protocol namely the enhanced Common Public Radio Interface (eCPRI), as will be discussed, and still produce and transmit complaint ATSC 3.0 signals. This enables opening opportunity for innovation and co-existence ATSC 3.0 and D2M broadcast and dynamically sharing broadcast spectrum in an intelligent broadcast RAN aligned 5G O-RAN principles.

Figure 4:
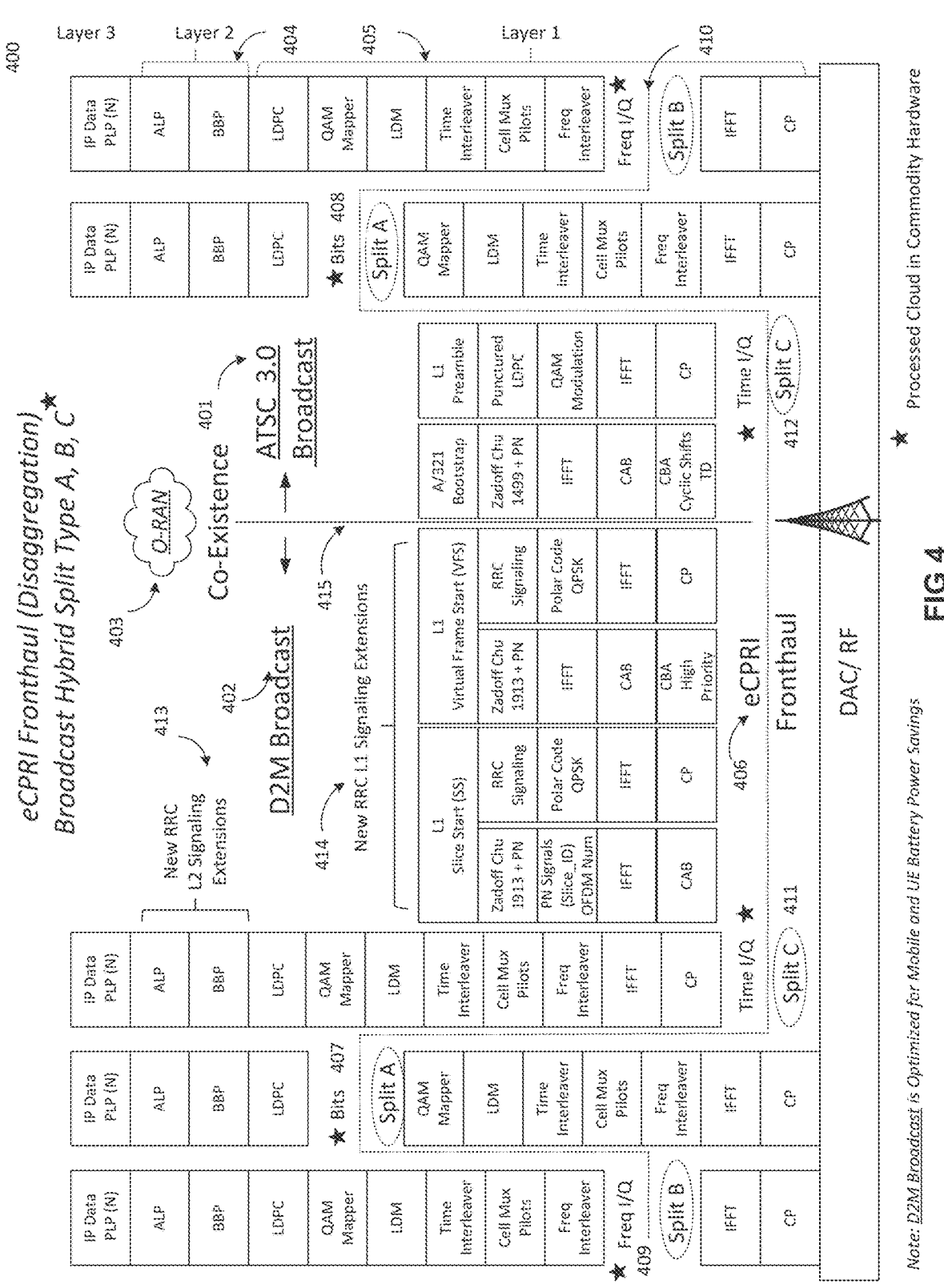
FIG. 4 illustrates an enhanced Common Public Radio Interface (eCPRI) protocol for implementing the disaggregation of broadcast physical layer with ATSC 3.0 and D2M broadcast co-existence processed in cloud and using type A, B, C hybrid splits over enhanced Common Public Radio Interface (eCPRI) fronthaul to broadcast transmitter site, according to some aspects of this disclosure.

FIG. 4 illustrates system 400 including eCPRI protocol used to replace A/324 and the broadcast physical layer is disaggregated with hybrid split types A, B, C used for ATSC 3.0 broadcast 401 to right of 415 and D2M broadcast 402 to left of 415 for co-existence aligned with cloud principles 403 O-RAN, according to some aspects of this disclosure.

According to some aspects, the broadcast layer 2 (404) and portions broadcast layer 1 (405) can be processed in the cloud and sent using eCPRI 406 as fronthaul link to transmitter site where remainder of broadcast L1 layer and RF signal is processed.

According to some aspects, the eCPRI split type A is shown with all blocks up to D2M 407 and ATSC 3.0 408 processed in the cloud. The eCPRI split type B is shown with all blocks up to D2M 409 and ATSC 3.0 410 processed in the cloud. The eCPRI split type C is shown with all blocks up to D2M 411 and ATSC 3.0 412 processed in the cloud.

According to some aspects, the L2 radio resource control (RRC) signaling D2M is created by extending A/322, A/330 standard for signaling mobile and UE battery savings and to enable a reception paradigm D2M which is to be discussed.

The L1 radio resource control (RRC) signaling 414 D2M can be created by extending A/321 for signaling mobile and UE battery savings and to enable a reception paradigm D2M which is to be discussed.

According to some aspects, using eCPRI and split types shown to the right of 415 produces complaint ATSC 3.0 signals. The eCPRI architecture and intelligence (to be discussed) enables innovation for the broadcast virtual network operator (BVNO). The ATSC 3.0 broadcast 401 and D2M broadcast 402 co-existence allows BVNO to choose how its licensed broadcast spectrum resources are used either 100% ATSC 3.0 or mixed dynamically as function of time with D2M would be possible driven by market forces.

Figure 5:
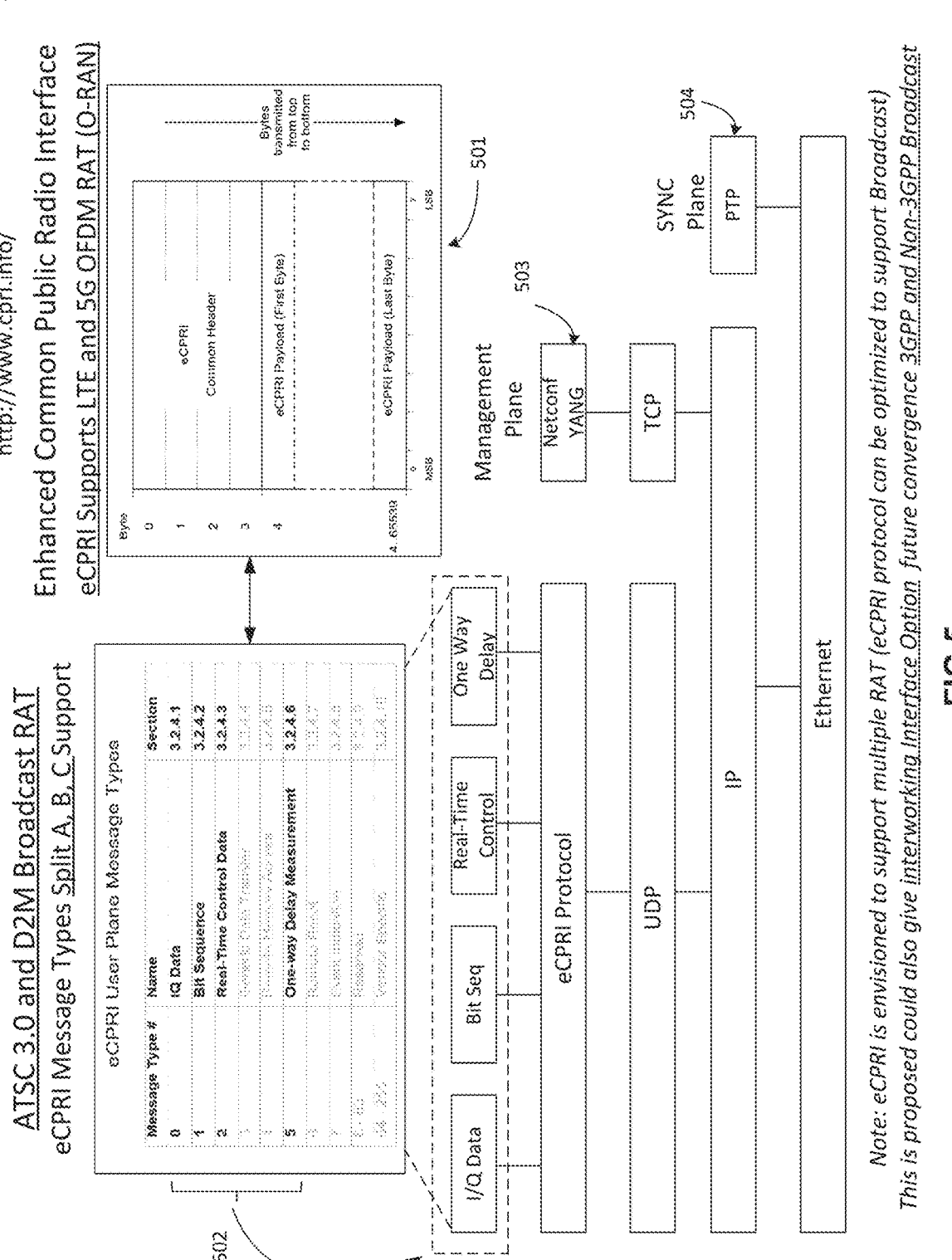
FIG. 5 illustrates eCPRI used by third generation partnership program (3GPP) Long Term Evolution (LTE) and fifth generation (5G) Radio Access Technology (RAT) in O-RAN today and eCPRI message types to support ATSC 3.0 and D2M broadcast RAT, according to some aspects of this disclosure.

FIG. 5 illustrates system 500 including eCPRI protocol 501 used for LTE and 5G in O-RAN and envisioned to support other radio access technologies RATs, according to some aspects of this disclosure. According to some aspects, 502 shows the eCPRI protocol has the support for both bit sequences and I/Q data proposed in ATSC 3.0 and D2M split types A, B, C along with needed timing control, etc. The management plane 503 and sync plane 504 use standard protocols and can be used, but focus here is eCPRI protocol.

Another constructive collaboration of eCPRI is an interworking fronthaul interface for convergence with 3GPP and Non-3GPP broadcast (D2M) aligned with O-RAN principles.

Figure 6:
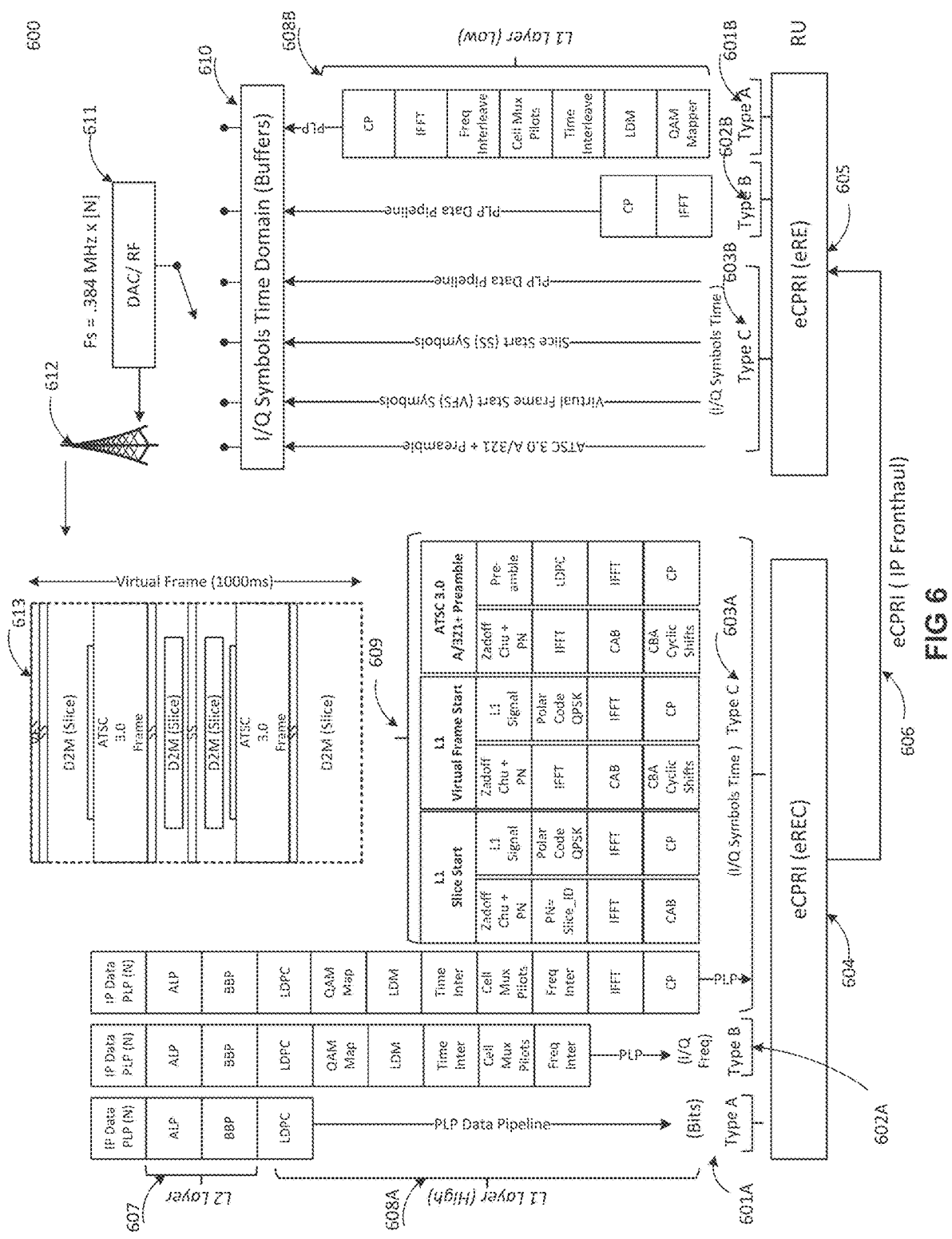
FIG. 6 illustrates eCPRI hybrid split types ATSC 3.0 and D2M Broadcast, according to some aspects of this disclosure.

FIG. 6 illustrates exemplary view 600 of eCPRI hybrid split types 601A, 601B (Type A), 602A, 602B (Type B), 603A, 603B (Type C) and the relationship to layer 2 607 and layer 1 of ATSC 3.0 608A, 608B and D2M broadcast, according to some aspects. The 604, 605 are the eCPRI entities that are connected by eCPRI IP fronthaul 606. L1 signaling ATSC 3.0 and D2M can be processed as 609 Type C split in cloud in all the hybrid splits.

According to some aspects, the L1 signaling only consumes a couple of symbols lasting but a few milliseconds and immense flexibility is achieved by keeping the processing of L1 signaling in the cloud. Then sending the processed L1 signaling as Type C 603A I/Q data using eCPRI fronthaul which requires only a nominal increase in data rate.

It will be discussed later, with respect to system 800, the benefits of keeping the remote unit (RU) more Orthogonal Frequency Division Multiplexing (OFDM) generic low complexity Type A, B or even agnostic to broadcast waveform Type C being produced. According to some aspects, transmitter site all split types A, B, C terminate 610 I/Q time domain buffers which is output in proper sequence by schedulers (D2M/ATSC 3.0) using eCPRI protocol to 611 Digital Analog Converter (DAC) and then upconverted to RF signal and emitted by transmit antenna 612 as a broadcast virtual frame 613 containing D2M slices and ATSC 3.0 frames.

Some aspects of this disclosure support architectures deploying single frequency networks (SFN) for broadcast with many transmitter sites distributed over large geographic areas. The cloud (software) enables slicing of broadcast spectrum for service use cases as will be discussed. Using a more generic or agnostic RU located at hundreds or thousands of broadcast SFN and Multi Frequency Network (MFN) sites is prudent.

Figure 7A:
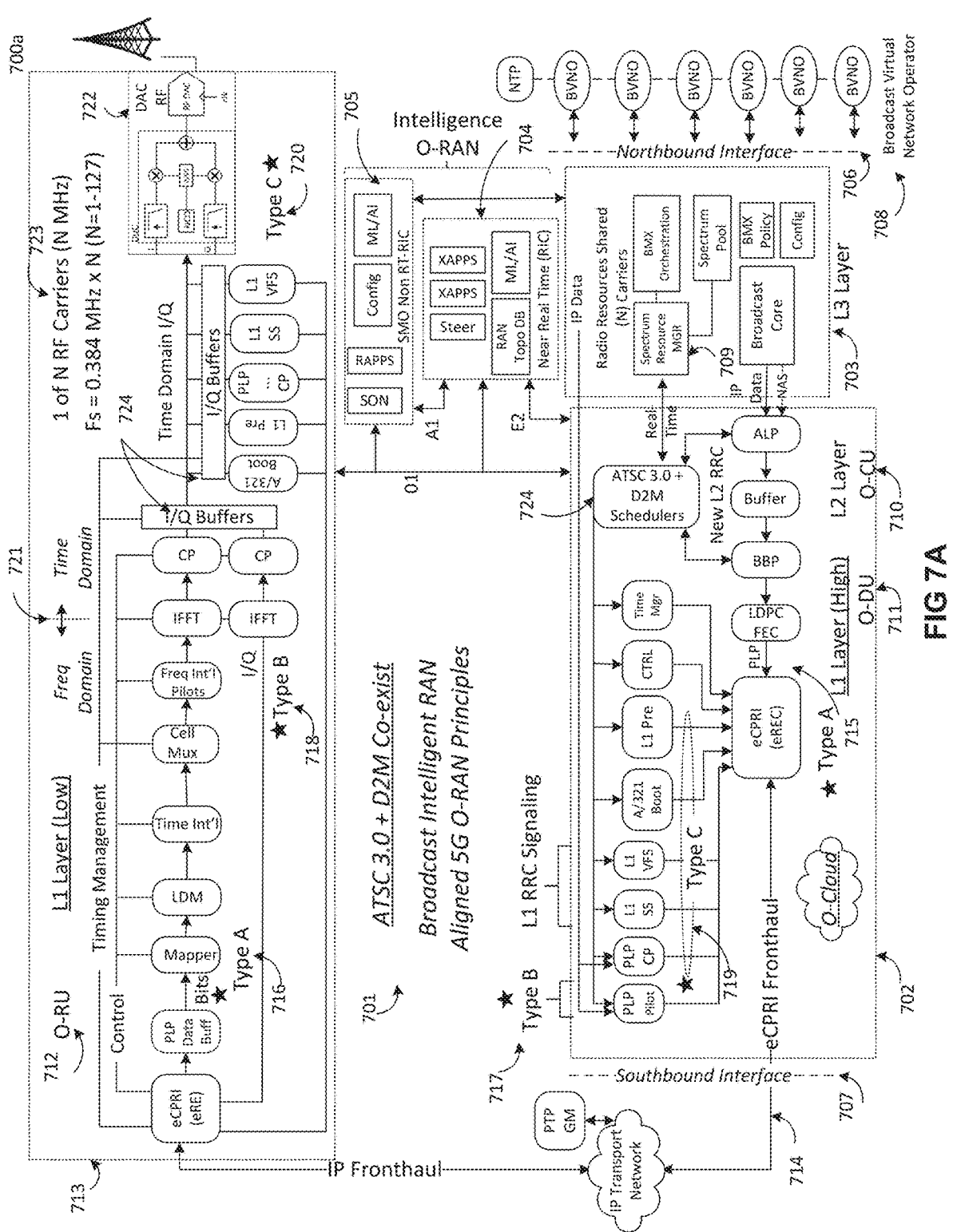
FIG. 7A illustrates a block diagram of disaggregation and broadcast physical layer splits using eCPRI implementation ATSC 3.0 and D2M and broadcast intelligent RAN aligned 5G O-RAN principles, according to some aspects of this disclosure.

FIG. 7A illustrates system 700a with block diagrams of disaggregation and broadcast physical layer splits using eCPRI implementation ATSC 3.0 and D2M and broadcast intelligent RAN aligned 5G O-RAN principles, according to some aspects of this disclosure. System 700a includes ATSC 3.0 and D2M 701 hybrid splits 400 as blocks of an architecture using eCPRI 714 and the cloud 702 is aligned with O-RAN principles, according to some aspects of this disclosure. Aligning with O-RAN nomenclature is 0-CU 710 at layer 2 and the O-DU 711 at L1 layer high and 712 O-RU at L1 layer low located at the transmitter site using 714 eCPRI protocol.

In some aspects, 703 is in cloud with coordinated schedulers 724 and broadcast core and spectrum resource manager (SRM) 709 enables sharing radio resource of 723 (N) carriers for (N) broadcast virtual network operators 708 pooling spectrum and accessing cloud 706 northbound interface under orchestration.

In some aspects, the aligned O-RAN intelligence entities 704, 705 and open interfaces will be discussed in more detail below. The eCPRI fronthaul 714 southbound interface 707 is used IP network to the transmitter site 713 and O-RU 712 and L1 layer low processing and 722 converts to RF signal.

In some aspects, Type A 715 split 715 (Bit Sequence) cloud is transported by 714 eCPRI to 716 Type A interface 712 O-RU.

In some aspects, Type B 717 split (I/Q Freq Domain) cloud is transported by 714 eCPRI to 718 Type B interface 712 O-RU.

In some aspects, Type C 719 split (I/Q Time Domain Symbols) cloud is transported by eCPRI 714 to Type C 720 interface O-RU 712.

As a non-limiting example, the 721 shows demarcation between frequency and time domains in OFDM L1 layer low processing. The 719 Type C split processing of L1 signaling (ATSC 3.0 and D2M) is in cloud and is sent as (I/Q Time Domain Symbols) to 720 Type C interface 712 O-RU. The Type C interface makes O-RU agnostic as to the type of OFDM waveform. The timing and management control eCPRI protocol signaling includes the 723 symbol sample rate Fs=0.384 MHzx(N) used with 724 I/Q Buffers. The value of N can be (1-127) which for ATSC 3.0 L1 signaling N=16 and value of N L1 signaling D2M can be (1-127) depending on use cases to be disclosed.

Figure 7B:
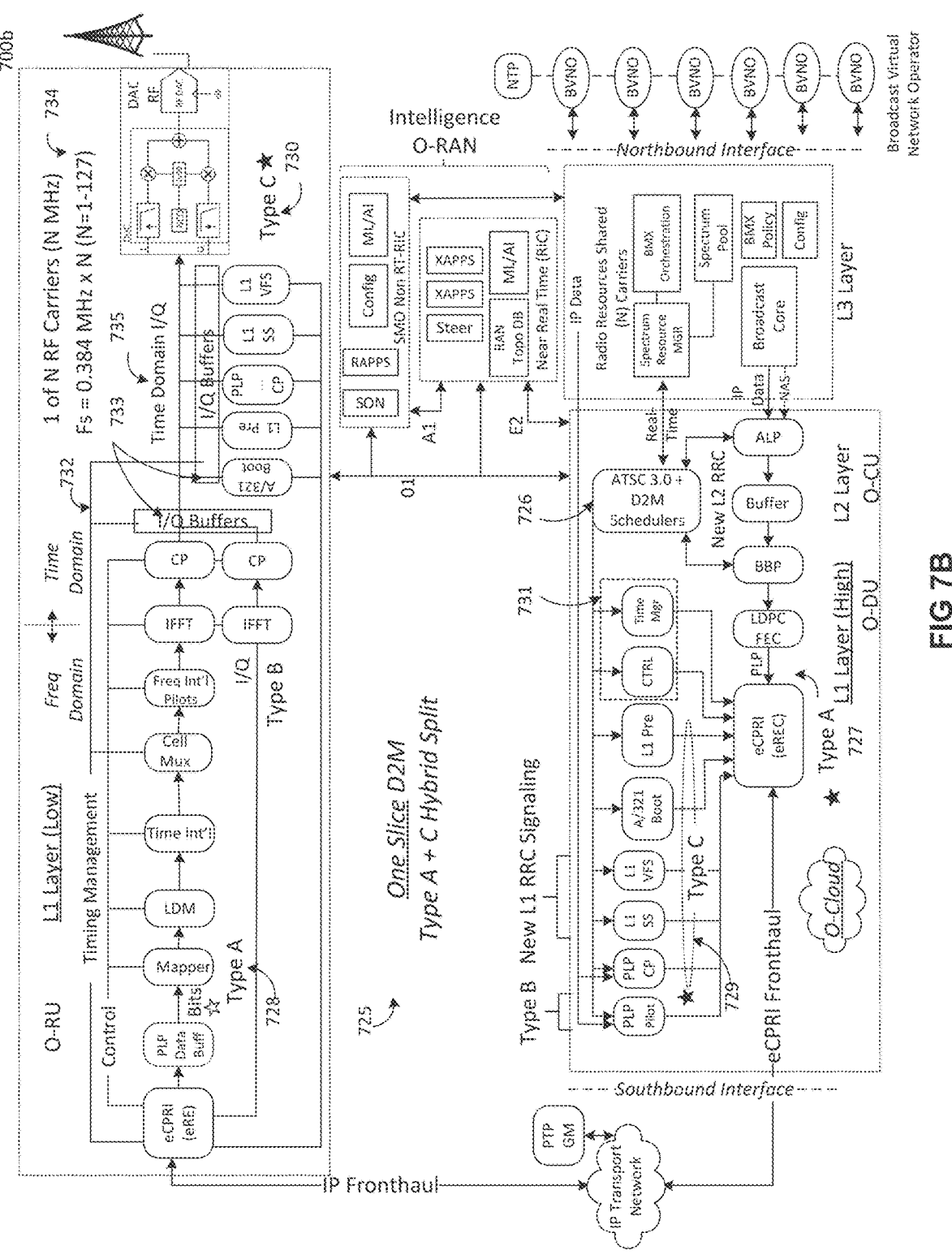
FIG. 7B illustrates another block diagram of disaggregation and broadcast physical layer splits, according to some aspects of this disclosure.

FIG. 7B illustrates system 700b with one slice of D2M using Type A+C hybrid split 725 highlighted, according to some aspects of this disclosure. The coordinated ATSC 3.0+D2M schedulers 726 schedule Type A 727 IP content and L2 signaling and Type C 729 L1 signaling over eCPRI fronthaul to Type A 728 and Type C 730 processing in the O-RU transmitter site. The eCPRI control and timing management 731 (cloud) is shown 732 controlling Time Domain I/Q buffers outputs 733 in O-RU which are time multiplexed into DAC and creates RF signal for slice. The sampling rate (N) 734 is signaled 732 for 728 and 730 separately, which can be different.

Figure 7C:
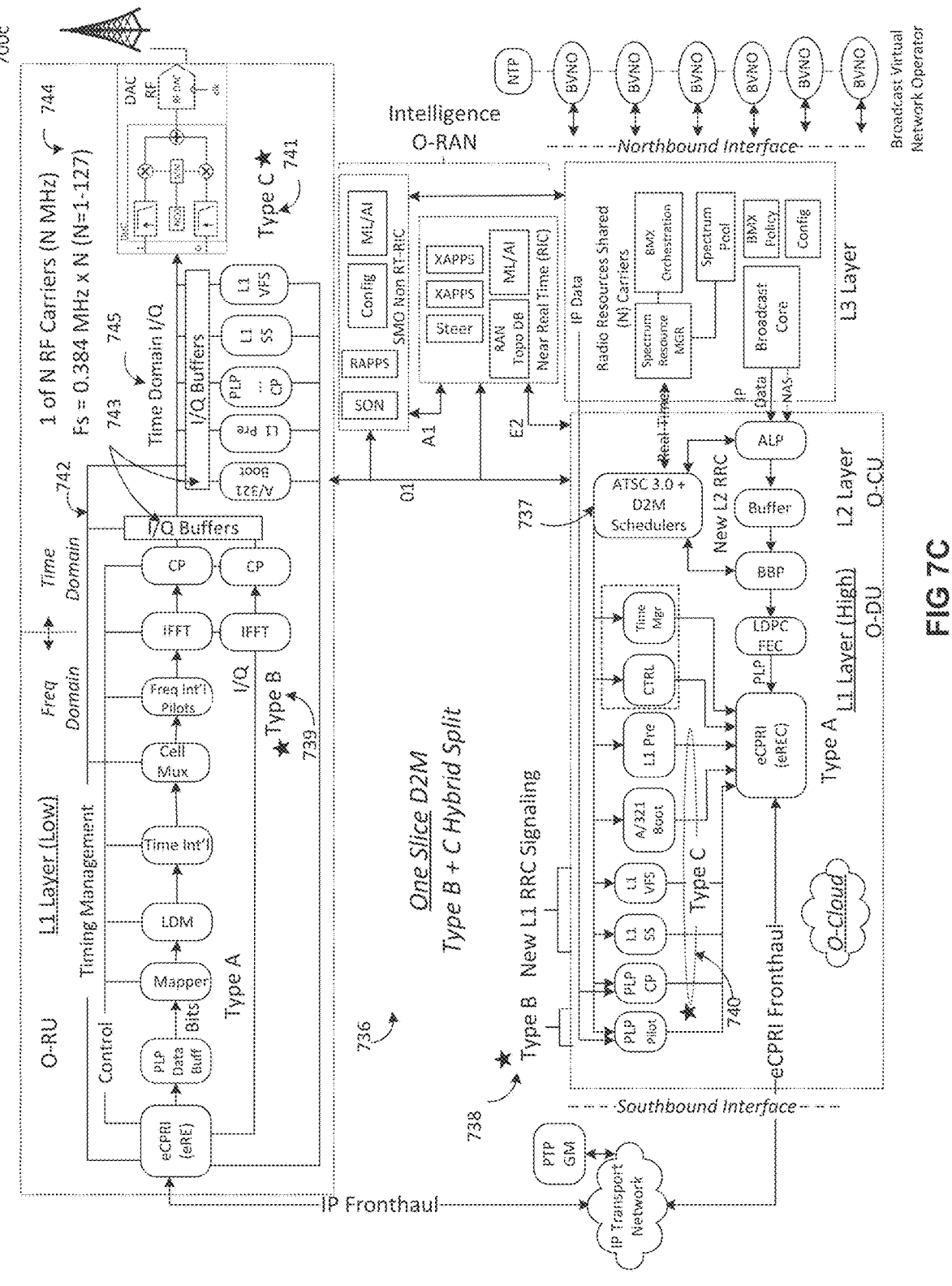
FIG. 7C illustrates another block diagram of disaggregation and broadcast physical layer splits, according to some aspects of this disclosure.

FIG. 7C illustrates system 700c with one slice of D2M using Type B+C hybrid split highlighted, according to some aspects of this disclosure. The coordinated ATSC 3.0+D2M schedulers 737 schedule Type B 738 IP content and L2 signaling and Type C 740 L1 signaling over eCPRI fronthaul to Type B 739 and Type C 741 processing in the O-RU transmitter site. The eCPRI control and timing management 742 and using proper sampling rate 744 is shown controlling Time Domain I/Q buffers outputs 743 in O-RU, which are time multiplexed into DAC, and creates RF signal for slice.

Figure 7D:
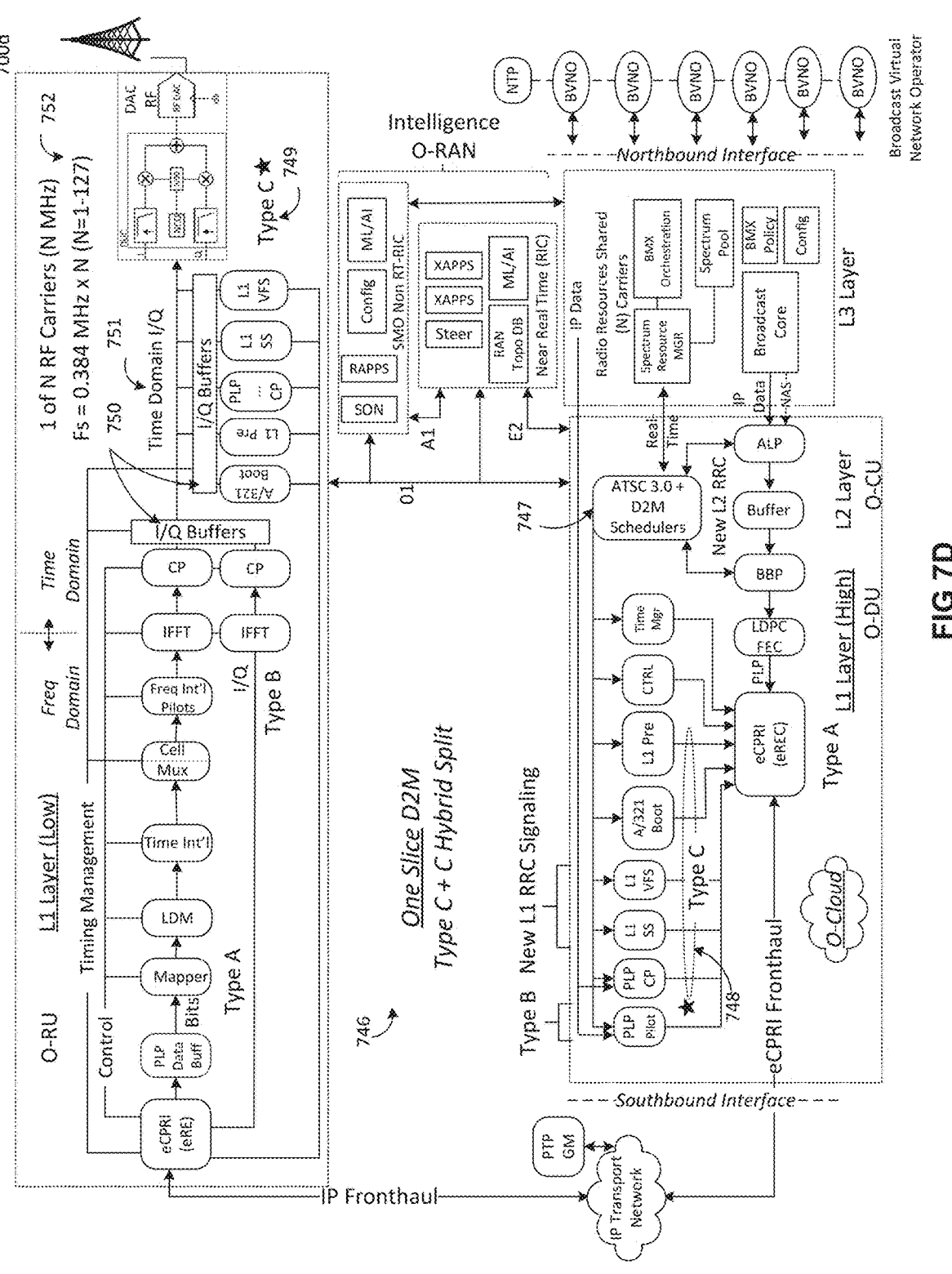
FIG. 7D illustrates another block diagram of disaggregation and broadcast physical layer splits, according to some aspects of this disclosure.

FIG. 7D illustrates system 700d with one slice of D2M using Type C+C hybrid split highlighted, according to some aspects of this disclosure. The coordinated ATSC 3.0+D2M schedulers 747 schedule IP content and L2 signaling and L1 signaling all Type C 748 over eCPRI fronthaul to Type C 749 processing in the O-RU transmitter site. The eCPRI control and timing management and using Fs 752 for each 751 is shown controlling Time Domain I/Q buffers outputs 750 in O-RU, which are time multiplexed into DAC, and creates RF signal for slice.

Figure 7E:
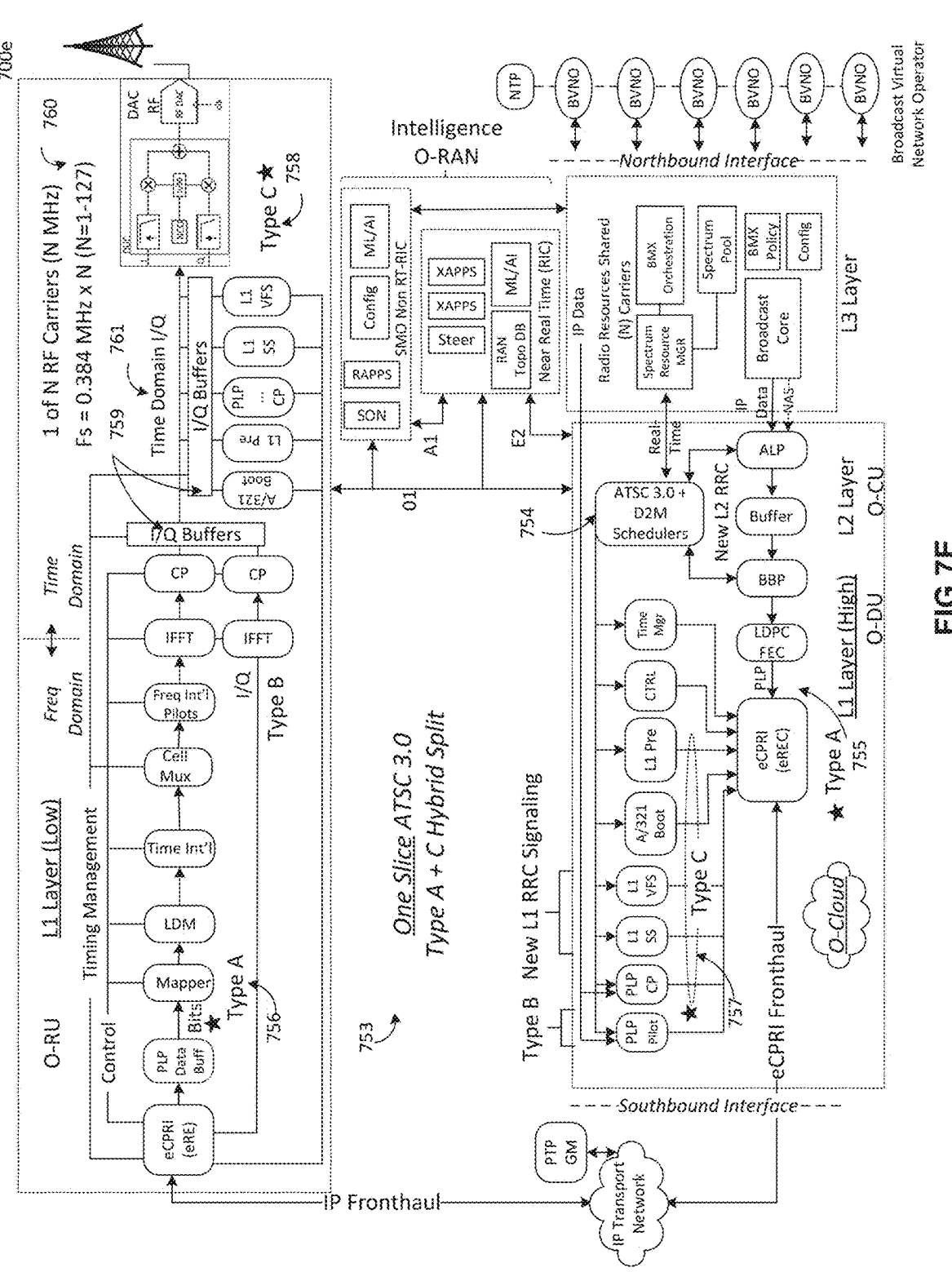
FIG. 7E illustrates another block diagram of disaggregation and broadcast physical layer splits, according to some aspects of this disclosure.

FIG. 7E illustrates system 700e with one slice of ATSC 3.0 using Type A+C hybrid split highlighted, according to some aspects of this disclosure. The coordinated ATSC 3.0+D2M schedulers 754 schedule Type A 755 IP content and L2 signaling and Type C 757 L1 signaling over eCPRI fronthaul to Type A 756 and Type C 758 processing in the O-RU transmitter site. The eCPRI control and timing management and using Fs 760 for each 761 is shown controlling Time Domain I/Q buffers outputs 759 in O-RU, which are time multiplexed into DAC, and creates RF signal for slice.

Figure 7F:
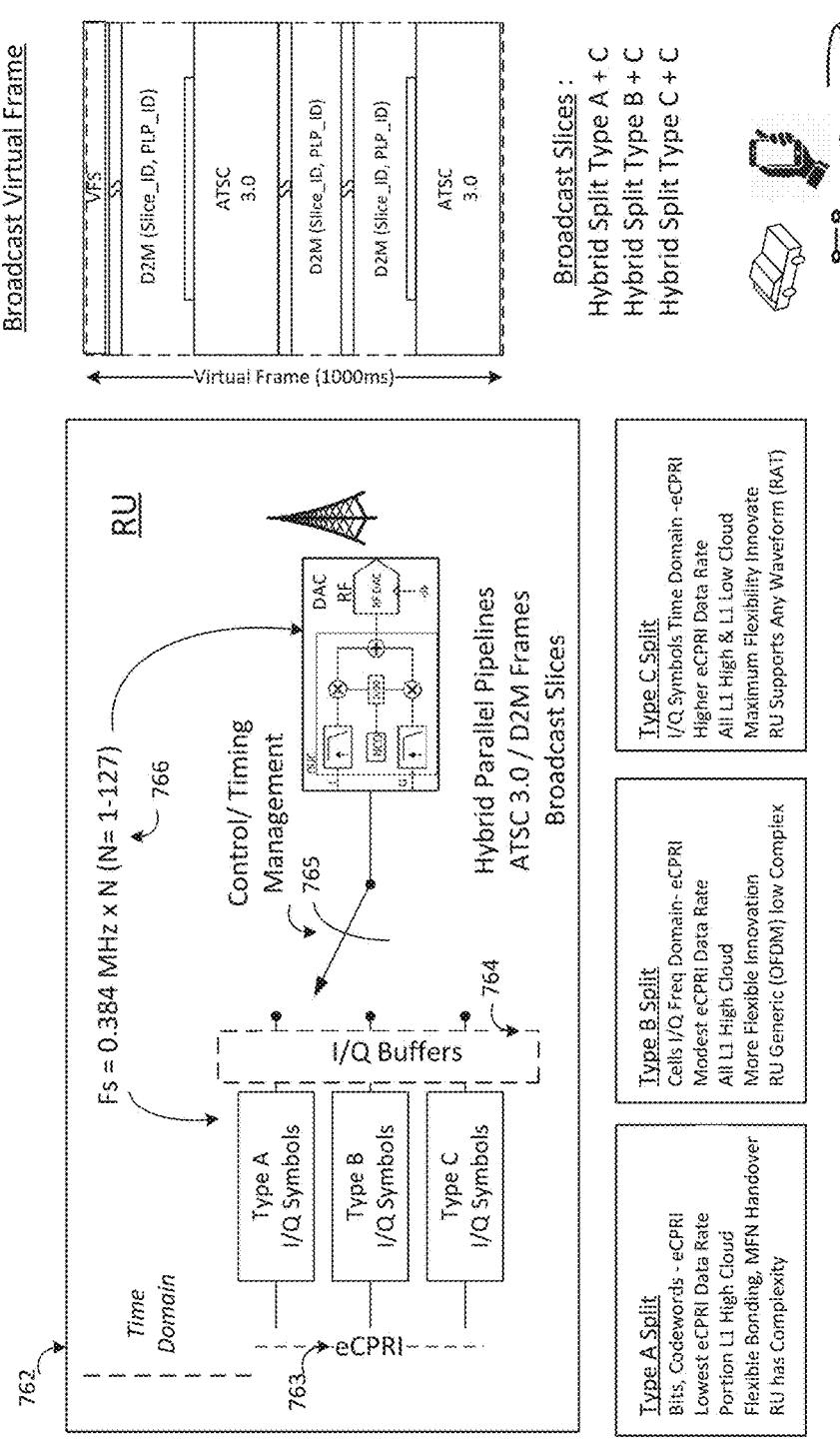
FIG. 7F illustrates a remote unit (RU) at transmitter site with hybrid physical layer splits, according to some aspects of this disclosure.

FIG. 7F illustrates a simplified view of remote unit (RU) 762 at a transmitter site with hybrid physical layer splits, according to some aspects of this disclosure. The eCPRI 763 delivered Type A, B, C splits for ATSC 3.0 and D2M are shown processed and in the I/Q time domain output buffers 764. The IQ symbols buffers are time multiplexed using proper Fs 766 known by control and timing (cloud) 765 to create broadcast RF slices in virtual frame container. This can be viewed as having parallel pipelines RU that are time multiplexed into RF signal for each broadcast slice. As a function of the split types chosen and is efficient, flexible for innovation aligned 5G O-RAN principles. The spectrum is shared and broadcast slicing BVNO and percent ATSC 3.0 and D2M can be allocated on a virtual frame-by-frame basis driven by market consumer demand using an intelligent RAN.

Figure 8:
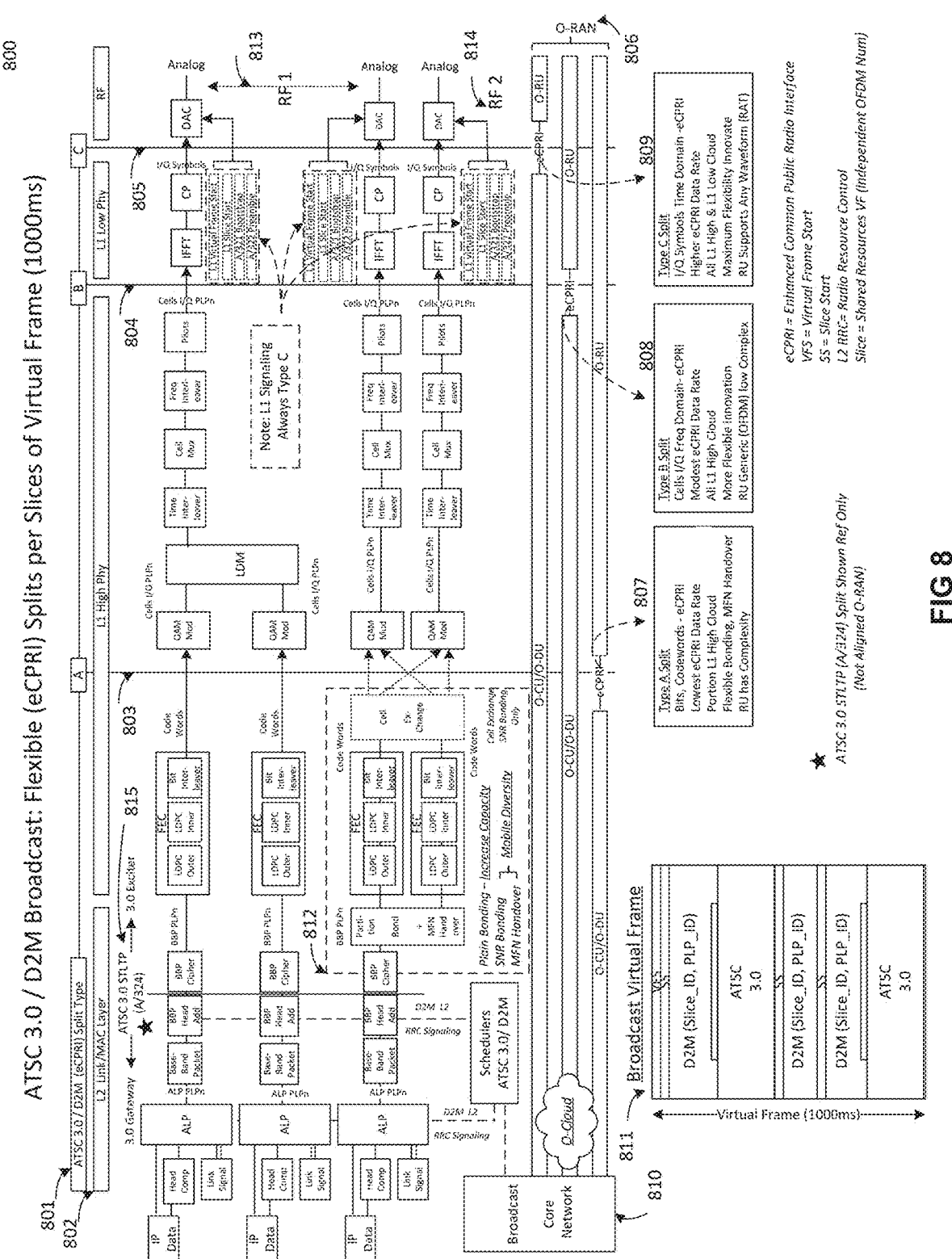
FIG. 8 illustrates ATSC 3.0 and D2M broadcast physical layer flexible eCPRI splits and with proposed concept of Broadcast Virtual Frame for co-existence, according to some aspects of this disclosure.

FIG. 8 illustrates exemplary ATSC 3.0 and D2M flexible (eCPRI) splits Type A 803, Type B 805 and Type C 805 against end to end blocks from layer 3 to RF layer 1 that will be used to describe functionality later, according to some aspects of this disclosure. At the bottom 806 is O-RAN aligned eCPRI splits from broadcast core 810 to RF1 813 and RF 2 814 to be used when discussing functionality of Type A 803 split later.

The comparison of Type A 807 and Type B 808 and Type C 809 splits is shown. The Type A split 807 has great flexibility and low data rate eCPRI fronthaul. The 815 shows 300 A/324 and L2 split for reference only. The A/324 not being aware cloud or spectrum sharing has located the processing of portion of L2 and all L1 High and L1 low blocks in ATSC 3.0 exciter at transmitter sites. The majority of examples for intelligent broadcast RAN to be discussed later use Type A split which has data rate for fronthaul similar to A/324 and STLTP but much more flexibility and innovation aligned with cloud, etc.

In some aspects, the flexibility in 812 to be disclosed uses a UE with 2 tuners and RF chains to increase diversity for mobile performance and or increase service capacity using bonding techniques 813, 814 from cloud. Some of these channel bonding techniques are part of ATSC 3.0 but have been extended for the cloud with new exemplary use cases.

Finally, 811 illustrates concept of broadcast virtual frame which is a virtual frame construct introduced to enable co-existence and D2M access and reception paradigm using the L1 and L2 RRC signaling and virtual frame container to be disclosed.

Figure 9:
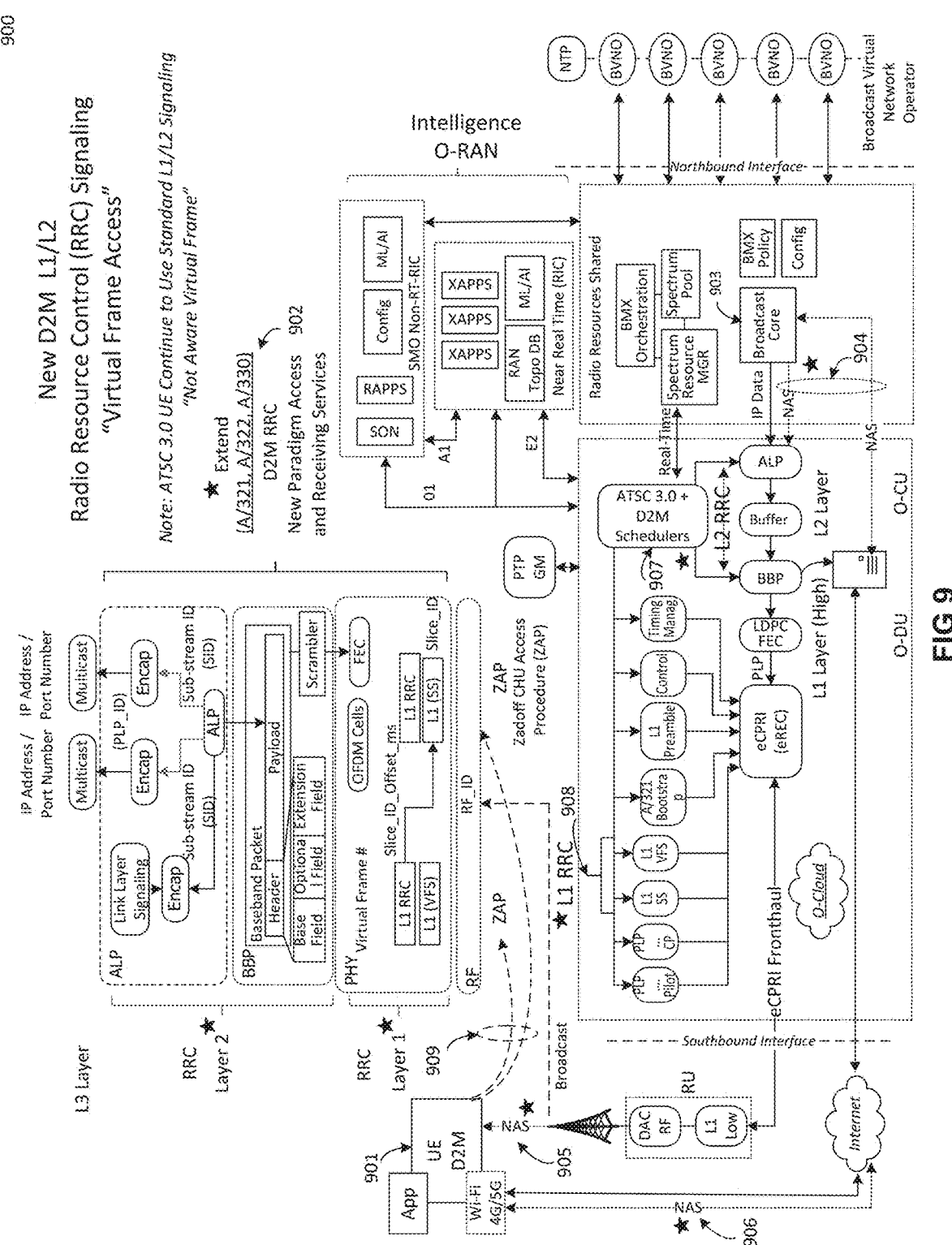
FIG. 9 illustrates L1 and L2 signaling enabled by extending A/321, A/322 and A/330 standards for D2M broadcast in virtual frame and co-existence ATSC 3.0, according to some aspects of this disclosure.

FIG. 9 illustrates system 900 with D2M L1 and L2 layer radio resource signaling (RRC) signaling for virtual frame access, according to some aspects of this disclosure. This includes Non-Access Stratum (NAS) 904 signaling between broadcast core 903 and UE 901 via broadband 906 and or broadcast 905. NAS is term used in 3GPP and adopted here for broadcast with 903 a broadcast core network. In some aspects, 901 is D2M UE which uses 902 extensions A/321, A/322, A/330 for 908 L1 and 907 L2 RRC signaling.

The A/321 is extended for D2M L1 access which is based on a Zadoff Chu sequence as will be disclosed. In some aspects, 909 shows the Zadoff Chu Access Procedures (ZAP) the UE uses for either initial or quick access to OFDM resources in virtual frame to be disclosed. The current ATSC 3.0 UE continues to use 902 as specified in standards and is unaware of virtual frame construct. An ATSC 3.0 advanced UE could receive both ATSC 3.0 and D2M. We will speak only of D2M UE and virtual frame access but the forward compatibility should be kept in mind. Since, D2M uses ATSC 3.0 L1 and L2 as baseline and extends 902 only when needed for mobile services and UE battery savings and to enable an intelligent broadcast RAN.

Figure 10:
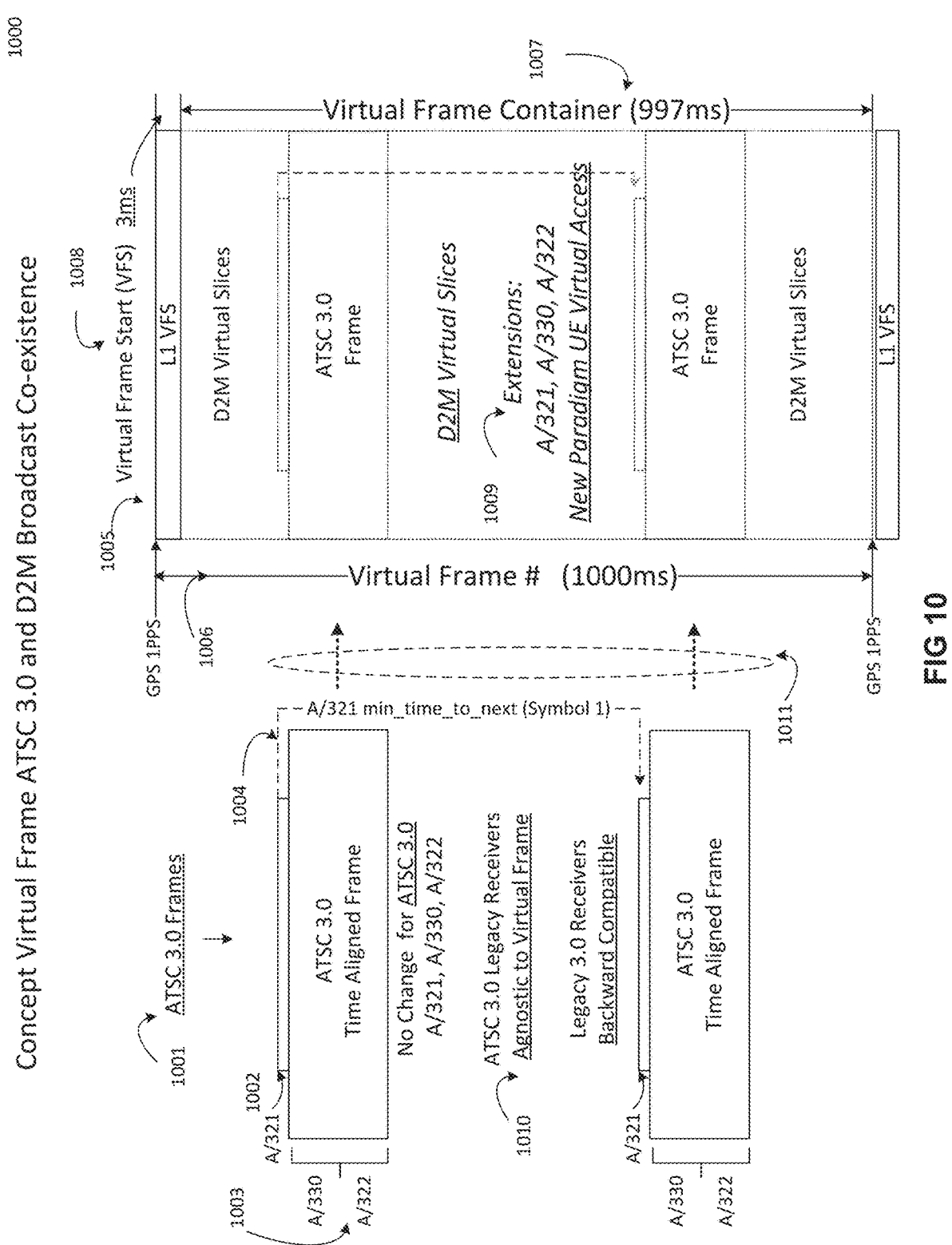
FIG. 10 illustrates the concept of a virtual frame aligned Global Positioning System (GPS) one Pulse Per second (1PPS) and supporting ATSC 3.0 and D2M broadcast co-existence in the same spectrum, according to some aspects of this disclosure.

FIG. 10 illustrates system 1000 including the concept of virtual frame and co-existence of ATSC 3.0 and D2M, according to some aspects of this disclosure. It should be appreciated with symbol sample rate Fs=0.384 MHzx(N), with (N=1 to 127) this can support bandwidths by scaling ATSC 3.0 from 0.384 MHz to ~50 MHz, according to some aspects. Some examples used are towards broadcast 6 MHz bandwidths and some with less for narrowband segmentation of wider bandwidths for low battery consumption. Some examples used are towards 5 MHz and 10 MHz 3GPP bandwidths and non-3GPP broadcast. In fact Fs=46.08 MHz is used for UE positioning use case using SFN network. So a flexible, scalable broadcast architecture is to be disclosed and should not be limited to the few examples presented. Accordingly, example 1000 depicts a 6 MHz bandwidth for illustration.

In some aspects, 1001 depicts ATSC 3.0 frames that are time aligned Global Positioning System (GPS), Precision Time Protocol (PTP) and can have an exact length from 50 ms to 5000 ms in 5 ms increments as specified in standard. ATSC 3.0 frames are composed 1002 A/321 and 1003 A/330 and A/322 as previously mentioned. According to some aspects, 1004 is A/321 signaling the min_time_to_next to indicate time window for start A/321 and next ATSC 3.0 frame as 100 previously discussed.

In some aspects, 1005 illustrates broadcast virtual frame structure that can be used for co-existence. 1006 shows virtual frame that has a number assigned equal PTP seconds count since epoch to uniquely identify be discussed and virtual frame length is exactly 1000 ms in duration. Aligned with Global Positioning System (GPS) one pulse per second (1PPS) and second phase of Precision Time Protocol (PTP), GPS, Network Time Protocol (NTP), as will be discussed. Inside the virtual frame is a virtual frame container 1007 in this 6 MHz example is exactly 997 ms in duration which can support ATSC 3.0 frames and D2M broadcast slices as will be discussed.

In some aspects, virtual frame start (VFS) 1008 symbol signals the start virtual frame and is exactly 3 ms in duration. According to some aspects, the D2M UE has a correlator that searches for the VFS known Zadoff Chu+PN sequence to locate virtual frame start and receive L1 signaling for access termed ZAP. Further details regarding the Zadoff Chu access procedure (ZAP) will be discussed in detail.

In some aspects, with ATSC 3.0 frames 1001 time aligned and with 1004 signaling time to the next ATSC 3.0 frame, and the ATSC 3.0 legacy receivers 1010 are agnostic to existence of 1005 broadcast virtual frame. However, all frames are locked to a common time reference GPS and PTP, and can therefore exist along or inside a virtual frame as a function of time using standard ATSC 3.0 L1 and L2 signaling specified and will co-exist agnostic with D2M in virtual frame as a function of time. Using 724 ATSC 3.0 and D2M schedulers coordinated in the cloud to schedule all OFDM resources.

Thus virtual frame construct 1005 describes a synchronous shared broadcast architecture for co-existence with broadcast physical frames locked to GPS, PTP at air interface of transmitting antenna, according to some aspects. With BVNO 708 IP content data access to cloud orchestrated using NTP all with same second phase (GPS, PTP, NTP) as the virtual frame (1000 ms) can be very flexible and enabling as will be discussed in detail.

Figure 11:
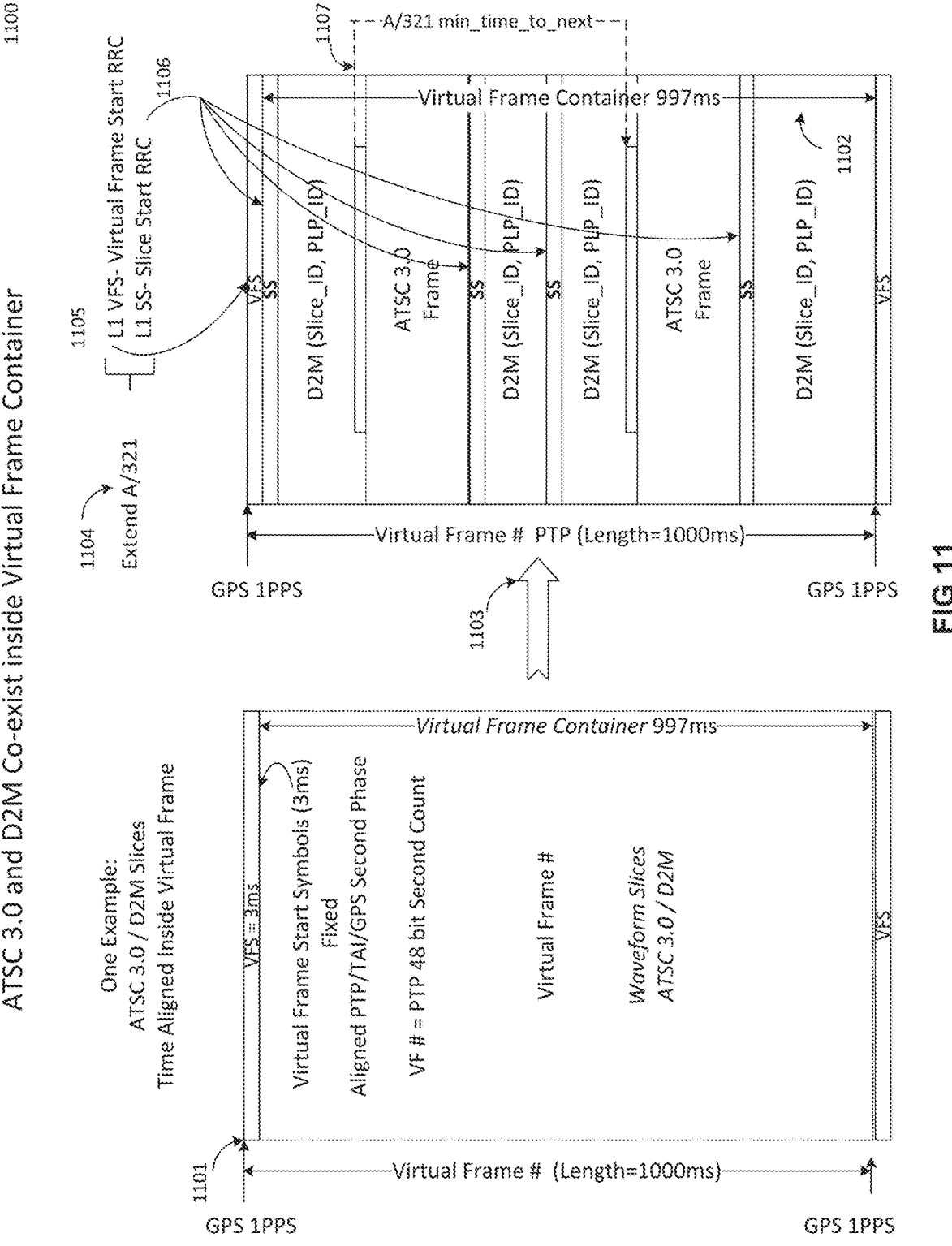
FIG. 11 illustrates time aligned ATSC 3.0 and D2M broadcast spectrum slices co-existing inside a virtual frame container, according to some aspects of this disclosure.

FIG. 11 illustrates system 1100 including ATSC 3.0 frames and D2M broadcast slices inside 1102 virtual frame container, according to some aspects of this disclosure. According to some aspects, virtual frame container 1102 may include ATSC 3.0 frames and other Non 3.0 (e.g. New Radio (NR), Long Term Evolution (LTE), Universal Mobile Telecommunications System (UMTS), or Global System for Mobile communications (GSM)) broadcast slices. According to some aspects, 1101 is virtual frame 1000 ms in duration and aligned using PTP, TAI, GPS second phase at air interface of antenna. The virtual frame number assigned can be equal to the PTP 48 bit second count since PTP epoch at instant start of virtual frame is broadcast at air interface transmitter antenna.

In some aspects, the PTP count is 48 bit seconds+32 bit nanoseconds, and since we are aligning broadcast virtual frame start (VFS) with second phase such as GPS 1PPS a 48 bit second count may be required since the nanoseconds are zero at the second phase instant.

In some aspects, requiring VFS symbol and start of virtual frame to be phase aligned with GPS second tick is fundamental to the system. More is discussed later on the relationship between time and VFS.

The A/321 frame 1104 can be extended to create 1105 VFS symbol for demarcating start of virtual frame, and the details will be discussed later. According to some aspects, in general, extended Zadoff Chu+PN sequence is generated and UE has correlator to locate and synchronize to VFS symbol and start of virtual frame. Once UE is synchronized to symbol virtual frame number 48 bits PTP seconds is discovered with other L1 signaling for UE to rapidly become time synchronized to network which is PTP. According to some aspects, when UE finds VFS symbol it has time PTP, NTP time and when UE knows time it knows start of VFS symbol and this is fundamental to access and reception of services as a function of time in virtual frame.

In some aspects, the 1106 is the L1 Slice Start (SS) symbol extend A/321 and like VFS a correlator detects each SS symbol unique Zadoff Chu+PN sequence for synchronization and signaling. A second symbol using Polar Codes and QPSK and also permits RRC signaling information for locating and receiving IP services inside virtual container. According to some aspects, 1103 indicates that the ATSC 3.0 frames and 1107 signaling can co-exist as a function of time, in the cloud with intelligence of coordinated schedulers 724 and broadcast core, etc.

Figure 12:
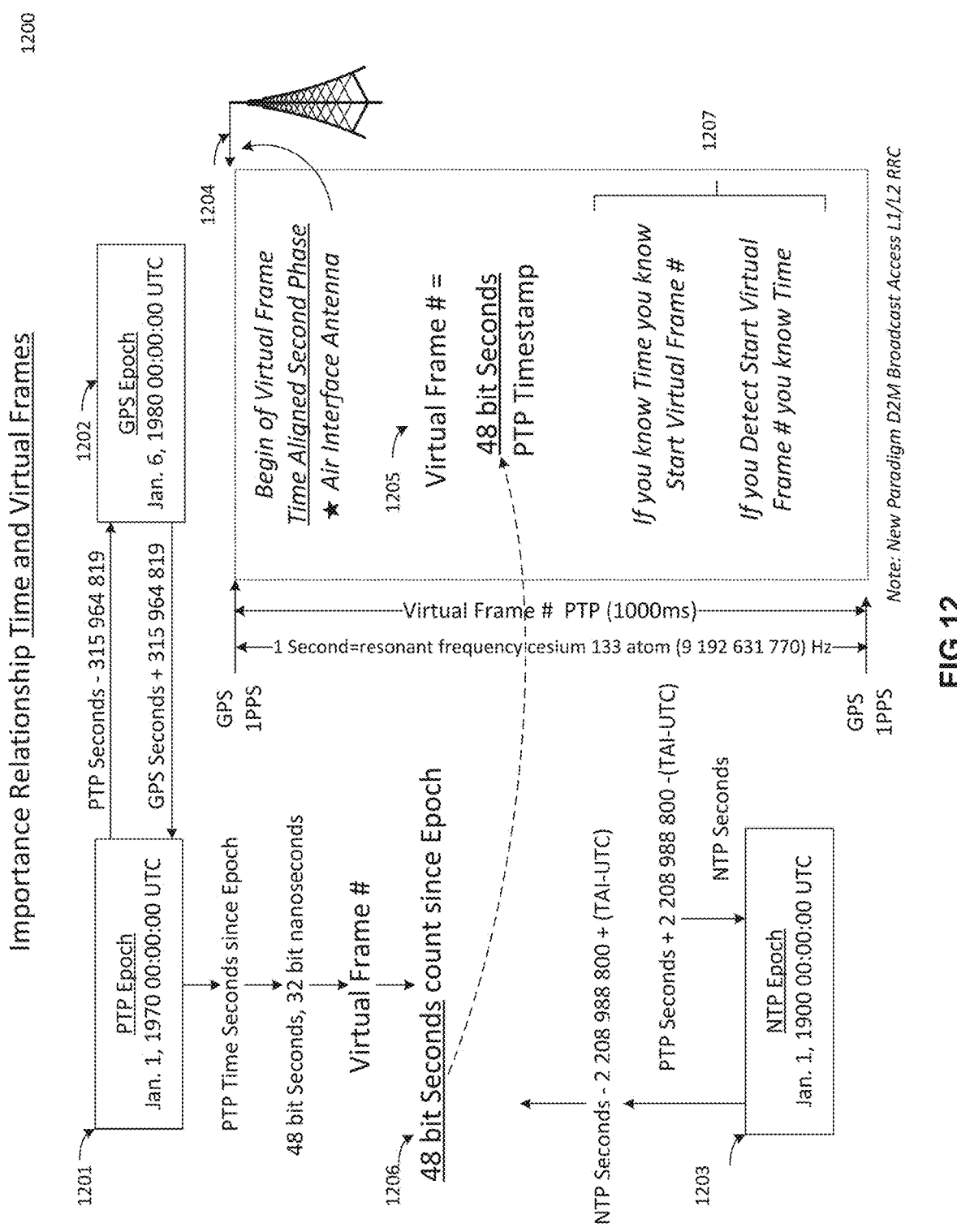
FIG. 12 illustrates the relationships between time and virtual frames enabling a paradigm broadcast service access with Layer 1 (L1) and Layer 2 (L2) signaling, according to some aspects of this disclosure.

FIG. 12 illustrates the relationship of time and start of virtual frame number, according to some aspects of this disclosure. According to some aspects, 1201 shows PTP epoch and 1202 shows GPS epoch and 1203 shows NTP epoch for reference and the conversions between them. According to some aspects, 1204 is the air interface that beginning of virtual frame is aligned with second phase. The virtual frame number 1205 equal the 48 bit second count 1206 PTP since epoch. The 1207 shows relationships time and start of virtual frame number, according to some aspects.

FIG. 13 illustrates an example 1300 of the OFDM numerology for the D2M 1301 optimized mobile services and battery savings and ATSC 3.0 1302 optimized for fixed services, according to some aspects of this disclosure.

Figure 14:
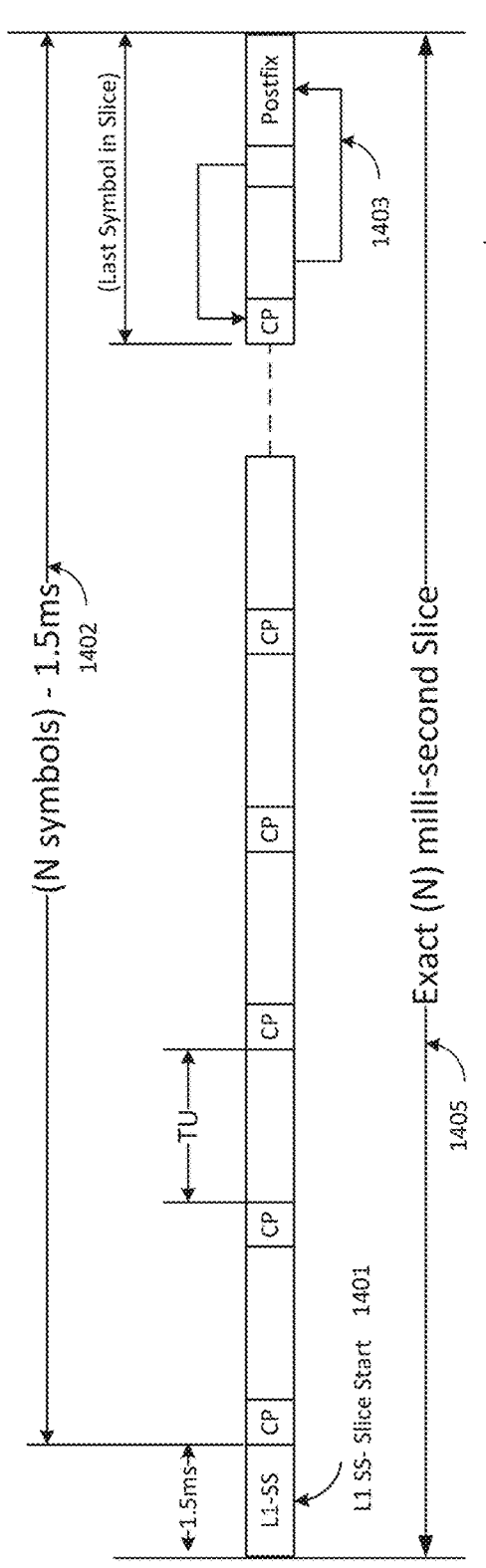
FIG. 14 illustrates one example D2M spectrum slice and method to ensure exact length of (N) integer milliseconds for insertion inside of a virtual frame container, according to some aspects of this disclosure.

FIG. 14 illustrates an example 1400 of a method for ensuring that a D2M slice is exactly N milliseconds in duration, according to some aspects of this disclosure. According to some aspects, the 1401 is L1 Slice Start which is exactly 1.5 milliseconds in duration, and the duration of N symbols 1042 is 1.5 ms, which can be an integer number of milliseconds in duration. According to some aspects, 1403 is last symbol that has postfix 1402 added to ensure 1405 is integer milliseconds in length given the N sysmbols 1402.

Figure 15:
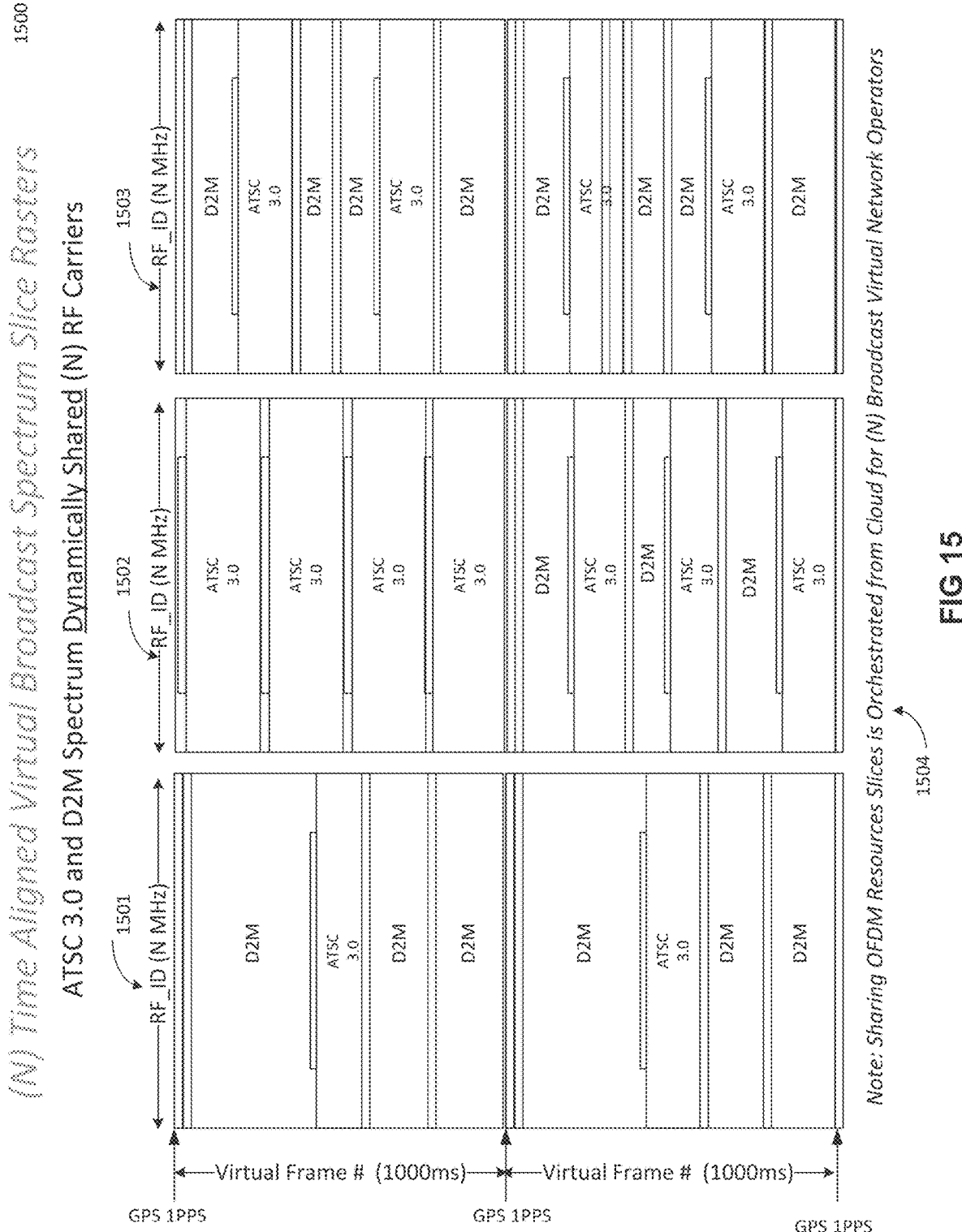
FIG. 15 illustrates dynamic spectrum sharing of (N) broadcast virtual network operators using three time aligned RF carriers with slice raster orchestrated from the cloud, according to some aspects of this disclosure.

FIG. 15 illustrates an example 1500 of ATSC 3.0 and D2M shared spectrum slice raster over (N) RF carriers, according to some aspects of this disclosure. According to some aspects, 700 and 709 show a spectrum resource manager sharing (N) RF carriers 732 for N Broadcast Virtual Network Operators (BVNO) 708.

In some aspects, 1501 is RF carrier 1 and 1502 is RF carrier 2 and 1503 is RF carrier 3. 1504 indicates sharing of OFDM resources for slices being orchestrated from cloud for N BVNO 708.

According to some aspects, the dynamic allocation of slice raster can change on a second boundary on a RF carrier. Intelligent broadcast RAN 4500 where services can be easily steered or switched from one RF carrier to another RF carrier or network topology SFN or MFN seamlessly is later discussed. According to some aspects, since the L1 and L2 RRC signaling details to be disclosed is designed for multi-tenant (BVNO) and N RF carriers with the intelligent broadcast RAN architecture disclosed supporting co-exis-tence.

Figure 16:
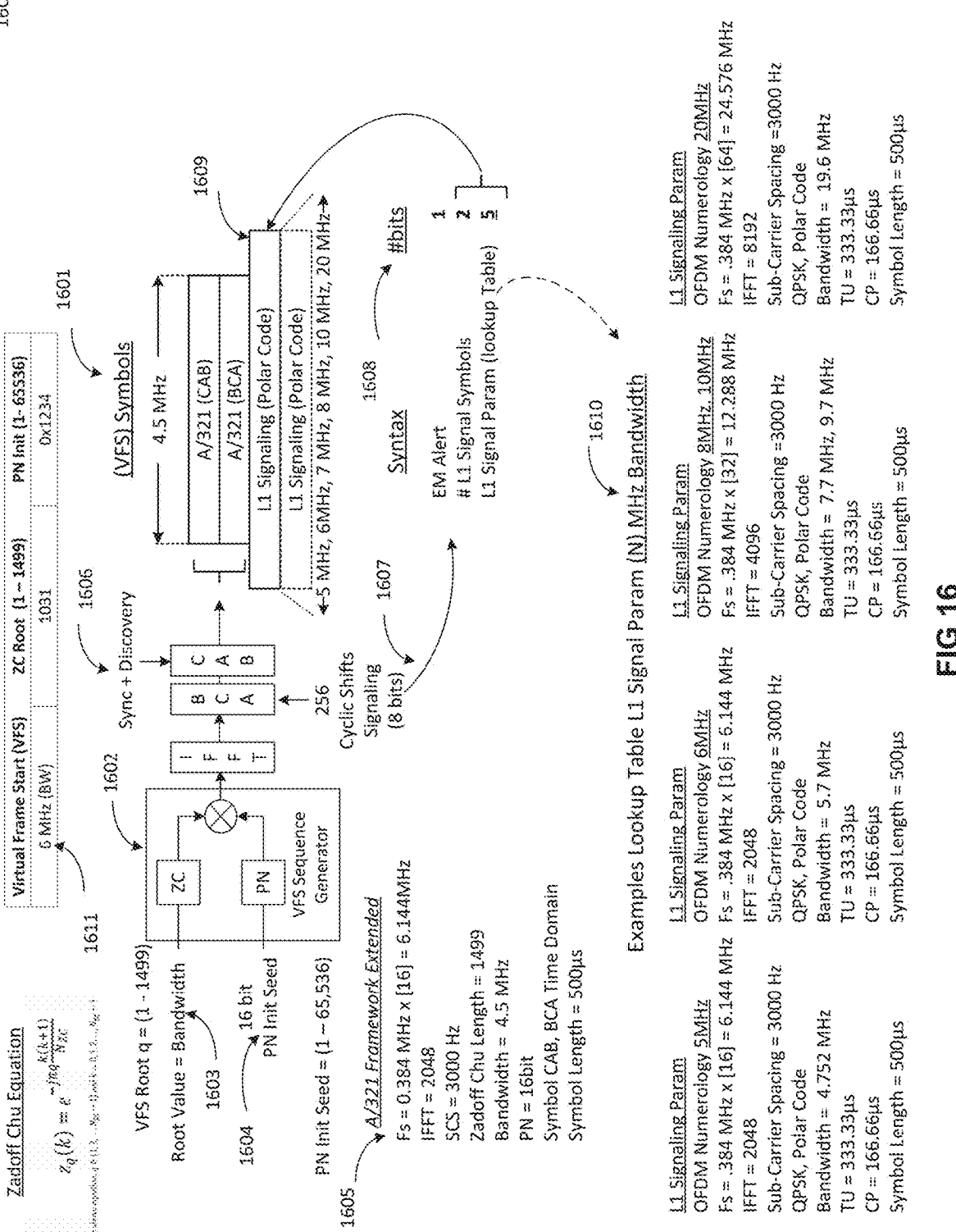
FIG. 16 illustrates an example virtual frame start (VFS) symbol aligned Precision Time Protocol (PTP)/GPS second phase air interface to demarcate start of virtual frame and L1 Radio Resource Control (RRC) signaling, according to some aspects of this disclosure.

FIG. 16 illustrates an example 1600 of virtual frame start (VFS) symbols that begins each virtual frame aligned at antenna air interface with PTP second phase cadence, according to some aspects of this disclosure. The VFS 1601 may be composed of three symbols the first two are achieved by extended scaled A/321 1605 with total duration 1 ms with the first symbol CAB time domain structure 1606 used for UE synchronization and discovery. According to some aspects, the 1607 VFS second (Zadoff Chu (ZC)+PN) sequence symbol (BCA) is used for signaling via cyclic shifts in time domain. The VFS (BCA) symbol 1608 pro-vides (8 bits) via 256 cyclic shifts shown can be used for high priority signaling.

The VFS symbol 1609 is used for L1 radio resource control (RRC) signaling with duration of 0.5 ms and is based on polar codes and QPSK like that used in 5G for L1 control signaling, according to some aspects. To increase flexibility and capacity for L1 signaling the BCA symbol 1607 has 256 cyclic shifts to signal 8 bits RRC signaling 1608. According to some aspects, two bits are used to indicate number of L1 symbols 1609 and 5 bits for the L1 signal parameters for UE to access. According to some aspects, 1610 shows examples for various carrier bandwidths and L1 parameters and finally one bit to indicate active emergency alerts.

Since A/322 L1 preamble signaling is based on a puncture shortened Low Density Parity Check (LDPC) it may have performance limitations when used for short code lengths needed for mobile control signaling. According to some aspects, 1609 polar codes were selected D2M optimized for mobile signaling. ATSC 3.0 may continue using standard-ized L1 preamble optimized fixed service.

According to some aspects, the A/321 extended frame-work 1605 is the same as used in ATSC 3.0 the only change is the values chosen for the Zadoff Chu Root 1603 and 16 bit PN Init seed 1604 used in VFS sequence generator 1602 and the syntax and semantics defined for VFS symbols opti-mized for D2M. According to some aspects, the semantics for selection 1Root value 1603 signals the RF carrier band-width such as 5 MHz, 6 MHz, 7 MHz, 8 MHz, 10 MHz, 20 Mhz, etc. with the maximum bandwidth supported is 50 MHz. According to some aspects, 1611 is one hypothetical example for 6 MHz RF carrier BW the ZC Root=(1031) and PN Init Value=(0x1234). The actual complex sequences (ZC+PN) values can be selected by simulation to have excellent auto-correlation properties and low cross-correla-tion among all other complex sequences selected. There are a potential 1499 ZC Root values and 65,536 PN Init values to choose from, according to some aspects. The extended A/321 framework 1605 and OFDM numerology may remain fixed including BW of 4.5 MHz same as ATSC 3.0.

Figure 17:
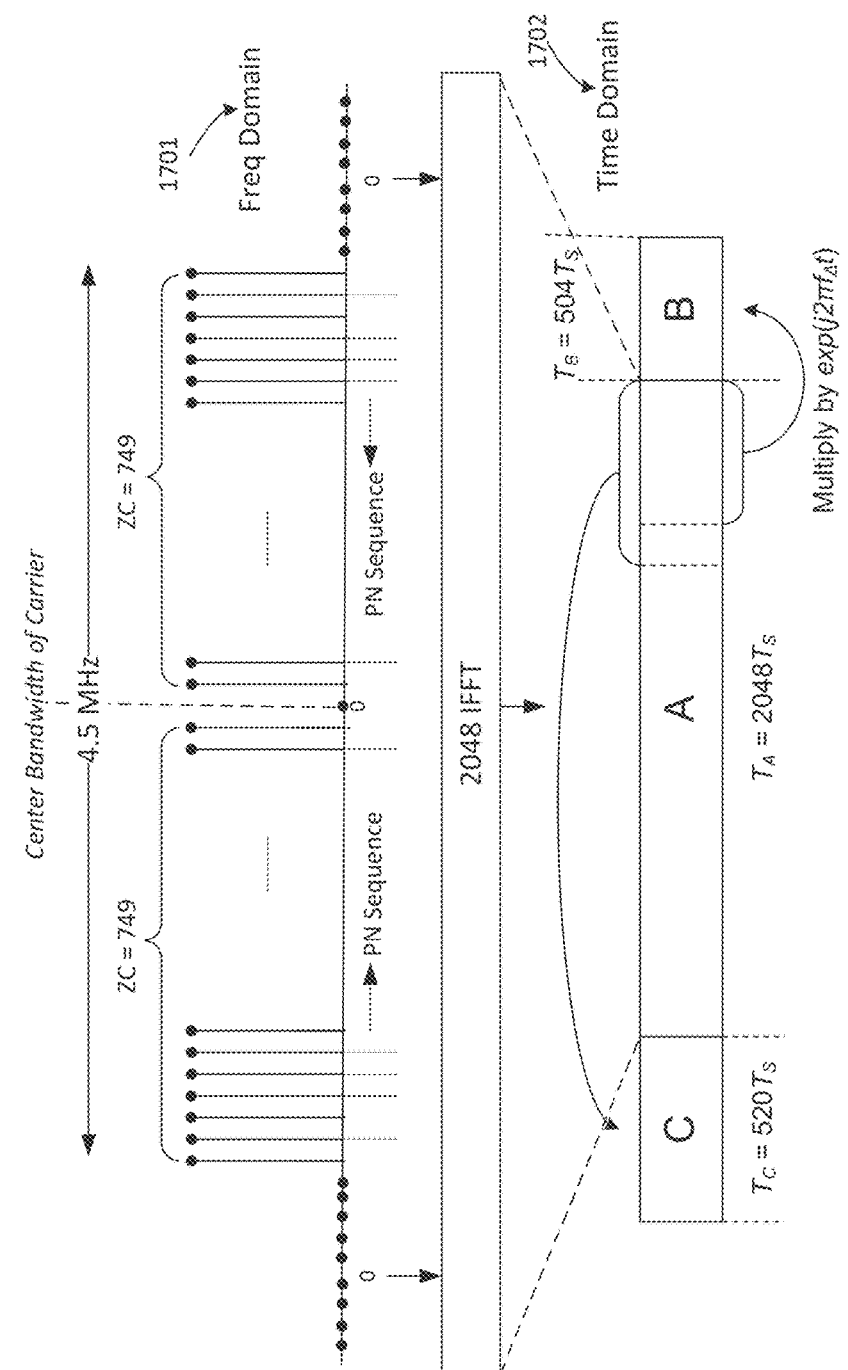
FIG. 17 illustrates $1^{st}$ VFS symbol in the frequency and in time domain (CAB time domain structure) accomplished by scaling A/321 used in ATSC 3.0, according to some aspects of this disclosure.

FIG. 17 illustrates example 1700 including the extended A/321 framework 1605 in the frequency domain 1701 and time domain 1702, according to some aspects of this dis-closure. There may be no changes in A/321 framework 1700 for D2M, according to some aspects of this disclosure.

Figure 18:
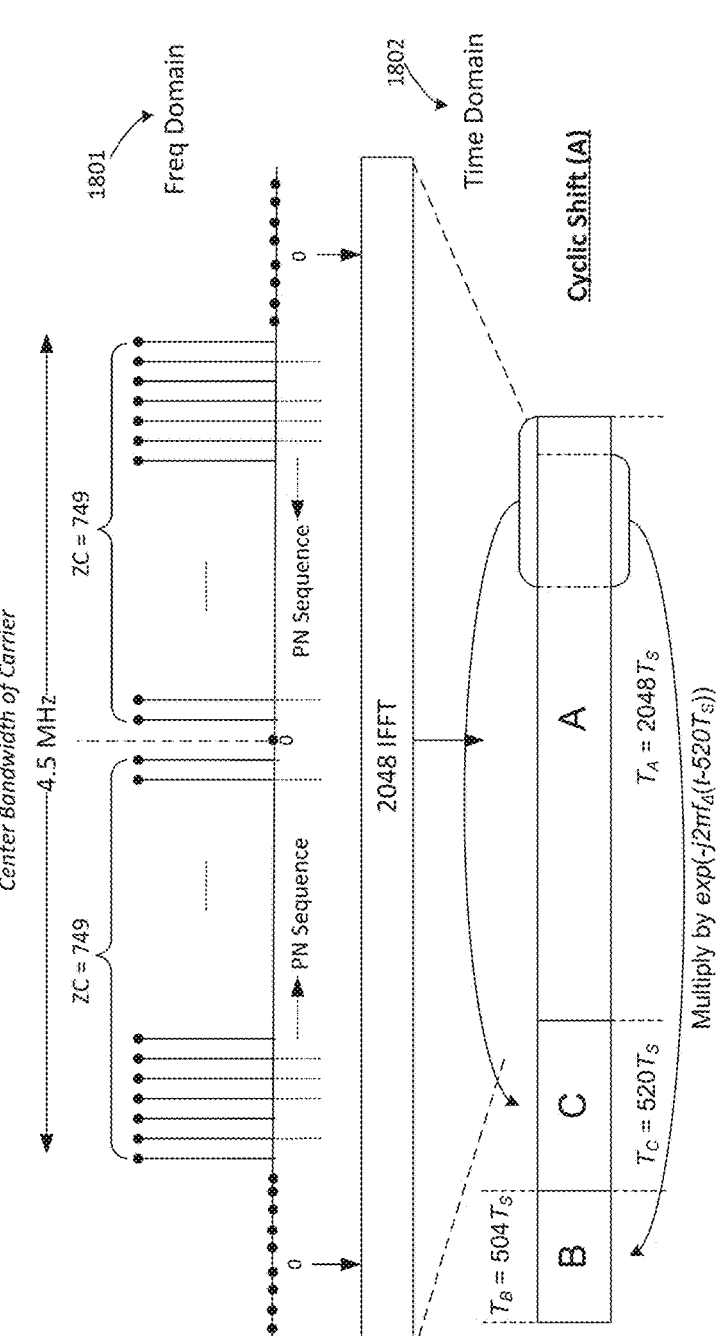
FIG. 18 illustrates $2^{nd}$ VFS symbol in the frequency and in time domain (BCA time domain structure) accomplished by scaling A/321 used in ATSC 3.0, according to some aspects of this disclosure.

FIG. 18 illustrates example 1800 including the extended 1605 A/321 framework 1605 in the frequency domain 1801 and time domain 1802. There may be no changes in A/321 framework 1800 for D2M, according to some aspects of this disclosure.

FIG. 19 illustrates an example 1900 of L1 VFS RRC signaling 1606 for mobile and virtual frame reception para-digm, according to some aspects of this disclosure. The 1901 L1 VFS RRC OFDM numerology is shown. According to some aspects, the L1 VFS RRC signaling 1901 is the place to start for the UE to get synchronized to time (PTP, NTP) quicky and be informed of any emergency alerts and to locate all slices with content and or data inside virtual frame container in case of 6 MHz allocation example.

In some aspects, signaling 1903 quickly enables UE time synchronization PTP at physical layer and NTP which is used IP content data flows above layer 3.

In some aspects, 1904 provides high priority signaling and uses 2-8 bits, with 4 bits shown in the example. According to some aspects, the high priority signaled can be various emergency alerts including weather alerts for users when mobile and inside affected geographic alert area. Syntax 1904 indicates that emergency alert is active and additional information follows. Using 98 bits signaling shown UE can quickly locate slice virtual frame container with active emergency information.

According to some aspects, the UE interface could be designed to automatically tune to slice with emergency information without requiring user interaction, and could provide user choices how to be informed for different priority of alerts, etc. In some aspects, some alerts such as national emergency may always be quickly tuned automati-cally for information from the President or other government officials.

In some aspects, 1906 enables UE to locate all ATSC 3.0 slices with some D2M UE capable of dual ATSC 3.0 and D2M reception by co-existence being forward compatible.

In some aspects, 1907 indicates that when a UE is already time synchronized and has RRC signaling such as continued reception state or the RRC provided via broadband using PTP it can tune directly to a Slice_ID in explicit virtual frame # for quicker access without using 1902 VFS. This will be disclosed under subject of Zadoff Chu access pro-cedures (ZAP) later.

FIG. 20 illustrates an example 2000 of the D2M UE not time synchronized PTP network and virtual frame is per-forming initial access using L1 VFS symbols 1602, accord-ing to some aspects of this disclosure. According to some aspects, the UE 2001 performs ZAP and uses first symbol to synchronize and identify start of virtual frame and second symbol to receive high priority signaling. According to some aspects, using 1902, VFS RRC signaling 2002 is used for UE quick PTP and NTP time synchronization. When emer-gency alert active 2003 signaling directs UE to Slice ID to quickly receive related emergency information. According to some aspects, the 2003 signaling can also direct the UE to other RF carriers RF ID and virtual frame number to consolidate into one or two RF carriers for large population UE and RF carriers to tune for increased network efficiency load balance and redundancy.

As will be discussed later, the UE continued service reception and intelligent RAN modes L2 RRC signaling extend A/322 and A/330. According to some aspects, emer-gency alert flag bits when set L2 layer will notify user and or steer UE automatically to L1 VFS and 2003 to be vectored to emergency information, depending on priority of alert and choices made by user to be notified for different priority alerts and or mobile UE current geographic location, etc. Also, UE can monitor VFS symbols 1602 periodically for emergency alert flags 1602 second symbol when UE 3200 is in low power states. Also, low cost UE device is built to only monitor symbols 1602, but also to receive accurate time transfer NTP and or provide priority alert information when active.

According to some aspects, with multiple BVNO 708 sharing multiple 723 RF carriers 732, it is more efficient to consolidate emergency information when active to be provided by one or two slices, rather than have all slices on all RF carriers carry same alert information and thus using broadcast spectrum inefficiently in times of emergency if approved by government in a country.

In some aspects, 2004 provides binding PLP_ID 8 bits and Slice_ID 8 bits and offset L1 Slice Start (SS) symbols 10 bits in milliseconds from start of virtual frame. Therefore, UE can look for content data on a PLP-ID quickly locates Slice_ID with PLP_ID and start L1 SS symbols. When slice is accessed, needed L1 and L2 signaling can be provided and the IP multicast content data signaled by Sub-Stream ID (SID_ID 8 bits), which is to be discussed, is received using NTP on upper layers. This can happen quickly using only L1 and L2 signaling. Further, in some aspects, UE 2001 is App driven and can use both broadcast and broadband to receive RRC signaling.

In some aspects, 2005 points to all ATSC 3.0 slices start positions inside virtual frame using milliseconds offset from start virtual frame using 10 bits shown. According to some aspects, 2006 shows A/321 min_time_to_next 100 signaling for ATSC 3.0 UE agnostic to virtual frame. With 1606 two L1 VFS RRC symbols, this may allow robust polar codes and QPSK to be used and 2007 indicates reserved signaling capacity expected for future in this one example.

Figure 21:
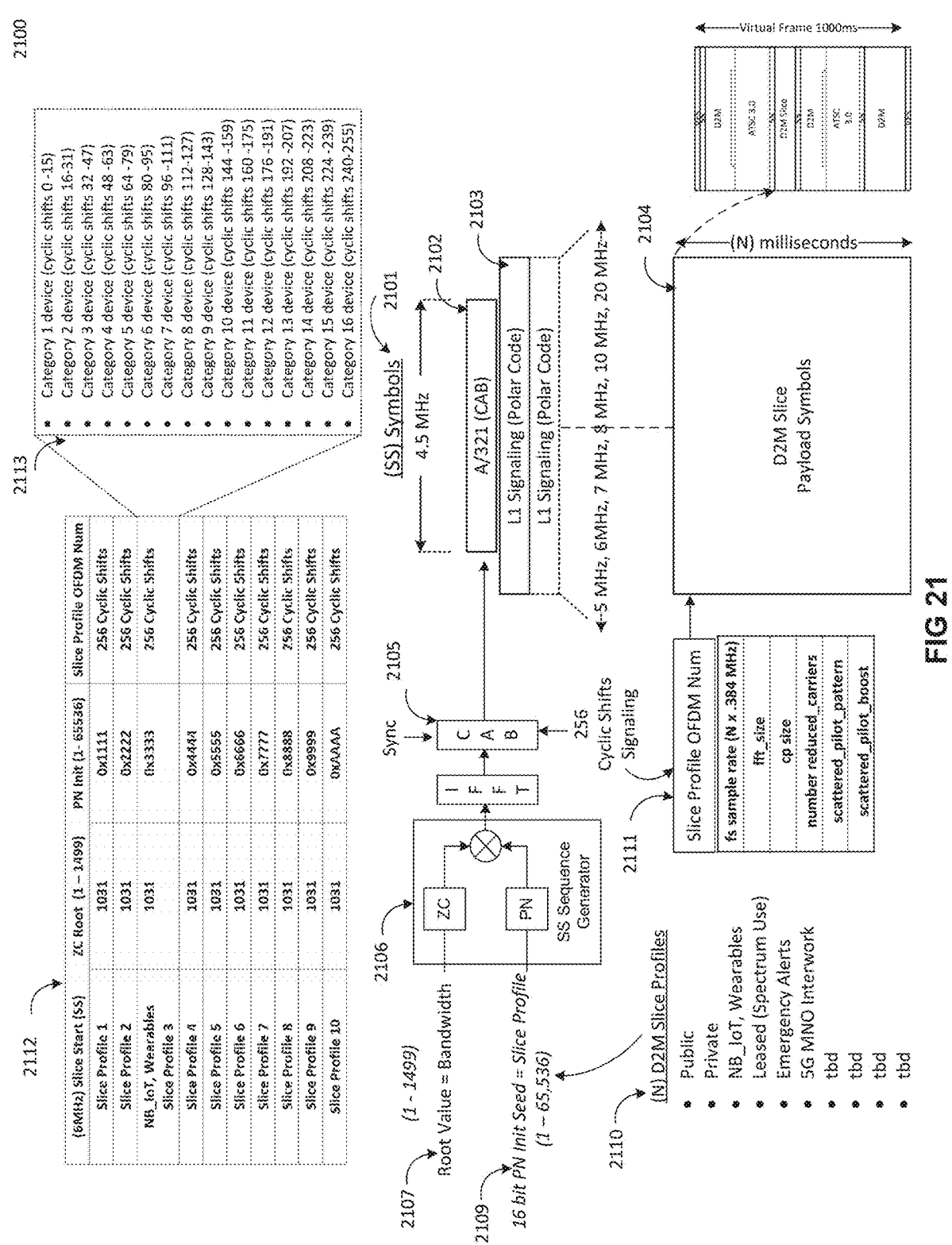
FIG. 21 illustrates one example of L1 Slice Start (SS) symbols and signaling syntax and semantics to enable slice profiles for quick access of D2M services and innovative profile categories to increase use of broadcast spectrum, according to some aspects of this disclosure.

FIG. 21 illustrates an example 2100 of slice start (SS) symbols 2101, including one CAB symbol 2102 and one or more RRC L1 signaling symbols 2103 preceding slice payload symbols 2104 inside virtual frame, according to some aspects of this disclosure. The duration of (SS) symbols 2101 and slice payload symbols 2104 is an integer number of milliseconds with SS offset of integer number milliseconds from virtual frame start, according to some aspects of this disclosure. According to some aspects, signaling 1900 may be used to direct UE to Slice Start (SS) Symbol with Slice_ID and with PLP_ID, as previously discussed.

In some aspects, CAB 2105 extends A/321 for 1st CAB symbol 2102 for UE synchronization and discovery of the slice. According to some aspects, the SS sequence generator 2106 aligns 1605 A/321 framework with new value of Zadoff Chu (ZC) root and new value 16 bit PN Init chosen with new syntax and semantics to be discussed for D2M.

According to some aspects, the SS sequence generator 2106 has ZC with a root value 2107 that indicates RF carrier bandwidth of 2104. For the example 1611 of an example of 6 MHz, and the example 2112 of an example of 6 MHz both CAB symbols (VFS, SS) may have the same root value 1031 indicating RF carrier bandwidth is 6 MHz.

According to some aspects, the SS sequence generator 2106 also has 16 bit PN sequence and PN Init value selected for SS CAB indicates the D2M slice profile 2110.

According to some aspects, the (N) slice profiles 2110 can have 10 slice profiles. The slice profile may indicate the service type or use case using broadcast spectrum. According to some aspects, the D2M is APP application driven and various service types can be defined such as public, private, NB_IoT and wearables, leased spectrum, emergency alerts, 5G MNO interworking, to mention a few. Each ZC+PN 2105 CAB symbol has 256 cyclic shifts which indicates the slice profile OFDM numerology 2111 of 2104 which would vary by type of service.

According to some aspects, these slice service types can be identified at L1 physical layer using correlation techniques on UE which searches for (ZC+PN) using root and PN Init values assigned. This means a slice profile can be defined to optimized service and conserve battery for IoT or wearables use cases as well as full live entertainment such as sports that would reside in another slice profile. The UE saves time and battery by locating slice quickly at physical layer using correlation then UE continues processing signal upper layers else, ignores if no correlation.

According to some aspects, the example 2112 of an example table for 6 MHz shows the 10 slice profiles each has the same ZC root value (i.e., 1031) and a unique PN Init value shown for each profile. The values of PN Init selected for same Root value (ie., 1031) may each have near ideal auto-correction and low cross-correlation between all other ZC+PN sequences. Each profile may potentially have 256 unique slice profile OFDM numerology parameters, which is actual more than is needed.

According to some aspects, to increase flexibility and enable more use cases, 2113 shows example for NB IoT and wearable slice profile. According to some aspects, the CAB 2105 having 256 cyclic shifts are divided into 16 groups each with 16 cyclic shifts indicating slice OFDM numerology parameters. The 16 groups can be defined via a lookup table on UE for device category as shown 2113. The UE APP application can be designed to manage the processing of each device category. In contrast to ATSC 3.0 and use of A/321 ZC+PN which only one profile is defined for digital television.

According to some aspects, for D2M including using disaggregation and cloud many slice profiles can be defined and processed by software APP on UE to enable innovation using broadcast spectrum including aligned and converged interwork with 5G, as will be discussed. The 2112 table with 10 slice profiles each could define 2113 16 device categories or use cases.

According to some aspects, 2112 would give 10×16 or 160 unique slice profiles using syntax and semantics discussed for 6 MHz. Each RF carrier bandwidth indicated by CAB root value could have 160 slice profiles supported by L1 and L2 extended signaling discussed.

According to some aspects, the 2110 slice profiles show leasing of broadcast spectrum slices, and this use case has been encouraged and approved by FCC regulations in US for innovation called broadcast internet in 5G era.

According to some aspects, for D2M there is nothing changed in the ATSC 3.0 standard for legacy 3.0 UE, and evolution ATSC 3.0 fixed services can continue autonomous of D2M or can be harmonized. Because of forward compatibility and co-existence there may be no technical constraint prohibiting harmonizing fixed television with mobile services using broadcast architecture disclosed, if the use case makes sense.

FIG. 22 illustrates the two methods according to which D2M was designed to be implemented, according to some aspects of this disclosure. Furthere, D2M has been designed to be independent of ATSC 3.0 to have freedom to innovate. However, in some countries like US the regulations require ATSC 3.0 to continue for some period of time and 2201 shows D2M co-existence with ATSC 3.0 dynamically sharing spectrum. The 2202 shows coordinating of ATSC 3.0 and D2M schedulers required.

According to some aspects, 2203 is for a country with regulations that permit a greenfield to innovate with broadcast spectrum and D2M is shown standing alone in spectrum and single D2M scheduler 2204.

Figure 23:
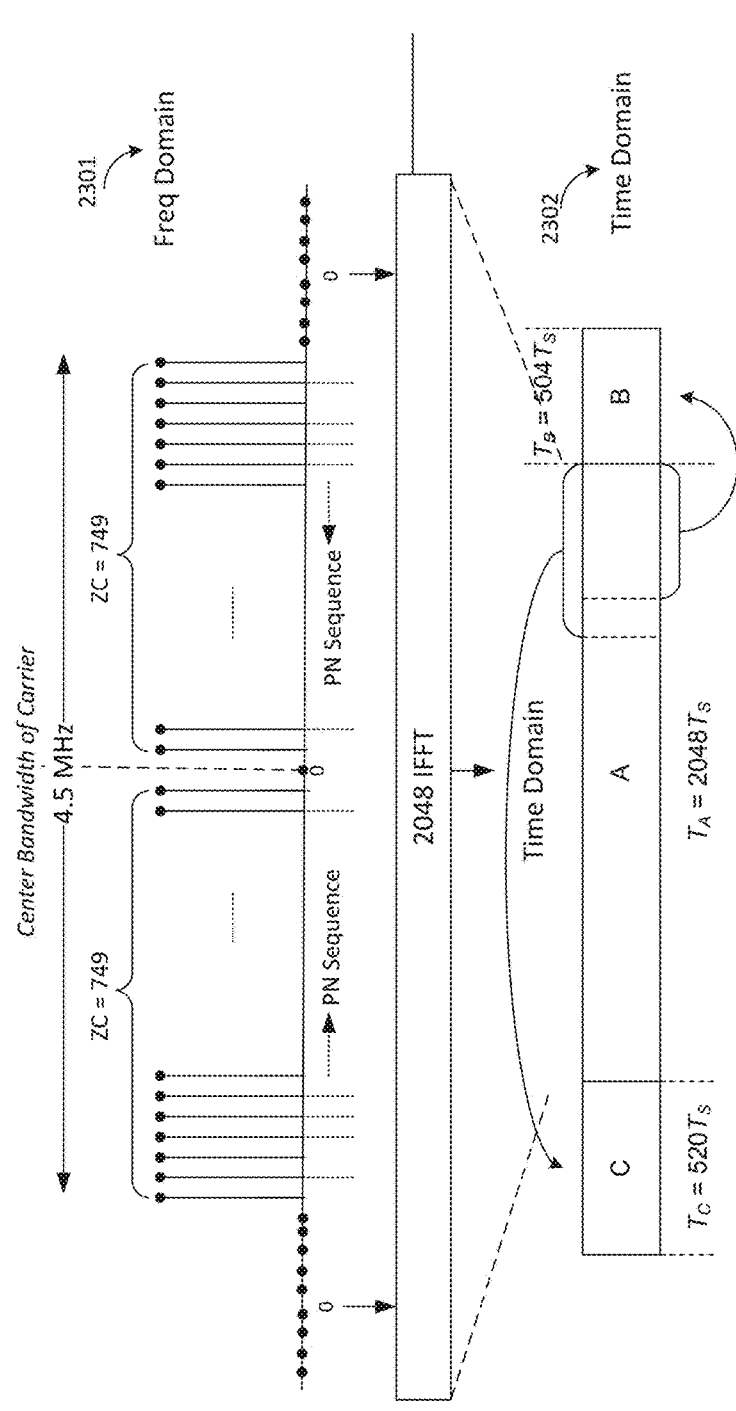
FIG. 23 illustrates virtual frame container L1 SS symbol in frequency and time domain (CAB time domain structure) accomplished by scaling A/321 for UE synchronization and quick access, according to some aspects of this disclosure.

FIG. 23 illustrates example 2300 including the extended A/321 framework 1605 in the frequency domain 2301 and time domain 2302, according to some aspects of this disclosure. There are no changes in A/321 framework 2300 for D2M, according to some aspects of this disclosure.

FIG. 24 illustrates an example 2400 of L1 slice start RRC signaling, according to some aspects of this disclosure. According to some aspects, 2401 is first slice start symbol and 2402 is L1 SS RRC symbol being discussed, according to some aspects of this disclosure. In some aspects, 2403 is one example of syntax and semantics to be used to disclose virtual frame signaling.

According to some aspects, the slice_ID 8 bits is shown at the top of 2403. The UE has set a correlator to search for L1 SS symbols using 16 bit PN Init value 2109 from table 2112 for the slice profile selected.

According to some aspects, the 2404 slice start signaling, shown bracketed in 2403, provides quick D2M UE PTP and NTP synchronization which is essential for virtual frame access.

According to some aspects, the 2405 slice start signaling, shown bracketed in 2403, enables UE to locate PLP and service mapped to OFDM symbols in slice.

According to some aspects, the 2406 slice start signaling, shown bracketed in 2403, enables UE to LDPC decode PLP and service mapped to QAM constellation in OFDM symbols in slice. According to some aspects, the 2407 slice start signaling, shown bracketed in 2403, enables UE to identify number IP multicast services with unique sub-stream ID (SID_ID) value 8 bits located in PLP_ID. The SID_ID will be discussed later, and L2 signaling the SID_ID is identified in the L2 ALP link layer packet header of IPv4 packets with mobile services. Then binding with L2 link layer signaling table to IP address and UDP port number and content media_ID 16 bits of a service. This enables mobile UE to quickly filter multicast services directly at the L2 link layer and this increases the mobile UE service access speed and battery savings as will be disclosed.

Figure 25:
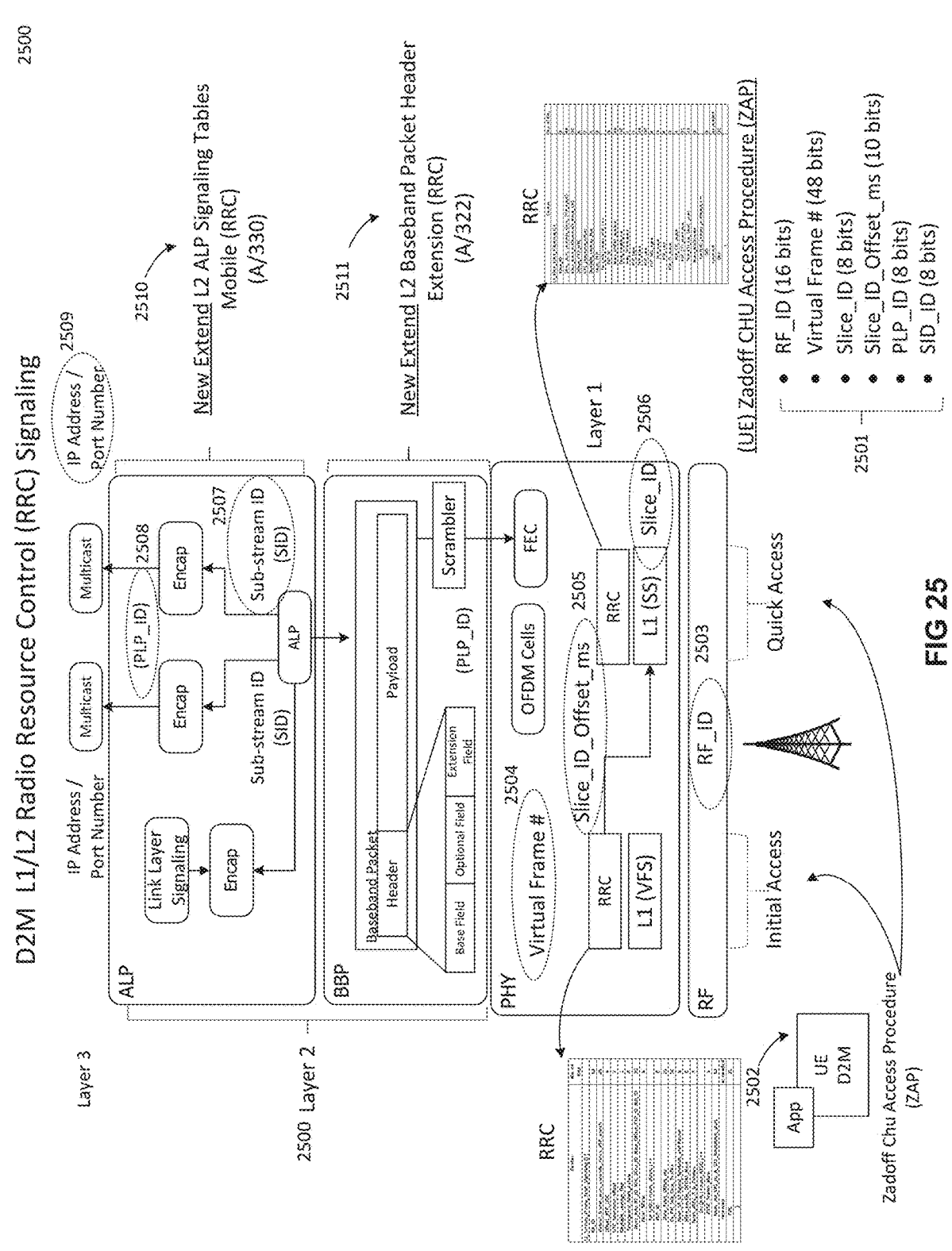
FIG. 25 illustrates L1 and L2 (RRC) signaling with the L2 (RRC) signaling realized by extending the A/330 and A/322 standards, according to some aspects of this disclosure.

FIG. 25 illustrates an example system 2500 of the logical hierarchical signaling architecture 900 of D2M L1 and L2 radio resource control (RRC) signaling, according to some aspects of this disclosure. According to some aspects, 2501 shows Zadoff Chu Access Procedures (ZAP). The syntax of the signaling 98 bits 2501 can be assumed to be made available to 2502 UE and APP by some means broadcast or broadband to start ZAP for virtual frame access.

In some aspects, RF_ID 2503 16 bits can uniquely identifies the RF carrier using 700 broadcast architecture; the virtual frame number 2504 of 48 bits is PTP seconds value at instant virtual frame starts emission air interface of antenna. According to some aspects, the Slice ID 2506 has 8 bits signals slice in virtual frame. The Slice_ID_offset ms 2505 of 10 bits signals offset from VFS instant the slice starts and is located inside virtual frame container. The PLP_ID 2508 of 8 bits is virtual physical layer pipe which has different L1 OFDM numerology coding and modulation robustness per use case or slice profile. The SID_ID 2507 is of 8 bits signals IP multicast service inside PLP_ID.

In some aspects, IP address 2509 and UDP Port number of IP multicast service can be provided in extend A/330 ATSC Link Layer Protocol (ALP) for mobile RRC 2510, which is to be discussed. Also, the extended A/322 RRC signaling 2511 Baseband Packet (BBP) Header for mobile quick access and intelligent broadcast RAN to be disclosed.

Figure 26:
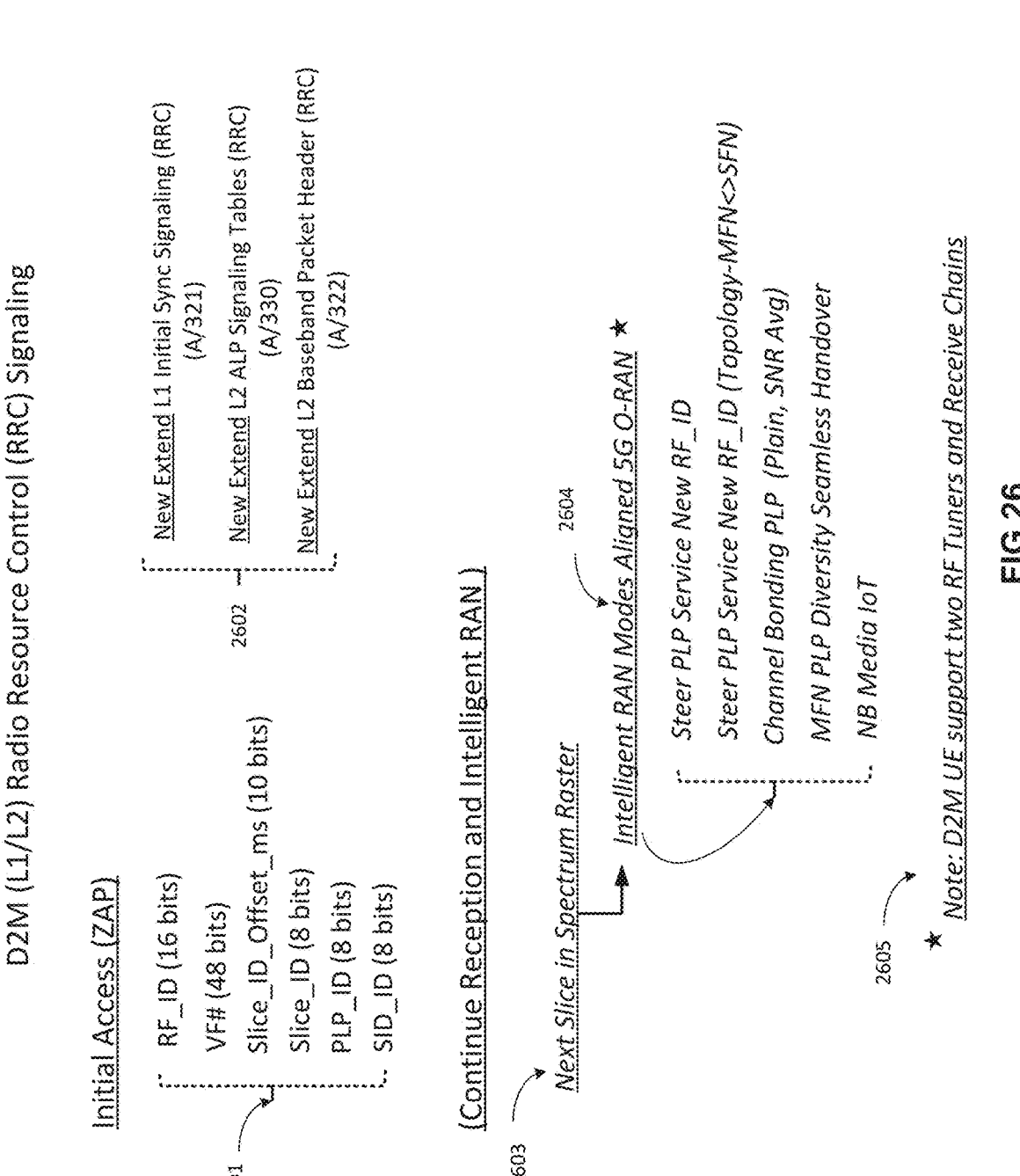
FIG. 26 illustrates D2M L1 and L2 RRC signaling syntax initial access, continued reception and Intelligent RAN modes aligned 5G O-RAN principles, according to some aspects of this disclosure.

FIG. 26 illustrates an example 2600 of D2M L1 and L2 radio resource control (RRC) signaling syntax, according to some aspects of this disclosure. According to some aspects, 2601 is initial access (ZAP) 98 bits just discussed with respect to system 2500. According to some aspects, the 2602 shows A/321, A/330 and A/322 standards that are extended to enable signaling for mobile. The A/330 and A/322 L2 layer signaling will be discussed that can help enable 2603 continued reception in slice raster and other modes and use cases.

It should be appreciated that unlike ATSC 3.0 that has one access mode fixed television service, the D2M mobile UE is provided signaling and multiple modes that achieves goals of quick access and battery saving and new broadcast use cases for spectrum using an intelligent broadcast RAN.

In some aspects, 2604 shows some of intelligent broadcast RAN modes that will be discussed later. It should be noted 2605 that several diversity modes can be used in time, frequency, and space, and receive antenna will bring robustness and spectrum efficiency. In some aspects, some diversity modes will require UE with two RF tuners and receive chains for bonding modes, which some have already been specified in A/322, but 200, 300 architecture A/324 prohibit efficient implementation.

Figure 27:
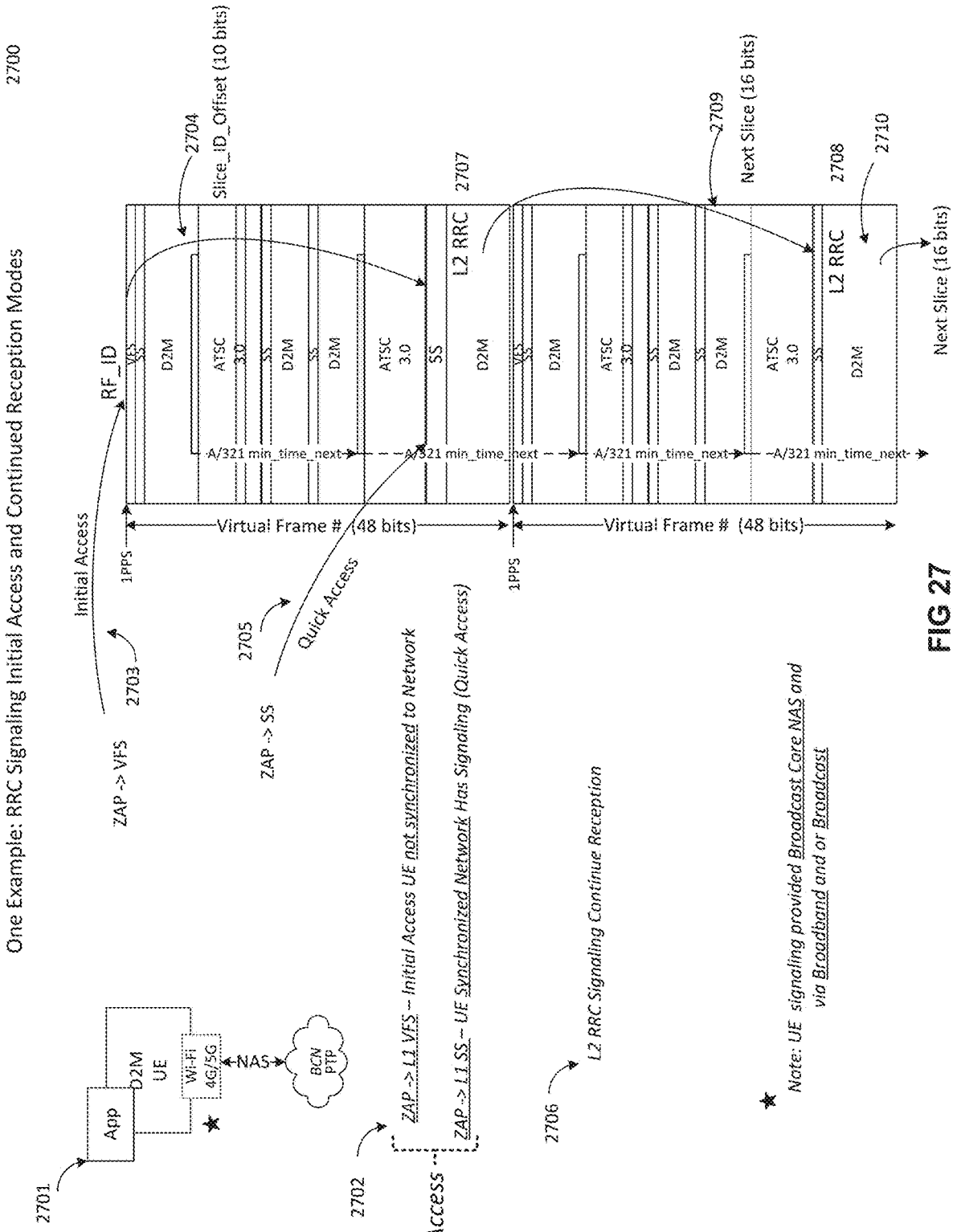
FIG. 27 illustrates one example L1 and L2 RRC signaling for both initial and quick access and continued reception of slices of data, video service, etc., according to some aspects of this disclosure

FIG. 27 illustrates an example 2700 of RRC signaling modes for initial access and then continued reception and UE switching between modes to continue receive IP service spanning multiple slices in multiple virtual frames over time for battery savings, according to some aspects of this disclosure.

In some aspects, FIG. 27 illustrates mobile UE 2701 and an APP that has broadcast and broadband access to receive RRC signaling. According to some aspects, 2702 shows two modes for access (ZAP) using L1 VFS when UE not synchronized and L1 SS for quicker access when UE is synchronized and has RRC signaling.

In some aspects, 2703 shows ZAP using L1 VFS, that was discussed earlier, and Slice_ID_Offset_ms (10 bits) 2704 is obtained which points to start of Slice_ID in virtual frame as shown. According to some aspects, the other 2705 mode ZAP uses L1 SS and UE is time synchronized and knows Slice_ID start in virtual frame this allows quicker access than 2703 to reach the same point the slice start and will save UE battery.

In some aspects, 2706 shows L2 RRC signaling to be discussed is shown at 2707 and 2708. According to some aspects, the UE enters continued reception mode at 2707 with 2709 L2 signaling used to signal next slice in the next virtual frame. At 2708 L2 RRC signaling, 2710 is used to signal next slice in the in next virtual frame. This saves battery UE by not requiring ZAP access using 2703 every virtual frame but using 2705 to continue reception unless UE becomes unsynchronized and 2703 rejoins reception.

In some aspects, in 3600, the next slice 2709 of 16 bits is defined using L2 BBP RRC signaling as 6 bits indicating number of seconds or virtual frames plus 10 bits. Indicating slice_offset_ms for start next slice of service indicated by SID_ID in PLP_ID for file transfer use cases. According to some aspects, 3600 discusses intelligent broadcast RAN modes aligned principles 5G O-RAN with extended A/321, A/322, A/330 standards for co-existence and backward and forward compatibility.

In some aspects, in 3800, the next slice 2710, which is 16 bits, is defined using L2 BBP RRC signaling as 6 bits indicating number of seconds or virtual frames plus 10 bits. According to some aspects, indicating slice_offset_ms for start next slice of service indicated by SID_ID in PLP_ID for media use cases. According to some aspects, 3800 discusses intelligent broadcast RAN modes aligned principles 5G O-RAN with extended A/321, A/322, A/330 standards for co-existence and backward and forward compatibility.

FIG. 28 illustrates examples 2800 of L2 RRC signaling achieved by extended A/322 standard at L2 MAC layer or Base Band Packet (BBP) by using extension header BBP to provide L2 RRC signaling 2801 to be discussed, according to some aspects of this disclosure.

According to some aspects, the A/330 standard is extended at L2 link layer using ALP additional header 2802 signaling and defining ALP link layer 2803 mobile signaling tables including support for SID_ID 8 bits and Media_ID 16 bits 2804 to enable packet filtering L2 link layer instead of Layer 3 for quicker access.

According to some examples, the A/322 and A/330 standards are touched only to enable mobile signaling and can also be used as baseline for mobile services with changes only to optimize mobile and battery savings, etc. This will help ensure forward compatibility and harmonization with ATSC 3.0 optimized for fixed if desired.

Figure 29:
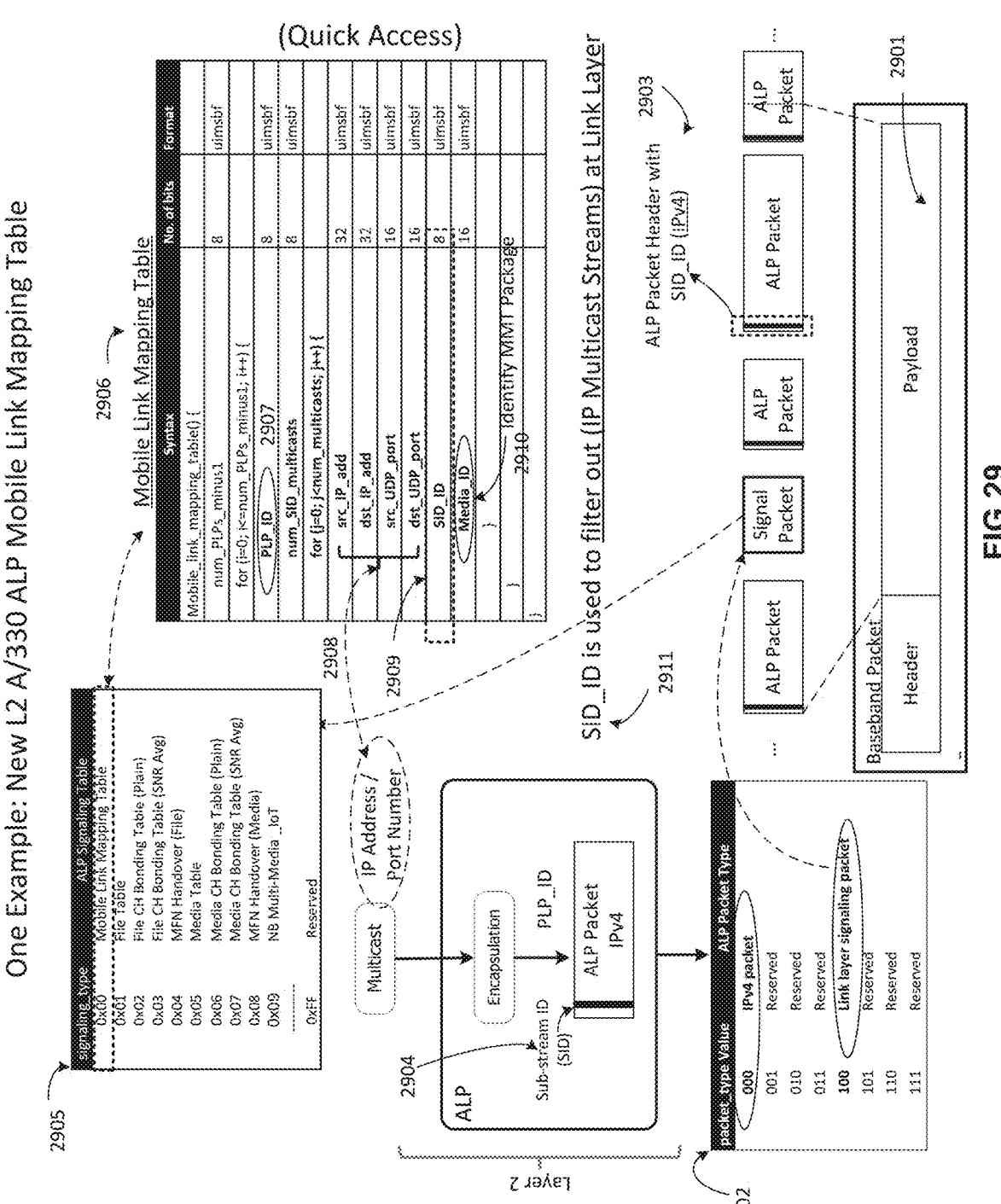
FIG. 29 illustrates one example of L2 mobile link mapping table extension A/330 to enable quick service access by filtering Internet Protocol (IP) Multicast services at the L2 link layer, according to some aspects of this disclosure.

FIG. 29 illustrates an example 2900 of extended A/330 standard and creation of ALP L2 mobile link mapping table 2905, according to some aspects of this disclosure. According to some aspects, the ALP Input packet types encapsulated in ALP 2902 can be IPv4 packets and or ALP link layer signaling packets as the payload 2901 in A/322 Baseband Packet BBP as shown.

In some aspects, ALP IPv4 packet header 2903 has SID_ID 2904 used to quickly filter out IP Multicast packets 2911 at the L2 link layer using mobile link layer signaling table 2906 to be discussed.

According to some aspects, the ALP mobile signaling table 2906 has PLP_ID 2907, which is 8 bits, and IP multicast address and UDP Port number 2908 for service. The SID_ID 2909, which is 8 bits, identifies bind service with PLP_ID, IP multicast address and UDP port number and Media_ID 2910, which is 16 bits, to identify content such an Moving Pictures Experts Group (MPEG) Media Transport MMT package to enable quick access to services above layer 3 discussed later.

Figure 30:
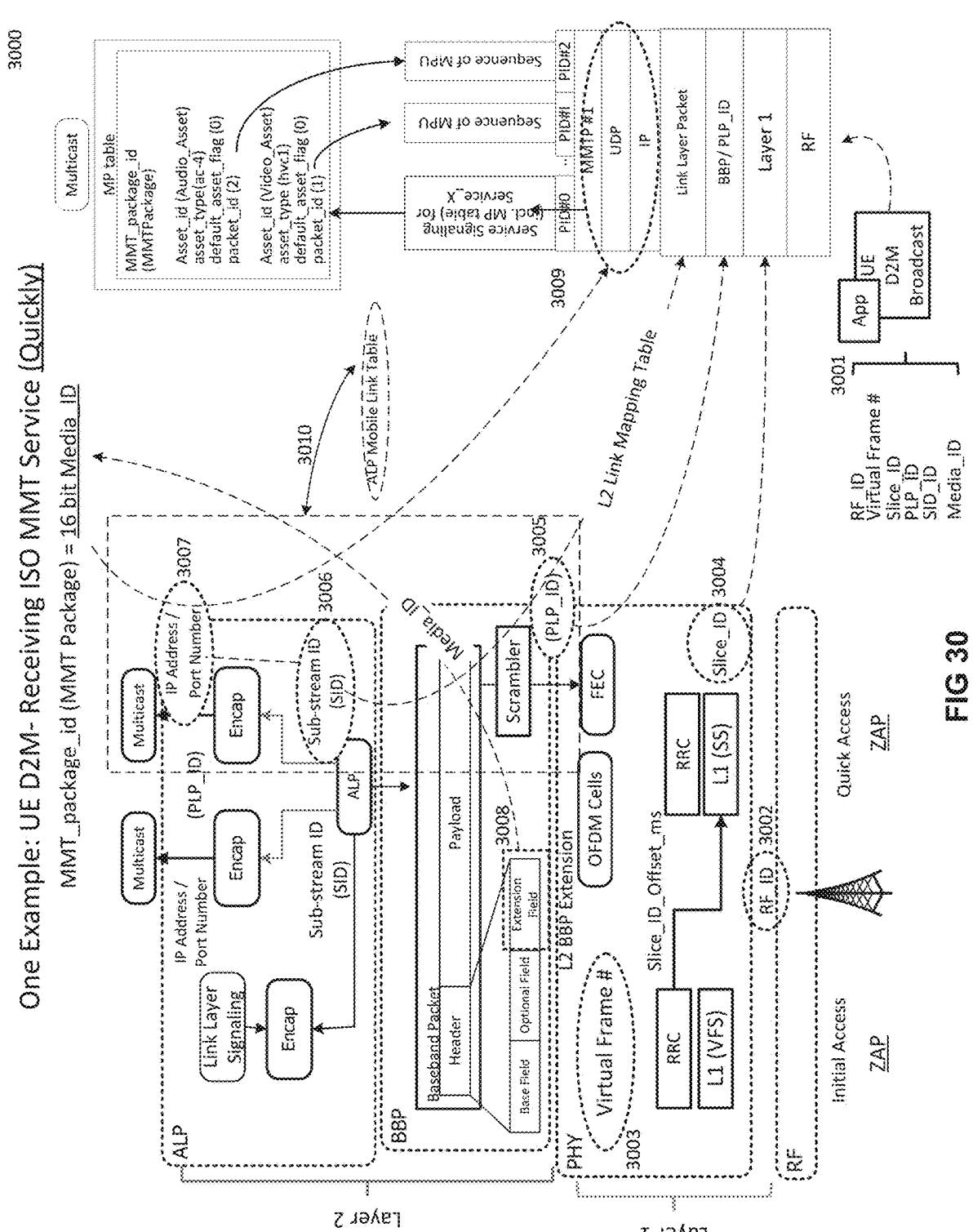
FIG. 30 illustrates one example of D2M and L1 and L2 radio resource control (RRC) signaling used to receive International Standards Organization (ISO) Moving Pictures Experts Group (MPEG) Media Transport (MMT) package or service quickly, according to some aspects of this disclosure.

FIG. 30 illustrates an example 3000 of D2M and L1 and L2 signaling by extended A/321, A/322, A/330 standards to receive a media service such as MMT_package_id identified by Media_ID 16 bits BBP header extension 3008 for quick mobile service reception, according to some aspects of this disclosure.

In some aspects, 3001 shows quick ZAP access using signaling syntax and semantics previously discussed provided via broadcast and or broadband to D2M UE and APP shown. According to some aspects, using RF_ID 3002, the UE tunes to RF carrier and virtual frame number 3003 and slice indicated by Slice_ID 3004 is located layer 1. Using PLP_ID 3005 OFDM resources, the L2 BBP signaling and L2 ALP mobile signaling table 3010 are recovered.

According to some aspects, the IPv4 in ALP packets with SID_ID 3006 are filtered L2 using the IP address and UDP number 3010 and PLP_ID 3005 and SID_ID 3006 and Media_ID 3008. The IPv4 packets 3009 carried by ALP are recovered and using 3007 and 3008 Media_ID indicating MMT_package_id is used to parse MMT signaling MP table PID #0. To locate audio content MPU sequence PID #2 and video content MPU sequence PID #1, the content is decoded and presented to mobile user using MMT protocol in this example.

FIG. 31 illustrates system 3100 including UE 3101 with 3106 signaling perform ZAP using RF_ID 3102, Virtual Frame #, Slice_ID Profile, Slice_OFDM_Num, PLP_ID, SID_ID and selecting only the IPv4 packets for service 3105 MMT package_id signaled by Media_ID, according to some aspects of this disclosure.

Therefore, quickly selecting one of the four independent IP services at L2 link layer saves battery of UE 3101 by minimizing amount of processing required by UE. The other SID_ID service on same PLP_ID and everything associated other PLP_ID and 2 services may be ignored. According to some aspects, layer 1 3103 and layer 2 3104 signaling for mobile is obtained by extended A/321, A/322, A/330 standards.

According to some aspects, to indicate flexibility, the 3100 signaling of the Slice_ID Profile shown can support 256 Slice_OFDM_Num per 3108 slice profile that each can support 256 SID_ID 3107 for independent IP services.

According to some aspects, using 3100 and 3107 SID_ID 8 bits now imagine that a muti-media radio APP 3101 is developed for 100 audio radio services channels on PLP_ID 3109 using 100 unique SID_ID 3107. The APP using 3103, 3104 signaling may acquire only IPv4 packet and port #L2 link layer for radio channel user selected on APP ignoring other SID_ID 3107 to conserve UE battery.

Figure 32:
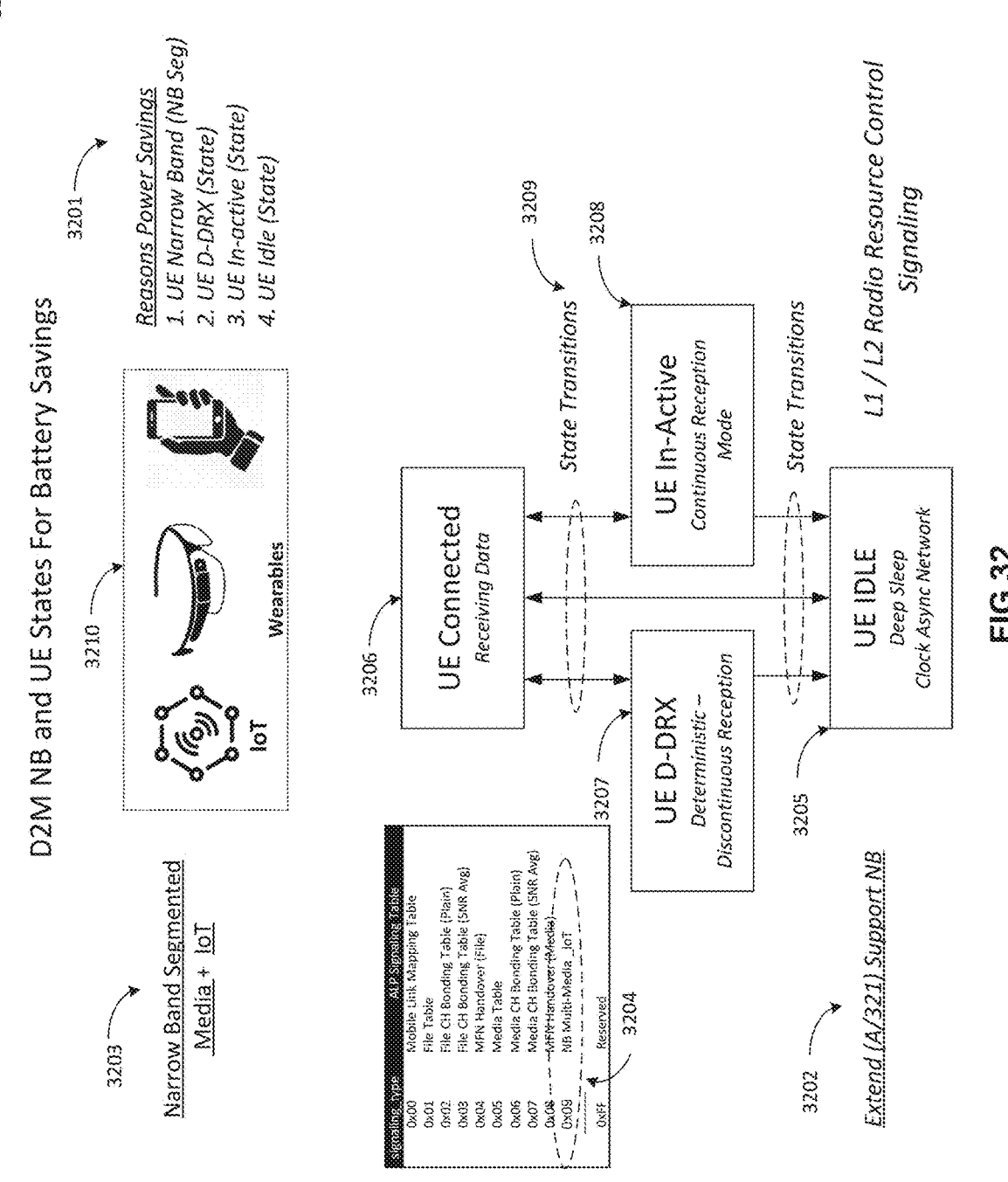
FIG. 32 illustrates D2M UE states to achieve battery savings including narrow band segmented media, IoT services using L1 and L2 radio resource control (RRC) signaling, according to some aspects of this disclosure.

FIG. 32 illustrates exemplary system 3200 including D2M narrowband (NB) UE and states for battery savings, according to some aspects of this disclosure. The 3202 A/321 standard is scaled to enable 3203 NB segmentation in frequency domain for media and IoT services. In some aspects, 3210 use cases must conserve battery to be viable in market. According to some aspects, 3101 gives reasons for battery savings either NB segmentation and or signaling assisting UE transitioning states to conserve battery using virtual frame access paradigm.

According to some aspects, supported by ALP link layer signaling table 3204, NB_IoT and UE states of UE idle deep sleep 3205. UE 3206 can be in connected state when UE receives data. UE can be in Deterministic Discontinuous Reception (D-DRX) state 3207 assisted by signaling and 3208 UE-Inactive state. The UE state transitions 3209 are assisted with L1 and L2 RRC signaling, to be discussed.

Figure 33:
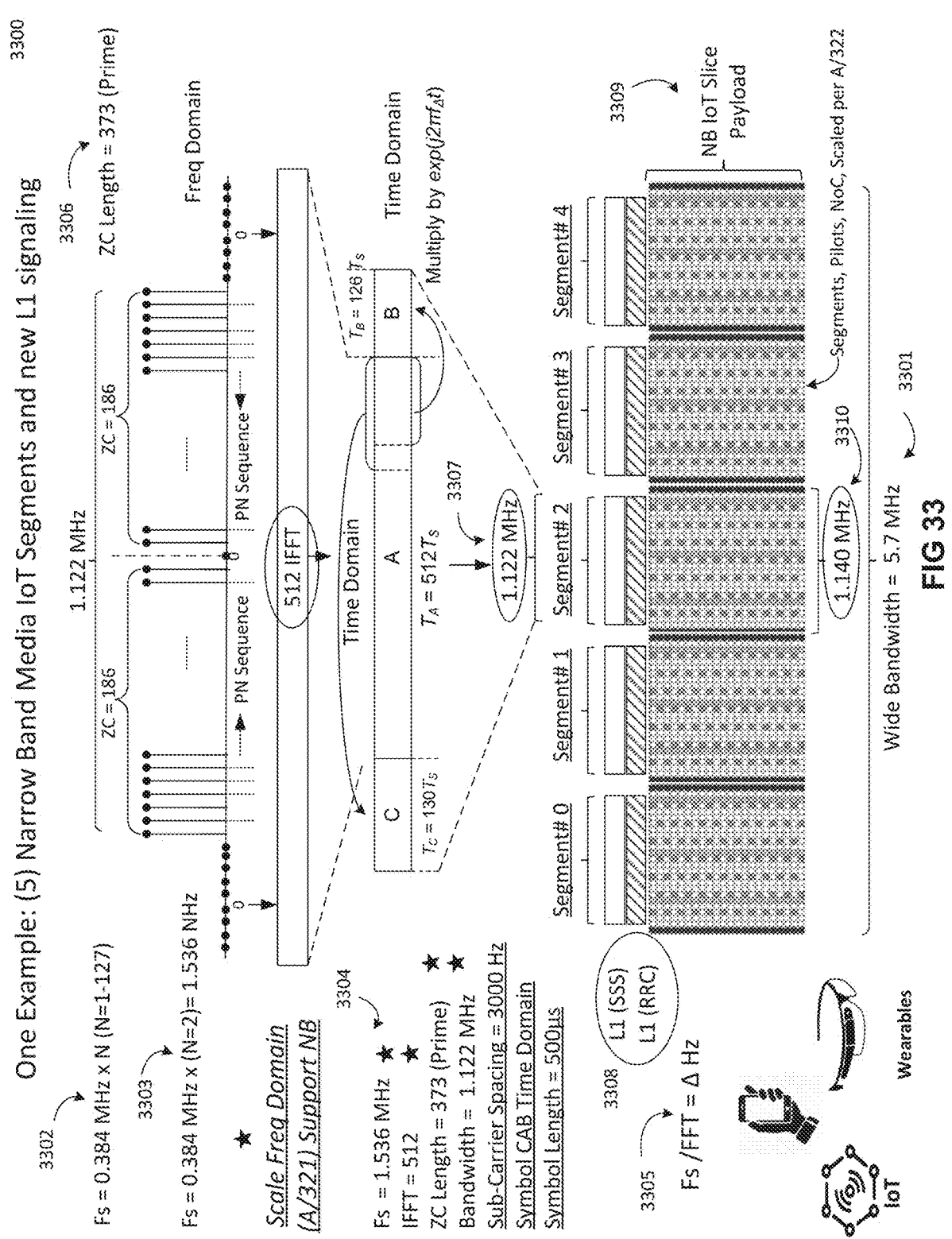
FIG. 33 illustrates one example of five narrow band media and IoT segments achieved by scaling frequency domain A/321 standard. Forming L1 slice segment start (SSS) symbols and RRC signaling for narrow band media and Internet of Things (IoT) services enabling User Equipment (UE) battery savings, according to some aspects of this disclosure.

FIG. 33 illustrates one example 3300 using 6 MHz spectrum of achieving five (5) narrowband (NB) media or Internet of Things (IoT) segments of a slice and signaling by extended A/321, A/322, A/330 standards, according to some aspects of this disclosure. The NB segment reception reduces the processing required and UE battery savings 8× compared to wideband (WB) reception of same service in a WB slice.

By way of a non-limiting example, 3301 is WB orthogonal signal. Broadcast symbol sample rate equation, 3302, may be given as Fs=0.384×N (N=1-127). For NB use case 3303 (N=2) and Fs=1.536 MHz. The NB sample rate Fs=1.536 MHz, and 512 IFFT are both scaled down factor 4 from A/321 standard [6.144 MHz; 2048 IFFT].

In some aspects, given OFDM equation 3305 and scaling by factor 4 this holds the sub-carrier spacing at 3000 Hz the same as A/321 and is used in NB design. This also then keeps both the symbol length and CAB in time domain the same as A/321.

In some aspects, to achieve NB in frequency domain the ZC length is reduced to 373 [from 1499] and results in bandwidth 1.122 MHz [from 4.5 MHz] of A/321 standard. All details of OFDM numerology selected to enable NB use case by scaling A/321 is discussed with respect to example 3400.

In some aspects, 3306 shows Zadoff Chu (ZC) length=373 plus PN sequence mapping in frequency domain 512 IFFT. This results in 3307 bandwidth of 1.122 MHz for first two symbols of each segment. According to some aspects, the 3308 two symbols L1 (SSS) slice segment start and L1 RRC enable L1 synchronization and L1 RRC signaling for each independent NB segment and service.

In some aspects, NB payload 3309 is made of orthogonal wideband symbols which does not require a frequency guard band between NB segments. This may result in 3310 NB payload bandwidth of 1.140 MHz for segments, as will be discussed, and therefore NB is also spectrum efficient.

Figure 34:
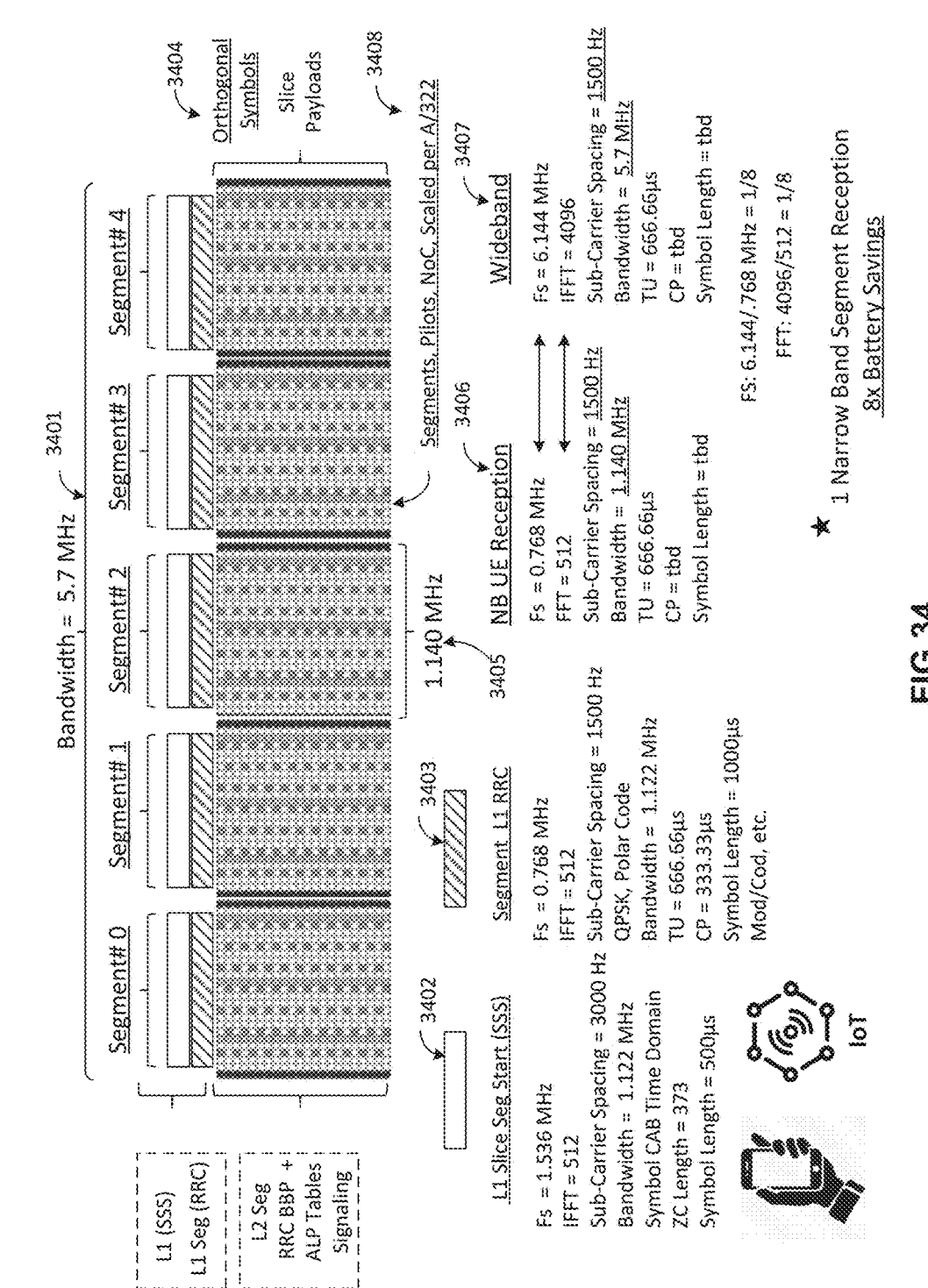
FIG. 34 illustrates OFDM parameters L1 SSS symbol and L1 RRC symbol and 8× battery savings UE narrow band reception, according to some aspects of this disclosure.

FIG. 34 illustrates an example 3400 with 5.7 MHz wider bandwidth 3401 and WB orthogonal payload symbols 3404 transmitted, according to some aspects of this disclosure. According to some aspects, using 3402 the UE synchronizes NB segment and using L1 RRC signaling 3403 enables NB 3405 1.140 MHz reception 3406 with 8× battery savings UE.

According to some aspects, the comparison NB 3406 and WB 3407 reception shows that the battery savings 8× is through reduced processing power to receive NB segment 3406 compared WB reception 3407. In some aspects, the design includes selecting NB 3406 Fs=0.768 MHz and 512 FFT sizes reduced factor 8 compared WB 3407 FS=6.144 MHz and 4096 IFFT for slice payload symbols 3404 results in constant sub-carrier spacing 1500 Hz for both WB and NB signals which is enabling.

In some aspects, this enables WB orthogonal payload symbols 3404 to be transmitted with IFFT 4096 and requires no guard band between independent segments using scaled A/322 3408. According to some aspects, use of 512 FFT and reduced FS=0.768 MHz for NB reception can be possible because 1500 Hz sub-carrier spacing is constant in frequency domain. So, 3402, 3403 are transmitted NB and received NB and 3404 transmitted wideband and received as NB with 8× battery savings compared to 3407 WB reception of the same service.

Figure 35:
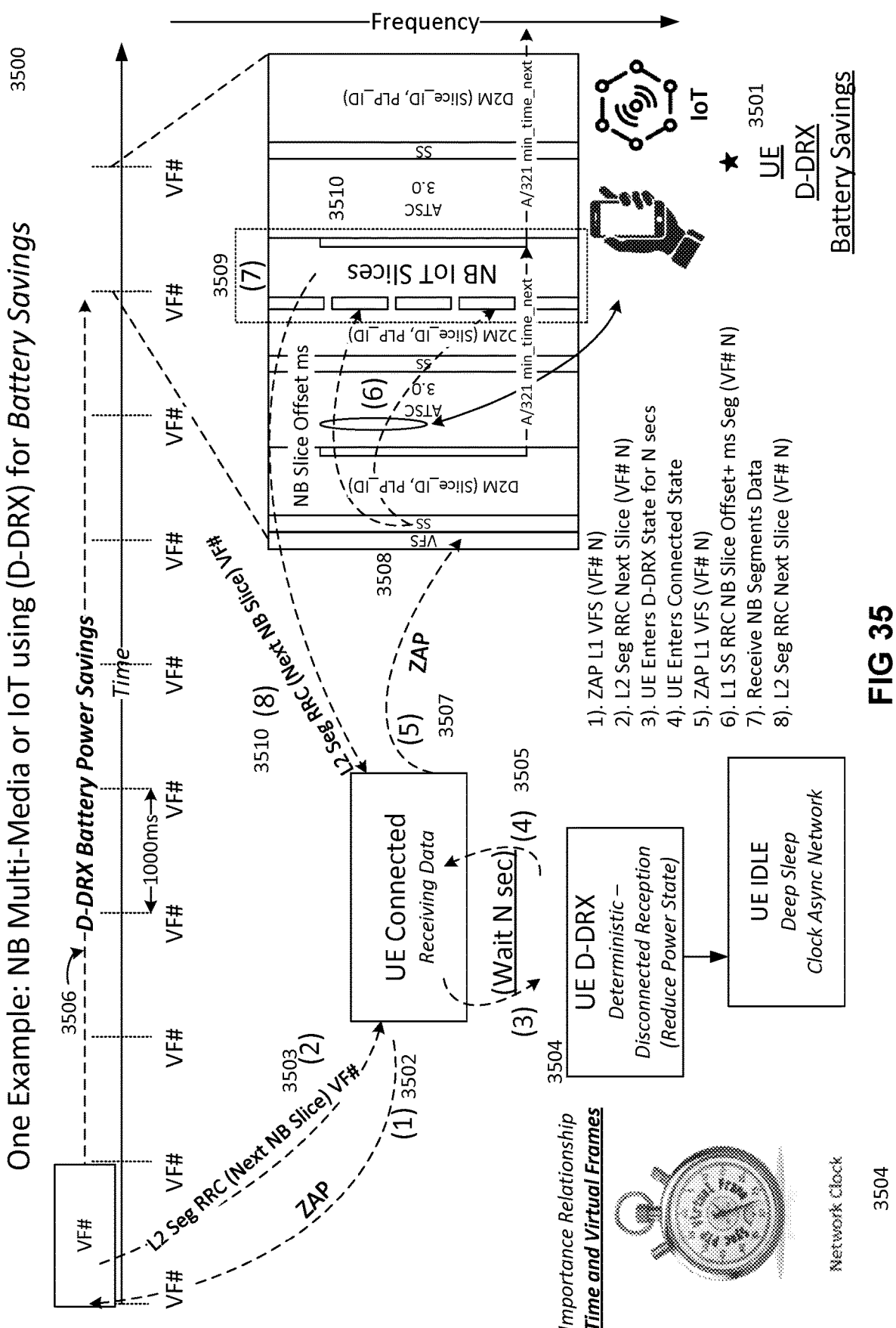
FIG. 35 illustrates additional battery savings using L1 and L2 RRC signaling to control UE state transitions for narrow band media and IoT services, according to some aspects of this disclosure.

By way of a non-limiting example, the reduced ZC length of 373 from 1499 results in about 6 dB less correlation gain for UE but this is offset by about 6 dB by NB reduced noise bandwidth of 1.140 MHz from 4.5 MHz FIG. 35 illustrates an exemplary system, 3500, including UE states 3200 assisted by L1 and L2 signaling to achieve additional UE battery savings in addition to NB 3400, according to some aspects of this disclosure. According to some aspects, the use case can be deterministic disconnected reception D-DRX leveraging deterministic 3504 one second cadence virtual frames assisted with L1 and L2 signaling to enable UE to go into a reduced power state D-DRX for a period time between transmissions of virtual frames with slice of a service.

According to some aspects, this can be used for both real-time media and non-real-time file transfer. For 3500, a file transfer over time at staggered intervals is considered, and 3600 introduces file transfer use case and details L2 signaling in broadcast Intelligent RAN.

By way of a non-limiting example, 3501 illustrates a procedure UE for D-DRX and battery savings. According to some aspects, the procedure starts at 3502 with UE in connected state and ZAP L1 VFS VF #N for reception of service. The service data can be received with L2 segment RRC signaling of the time of next NB VF #N 3503 using 6 bits seconds plus 10 bits for slice offset milliseconds next VF #N with service data.

In some aspects, UE 3304 enters reduced power state D-DRX for N seconds signaled 3503. According to some aspects, at the end of N seconds UE transitions back to UE connected state 3505. Looking at the timeline at top the UE is in D-DRX state 3506 for N virtual frames or seconds.

In some aspects, 3UE ZAP 3507 L1 VFS VF #N for NB segment selected UE 3501 using 3503 and 3402, 3403. The 3509 service data can be received and a L2 seg RRC signaling 3510 of next NB VF #N 6 bits plus 10 bits for slice offset milliseconds is received by UE 3501 and the D-DRX cycle repeats until end of the service in this case file is received.

In some aspects, the amount of battery saved is proportional to time spent in D-DRX state 3504 and 3506 indicates 7 seconds. This savings is in addition to examples 3400. According to some aspects, the L2 RRC next slice signaling uses 6 bits to indicate the number of virtual frames or seconds until next frame (1-64 seconds). According to some aspects, IoT can be longer D-DRX for battery savings.

Figure 36:
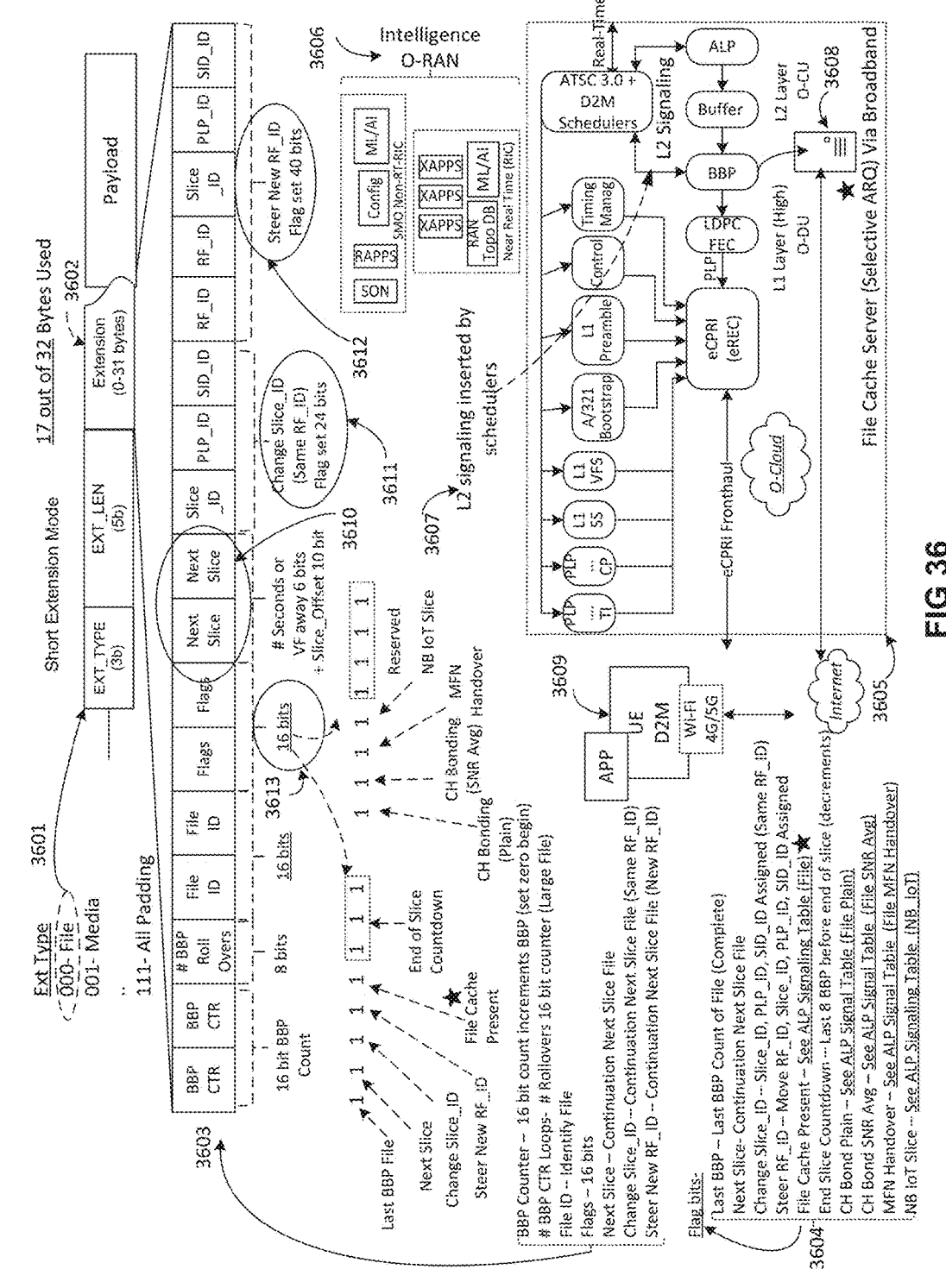
FIG. 36 illustrates one example Intelligent Broadcast RAN modes aligned 5G O-RAN principles and using L2 RRCsignaling extension A/322 standard, according to some aspects of this disclosure.

FIG. 36 illustrates an example system 3600, for Intelligent Broadcast RAN mode aligned 5G O-RAN and extended A/322 to enable L2 RRC signaling mobile and battery savings, etc., according to some aspects of this disclosure The ATSC A/322 standard in section 5.2.2 describes baseband packet header and optional extension modes— 5.2.2.2.1 Short Extension Mode and 5.2.2.2.2 Long Extension mode reserved for other uses. The short extension mode is used in examples but long extension mode would be needed to support signaling greater than 32 bytes for L2 BBP RRC signaling.

In some aspects, 3601 illustrates short extension mode and 000 type File used when a file is broadcast in payload BBP and 3602 extension field shown has 3603, 3604 examples of syntax and semantics for L2 BBP RRC mobile signaling to be discussed. As a non-limiting example, 3605 is ATSC 3.0 and D2M physical layer aligned O-RAN cloud principles and 3606 O-RAN intelligence. As a non-limiting example, 3607 shows the two coordinated schedulers ATSC 3.0, D2M inserting L2 signaling into BBP and ALP at layer 2. In some aspects, 3608 is file cache cloud used to ensure successful broadcast file transfer. According to some aspects, UE 3609 uses a request to 3608 for selective repeats of any missing file segments of a file at UE to be complete file transfer via broadband, as discussed regarding 3700.

It may be understood that when broadcasting a file to many UE simultaneously, the reception conditions at thousands of UE will vary. Also, just one error in a file, no matter the size, renders a file received with missing segments useless if just one file segment received in error or is missing.

In some aspects, 3700 introduces protocol using L2 signaling for UE to detect and request from 3608 any missing file segments broadcast it has detected by using BBP extension header 16 bit BBP counter that increments for each BBP broadcast. According to some aspects, this gives correlation of BBP count and File segment count and enables a selective request for just one missing file segment 3608 file cache cloud. The file cache has duplicate of each BBP using 16 bit counter as broadcast. This may be appreciated knowing a 1 Gigabyte file is useless with 1 segment missing or received in error when broadcasting to thousands or millions of UE given physics of reception environments. As will be discussed, using BBP 16 bit counter and L2 signaling syntax discussed is one use case of file transfer.

According to some aspects, the real value of L2 RRC signaling located BBP header is it is embedded with data (Files, Media, etc.) for a service. Each BBP layer 2 has data for one Low Density Parity Check (LDPC) forward error correction (FEC) frame layer 1 of a service. The embedded BBP L2 signaling enables quick signaling of information to assist UE in continued reception of a service. For example, a virtual frame can have a slice and PLP with SID content data in (N) BBP at layer 2.

According to some aspects, this enables embedded L2 signaling 3603 and 3604 (flag bits) specific to a service to quickly signal using one or more BBP with SID service to assist UE. The first 5 bytes of 3603 is L2 signaling used to assist UE in file transfer, and will be discussed in the context of 3700. Next is 16 bits for various flags 3604 discusses semantics that play a role for L2 signaling.

According to some aspects, next 2 bytes 3610 indicates signaling to UE of next slice of service continuing on in a future virtual frame. In some aspects, the 6 bits of next 2 bytes 3610 indicates number of virtual frames or seconds in future and 10 bits the slice offset milliseconds to slice start.

In some aspects, next 3 bytes 3611 is syntax to indicate to UE that service can change to Slice_ID but still with same RF_ID in a virtual frame. According to some aspects, this maybe the result of 3505, 3506 and intelligent load balancing for efficiency with 700 multiple BVNO and (N) RF carriers being shared.

In some aspects, the next 5 bytes 3612 syntax indicates to UE the service will be steered to another RF_ID using 3606 intelligence which can also be a broadcast topology 4500 MFN to SFN.

In some aspects, the flag bits 3604 are used with syntax 3603 and with L2 link layer ALP signaling 3607. Broadcast Intelligent RAN modes or use cases 3700-4600 examples of importance of signaling and with file transfer use cases are discussed next.

Figure 37:
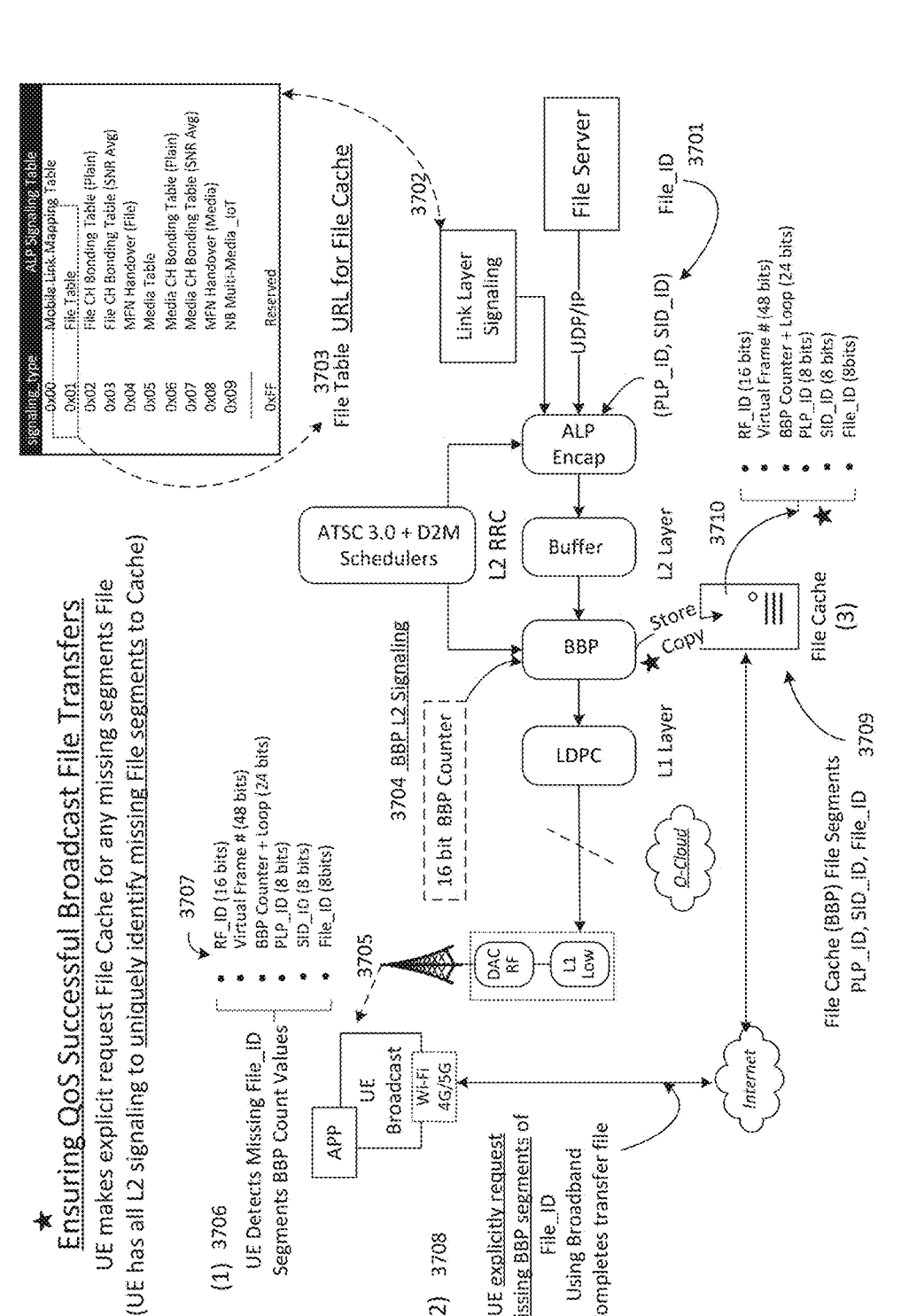
FIG. 37 illustrates using L1 and L2 signaling to ensure successful file delivery by enabling UE to explicitly request any missing Base Band Packet (BBP) file segments from file cache in cloud, according to some aspects of this disclosure.

FIG. 37 illustrates an example system 3700 for Intelligent RAN mode for use case of ensuring successful broadcast file transfer and reception UE introduced with respect to system 3600, according to some aspects of this disclosure.

In some aspects, the file server 3701 has file to be broadcast with unique assigned File_ID 16 bits also signaled in the fourth and fifth bytes of the L2 BBP signaling 3602. According to some aspects, 3702 is L2 link layer signaling for file transfer which has ALP signaling table 3703 with URL for 3710 file cache in cloud.

In some aspects, the 3704 BBP L2 signaling 3603, 3604 is inserted 3603 and first 2 bytes indicating BBP 16 bit counter value which is set to zero first BBP of file and count increments for each BBP of 3701 File ID broadcast. According to some aspects, until end of file last BBP is signaled, first flag bit 3613 is set. According to some aspects, the third byte of 3603 is number of rollovers of 16 bit BBP counter experienced when file size is exceptionally large, and the value 65,536 is added to total BBP count for each rollover.

According to some aspects, all the BBP are processed in layer 1 and broadcast signal converted to RF and 3705 broadcast. Every UE receiving File ID transfer maintains a BBP count using 16 bits in each BBP extension header received. According to some aspects, 3706 any missing BBP count values in continuity of count indicate that file segment in that BBP with that count value is missing not received. According to some aspects, 3708 UE using missing BBP counter values can explicitly request the file data in all missing BBP be sent 3703 using URL file cache using ALP link layer table for file received.

According to some aspects, the UE may have all needed signaling 3707 to request missing file segments 3709 from 3710 file cache which has copy of file data and signaling to correlate to missing file segment data in cache and to send to UE using a protocol not discussed in detail here.

According to some aspects, the UE can make requests to 3710 during file transfer or for a period of time after completion of file transfer signaled in link layer table 3702 to complete file transfer. Also, UE may signal successful completion to cloud which may be part of SLA for payment to broadcaster for using spectrum for this use case.

Having thousands or millions UE receive a broadcast file transfer in large urban city, and the probability is low they all successfully receive file with no missing segments, no matter the robustness or power used for broadcast 3705, and is motivation for the use case of systems 3600 and 3700.

By using broadcast for file transfers enabled with method to detect and request missing file segments enables harmonization and convergence with broadband. According to some aspects, a hybrid intelligent broadcast RAN results in increasing the spectrum efficiency and economic savings compared to either broadcast or broadband used alone when a large number of UE require the same files or software APP or firmware updates, etc.

Figure 38:
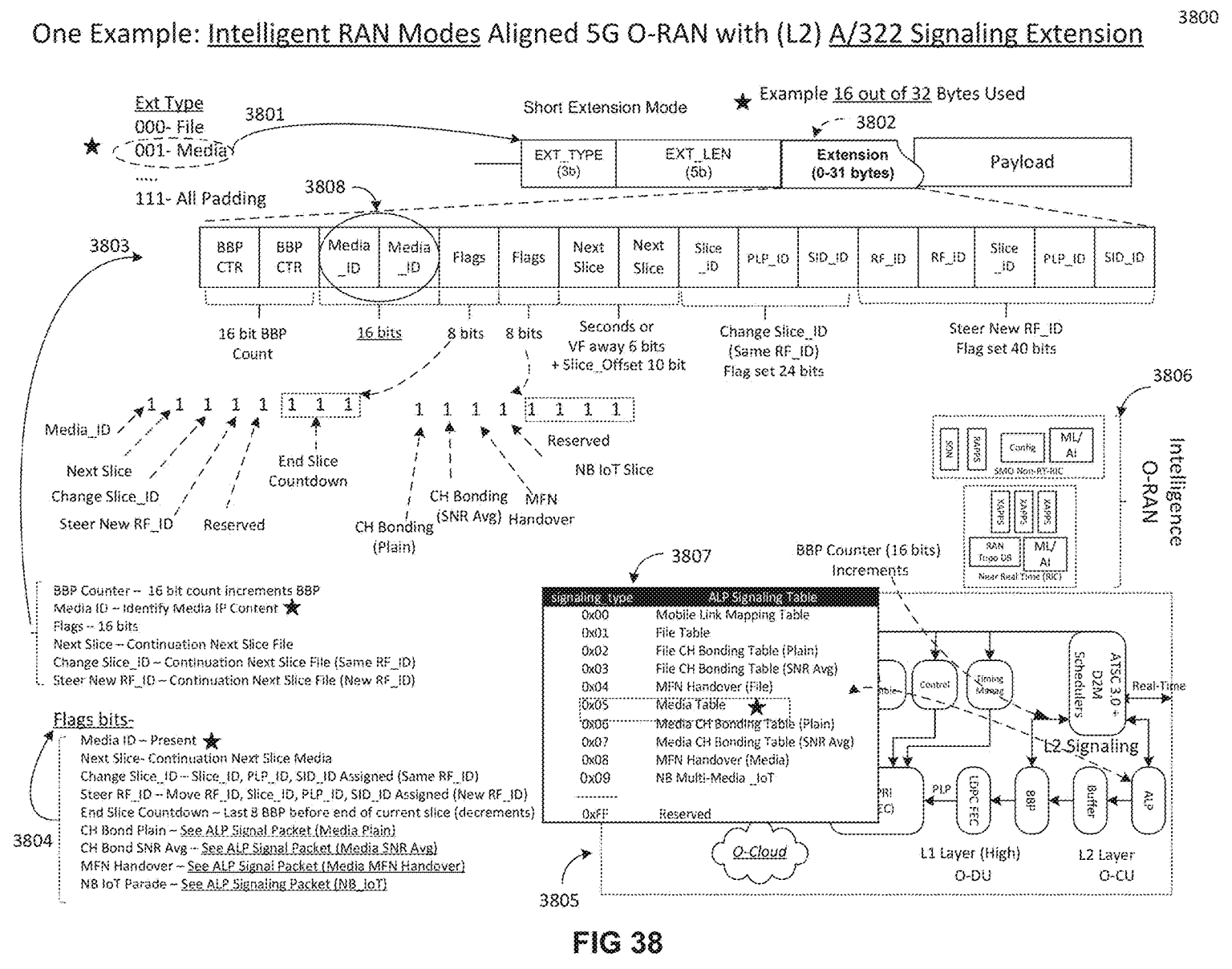

FIG. 38 illustrates another example os system 3800 of Intelligent Broadcast RAN mode aligned O-RAN extended A/322 to enable L2 RRC signaling mobile and battery savings, etc., according to some aspects of this disclosure In some aspects, 3801 illustrates short extension mode and 001-type Media used when A/V streaming media is broadcast in payload BBP and extension field 3820 shown has 3803, 3804 examples of syntax and semantics for L2 BBP RRC mobile signaling. FIG. 38 illustrates is ATSC 3.0 and D2M physical layer aligned O-RAN cloud principles 3805 and O-RAN intelligence 3806.

In some aspects, in system 3800, the changes for 001-type media compared to 000-type file 3600 will be indicated and includes L2 link layer signaling ALP media table 3807 instead of file table 3703. According to some aspects, the change in syntax 3803 to support 001-type media is Media-ID 3808, which is 16 bits, to identify media service on SID and the 3804 first Flag bit now is Media_ID.

According to some aspects, the same L2 BBP signaling syntax for battery savings and assisting transitioning states D-DRX and continuous reception signaling of Next slice discussed with respect to system 3600 is supported in system 3800.

In some aspects, both systems 3600 and 3800 introduced will be referenced when discussing the remaining hybrid broadcast intelligent RAN 3900-4600 use cases.

Figure 39:
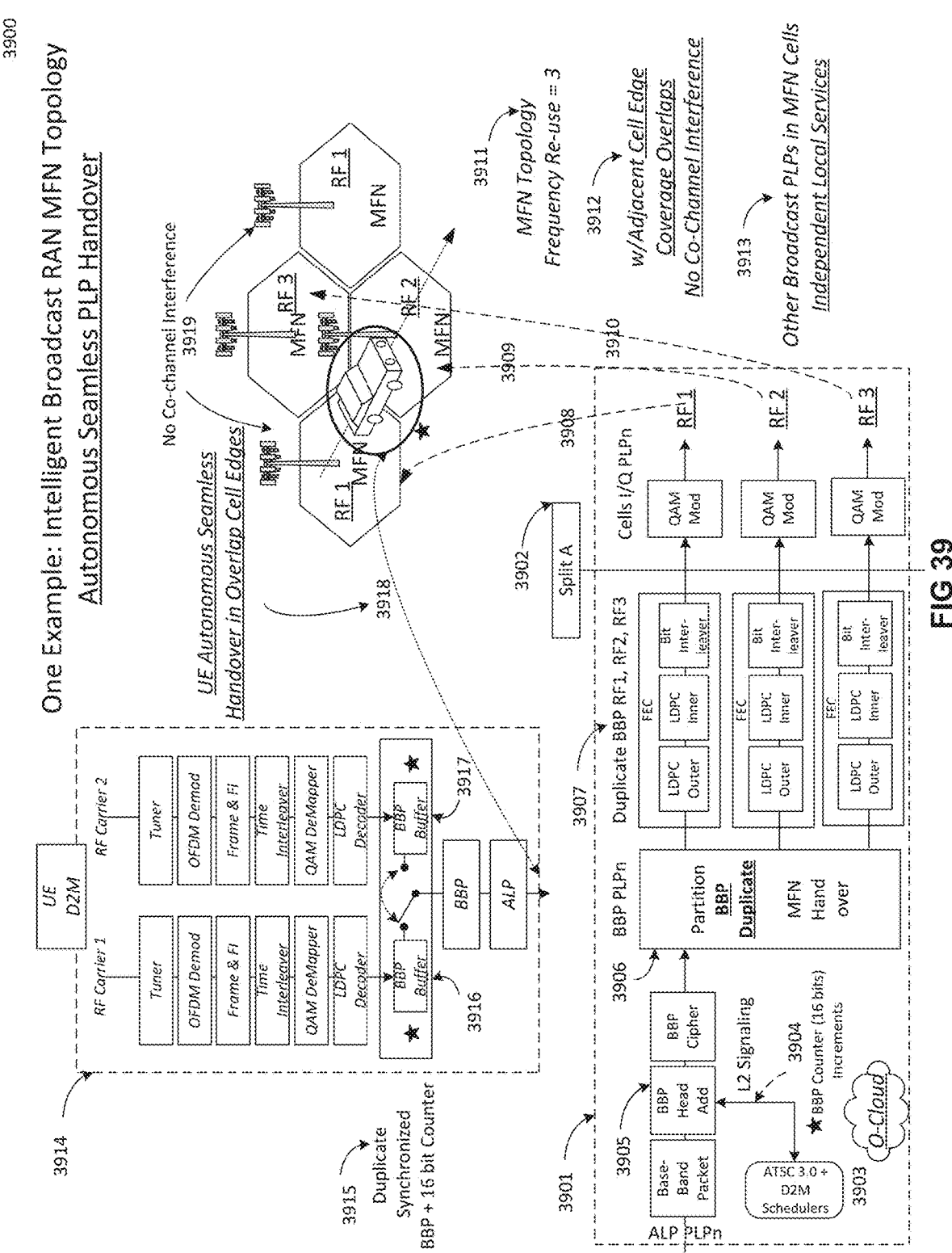
FIG. 39 illustrates one example D2M intelligent broadcast RAN mode using L2 RRC signaling for UE autonomous seamless handover Multi Frequency Network (MFN) topology, according to some aspects of this disclosure.

FIG. 39 illustrates an example system 3900 of intelligent broadcast RAN for Multi-Frequency Network (MFN) topology and seamless PLP handover for mobile broadcast UE, according to some aspects of this disclosure. In some aspects, the architecture of 700, 800 introduced with multiple BVNO 708 and 723 (N) RF carriers 709 is shared. Single Frequency Network (SFN) and MFN topologies are supported using 704 intelligences including RAN topology database shown. To orchestrate the radio resources shared using multiple topologies, the use cases 3900-4600 are discussed and then summarized in 4700.

In some aspects, MFN topology 3911 has closer spaced broadcast towers indicated by cells shown with RF 1 3908 and RF 2 3909 and RF 3 3910 using separate RF frequencies in MFN frequency with a re-use factor of 3 is shown. According to some aspects, the value to BVNO 708 is using independent hyperlocal services for some PLPs in 3908, 3909, 3010 MFN with 3912 adjacent MFN cells designed with coverage overlap at cell edges and 3919 no co-channel interference.

Simultaneously, BVNO 708 uses another PLP (1 of N) designed for mobile UE wide area SID service extending many MFN cells as indicated by vehicle on trajectory shown, according to some aspects.

According to some aspects, mobile on same SID service is available in MFN cells 3908, 3909, 3010 with cell edge coverage overlap regions 3912 for seamless handover as mobile UE position changes. Further, the mobile UE with 3906 L2 baseband signal processing and 4000 L1 and L2 signaling, to be discussed, can achieve MFN handover autonomously (not in communication intelligent network) but using L2 signaling provided and sensing its RF environment 3914 two RF tuners. According to some aspects, the handover state or which cell is primary is determined by UE independently based on the RF environment in the cell overlap regions experienced by each mobile UE trajectory.

According to some aspects, the BVNO operates PLPs for different use cases MFN topology simultaneously for hyper-local and mobile wide area dynamically as a function of time to generate revenue. Broadcast intelligent RAN 700, 800 can be used in locations such as in urban city areas with high population, etc.

In some aspects, 3901 can be the broadcast physical layer for Type A split 3902. According to some aspects, the two coordinated schedulers 3903 are shown 3904 inserting L2 signaling in 3905 BBP header extension 3603, 3803 including first two bytes BBP 16 bit counter which plays role in MFN handover use case.

According to some aspects, a single PLP and SID service BBP stream is partitioned 3906 into three duplicate BBP streams with synchronized 16 bit BBP counters. According to some aspects, for the three streams RF1, RF 2, RF 3 of 3907 with identical OFDM numerology and coding, modulation selected, etc. for 3908, 3909, 3910, and is broadcast over MFN and received by mobile UE on trajectory shown.

According to some aspects, the PLP and mobile service can be received using either RF1, RF 2, RF 3 with signaling discussed, as in 4000, and may have availability of two RF 1 and RF 2 when UE trajectory is in overlapping coverage areas MFN as the example shows.

According to some aspects, with the signaling to be discussed, the UE 3914 has two RF tuners and receiving chains shown and each LDPC decoder outputs to a BBP buffer 3916, 3917 that is decoding 3915 duplicates of synchronized BBP streams and SID.

According to some aspects, the UE has BBP buffers 3916, 3917, and when UE trajectory is inside RF 1 cell, the 3916 BBP buffer with 16 bit BBP count values is used as MFN primary cell for reception.

In some aspects, when mobile UE moves into overlapping coverage area of RF 1 and RF 2 MFN cells shown UE into a state, it can have both BBP buffers 3916, 3917 with identical BBP and count values available as a diversity option. According to some aspects, the mobile UE autonomously selects either 3916, 3917 buffer for next BBP and service continues with benefit of diversity. This diversity can support dynamic fading with the short duration of BBP in overlap areas when either RF can fade.

According to some aspects, then a point in time may be reached on trajectory 3918 when RF 1 fades and RF 2 becomes stronger, and when 3914 UE checks the buffers it only has option 3917 available and the handover is then complete and RF 2 is used as primary cell until UE trajectory enters another MFN cell overlapping coverage area. According to some aspects, with duplicate BBP diversity 3906 and L1 and L2 signaling, which is to be discussed with 4000, enables a seamless MFN handover for each mobile UE in MFN while BVNO other PLP can focus on hyperlocal services based on a PLP by PLP basis.

Figure 40:
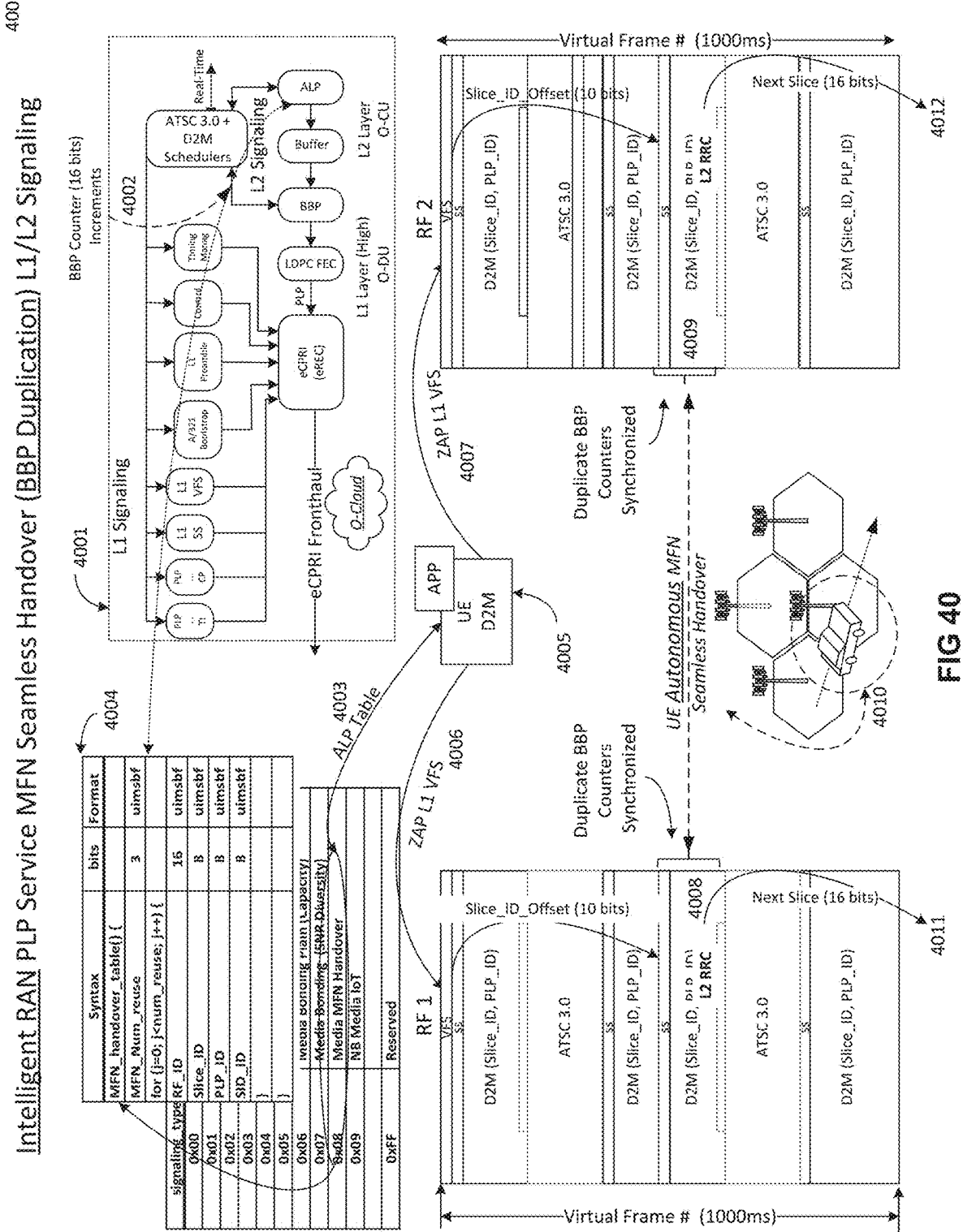
FIG. 40 illustrates D2M intelligent broadcast RAN mode using L1 and L2 RRC signaling for UE autonomous seamless handover MFN topology, according to some aspects of this disclosure.

FIG. 40 illustrates a system, 4000, with same MFN handover use case as in 3900, and now including L1 and L2 signaling and is briefly discussed, according to some aspects of this disclosure. According to some aspects, 4001 is broadcast physical layer with L2 signaling 4002 being inserted into BBP header extension 3800 and or ALP link layer signaling tables by the schedulers in cloud. The 4003 ALP link layer signaling has 4004 Media MFN Handover table with signaling for MFN re-use factor of three topology use case 3900.

In some aspects, the mobile UE 4005 uses L1 signaling VFS 4006 to access RF 1 and L1 signaling VFS 4007 to access RF 2. The duplicate BBP in slices 4008 and 4009 can have the BBP buffers 3916, 3917, previously discussed.

According to some aspects, when UE trajectory 4010 enters overlap area RF 1 and RF 2, the BBP duplication diversity is used to select the next BBP incremented count available. Then further in the trajectory 4010, RF 2 is selected as the primary cell and handover completed, as previously discussed in 3900. The UE using L2 RRC as shown in 4012 and continues on to next slice in next virtual frame signaled. Other UEs in various locations, not shown, may continue with RF 1 as primary cell and 4011 on to the next slice in next virtual frame.

Also, for special broadcast low latency use cases, the time interleaving diversity can be reduced or eliminated using BBP diversity, according to some aspects.

FIG. 41 illustrates an example, 4100, of use case for enabling mobile UE diversity for SFN 4114 and MFN topologies 4113. In some aspects, 4101 is broadcast physical layer with split type A 4102. The single PLP for mobile has BBP 4103, which is a 16 bit counter added with other L2 signaling 3800 in the BBP header.

According to some aspects, the BBP stream is partitioned 4104 with even split into two separate L1 (FEC) LDPC paths configured exactly the same with equal PLP rate and terminating at Cell or Sub-Carrier Exchange 4106. According to some aspects, for both LDPC paths at 4106, all odd numbered Sub-Carriers are sent straight through to either the QAM mapper 4107 to RF 1 4108 or the QAM mapper to RF 2 4109. All even Sub-Carriers are Exchanged and sent to the other RF channel QAM mapper as shown. This process can repeat for all the BBP of PLP to enable mobile frequency diversity at UE. This provides SNR averaging across the two RF channels used and results in an overall improved decoding performance, due to increased diversity.

According to some aspects, the 4112 shows SNR at UE 4109 is effectively averaged over two RF channels and fades one RF (low SNR) is compensated by (good SNR) on other RF after the cell exchange 4110 on UE 4109.

According to some aspects, the RF 1 4108 and RF 2 4109 are broadcast and received by 4109. The outputs of the QAM de-mappers are cells exchanged 4110 odd and even sub-carriers, which is the inverse process. The two LDPC decoders can recover the BBP with benefit of frequency diversity and they are 4111 bonded into a single BBP stream using the 16 bit BBP count values and the PLP content is recovered.

Figure 42:
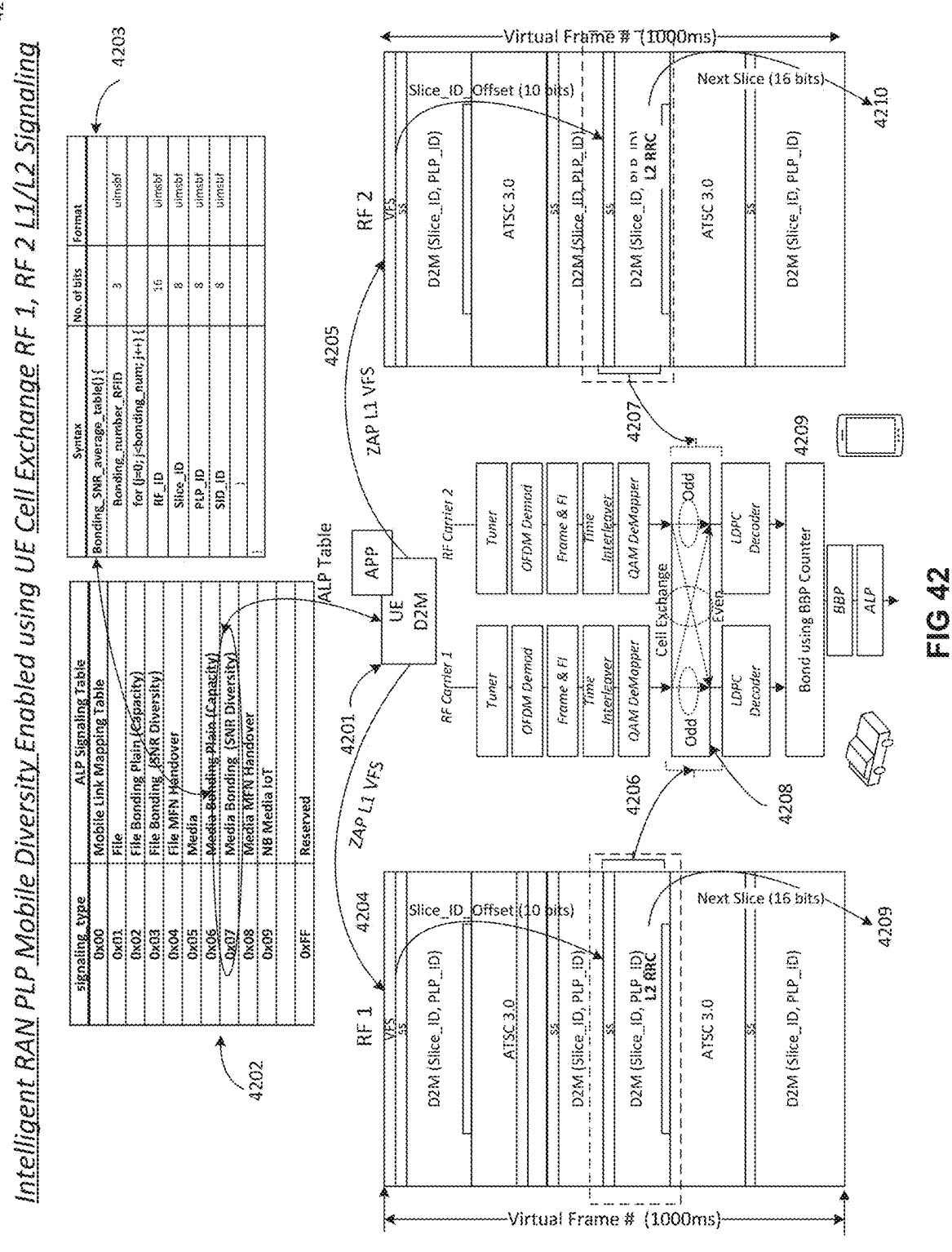
FIG. 42 illustrates mobile diversity using two Radio Frequency (RF) carriers and Physical Layer Pipe (PLP) SNR averaging bonding processed in cloud and using L1 and L2 RRC signaling, according to some aspects of this disclosure.

FIG. 42 illustrates a system 4200 with same mobile diversity use case 4100 now including L1 and L2 signaling, according to some aspects of this disclosure.

According to some aspects, the UE 4201 has received L2 signaling including ALP link layer signaling table 4202 and Media Bonding SNR Averaging 4203 table with required signaling. The UE can use 4204 L1 VFS signaling to access virtual frame in RF 1. The UE can use L1 VFS signaling 4205 to access virtual frame in RF 2.

According to some aspects, the UE with L2 signaling shown then locates SS Slice_ID 4206 on RF 1 and SS Slice_ID on RF 2 and the Cell Exchange 4208 performs the inverse operation to enable frequency diversity.

According to some aspects, the two LDPC decoders recover the BBP with the benefit of frequency diversity and they are bonded 4209 into a single BBP stream using the 16 bit BBP count values and the mobile PLP content is recovered. The UE using L2 RRC shown continues on to next slice in next virtual frame 4210 signaled RF1 and RF 2.

Referring back to FIG. 8, system 800 shows, for reference only, A/324 and the L2 layer split Studio to Transmitter Link Transport Protocol (STLTP) between ATSC 3.0 Gateway and ATSC 3.0 exciter. According to some aspects, with A/324 split at L2 layer, this may require a Mesh network between all exciters in SFN to exchange cells or sub-carriers and that makes this mobile diversity 4100, 4200 not feasible for A/324.

According to some aspects, using broadcast Split type A eCPRI fronthaul the cell exchange 4106 is easily achieved in the cloud aligned or harmonized O-RAN principles.

The frequency diversity cell Exchange can be used over two or more RF channels (only two shown) on a sub-carrier by sub-carrier basis, according to some aspects. The SNR frequency diversity can improve mobile fading performance without decreasing spectrum efficiency by using a more robust LDPC code rate and QAM modulation to mitigate mobile fading.

Also, for a special broadcast low latency use case, the time interleaving diversity (latency) can be reduced or eliminated using SNR frequency diversity.

FIG. 43 illustrates an example, 4300, as a use case for increasing capacity of a PLP in a slice for a service using Plain Bonding and two RF carriers are supported in both SFN 4301 and MFN 4302 topologies using intelligent RAN, according to some aspects of this disclosure, using broadcast physical layer 4303 with 4304 split type A. The single PLP has BBP 4305, which is a 16 bit counter, is added along with other extended L2 signaling 3800 in the BBP header.

According to some aspects, the BBP stream is then partitioned 4306 into two BBP streams for plain bonding, proportional 4307 to the PLP and FEC and modulation selected. Furthermore, this can be different for RF 1 4308 and RF 2 4309 which are then broadcasted 4310.

According to some aspects, the 4311 UE tunes to 4309, 4309, and each signal is demodulated and the LDPC decoders 4312, 4313 recover BBP streams. They are then bonded 4314 into a single BBP stream using 4305 16 bit BBP counter values and the input IP stream 4315 is received.

FIG. 44 illustrates an example, 4400, of use case 4300 of UE receiving PLP Plain Bonding two RF carriers and using L1 and L2 RRC signaling for virtual frames, according to some aspects of this disclosure.

According to some aspects, the UE 4401 can use the received L2 ALP link layer signaling table 4402 for plain bonding 4403. The UE 4401 using the L1 VFS signaling 4404 accesses RF 1 in virtual frame shown. The UE 4401 using the L1 VFS signaling 4405 accesses RF 2 in virtual frame, as shown.

According to some aspects, using the slice ID offset L1 signaling shown directs UE to SS on RF 1 and SS on RF 2. The UE receive chain 4406 and LDPC decoder recovers BBP stream RF 1. The UE receive chain 4407 and LDPC decoder recovers BBP stream RF 2. Then BBP streams are bonded 4408 into single BBP stream using 4305 16 bit BBP counter values, and the 4409 input IP stream is received.

According to some aspects, then using L2 RRC signaling 4410 shown UE continues to next slice in future virtual frame on RF 1, and using L2 RRC signaling 4411 UE continues to next slice in future virtual frame on RF 2.

Figure 45:
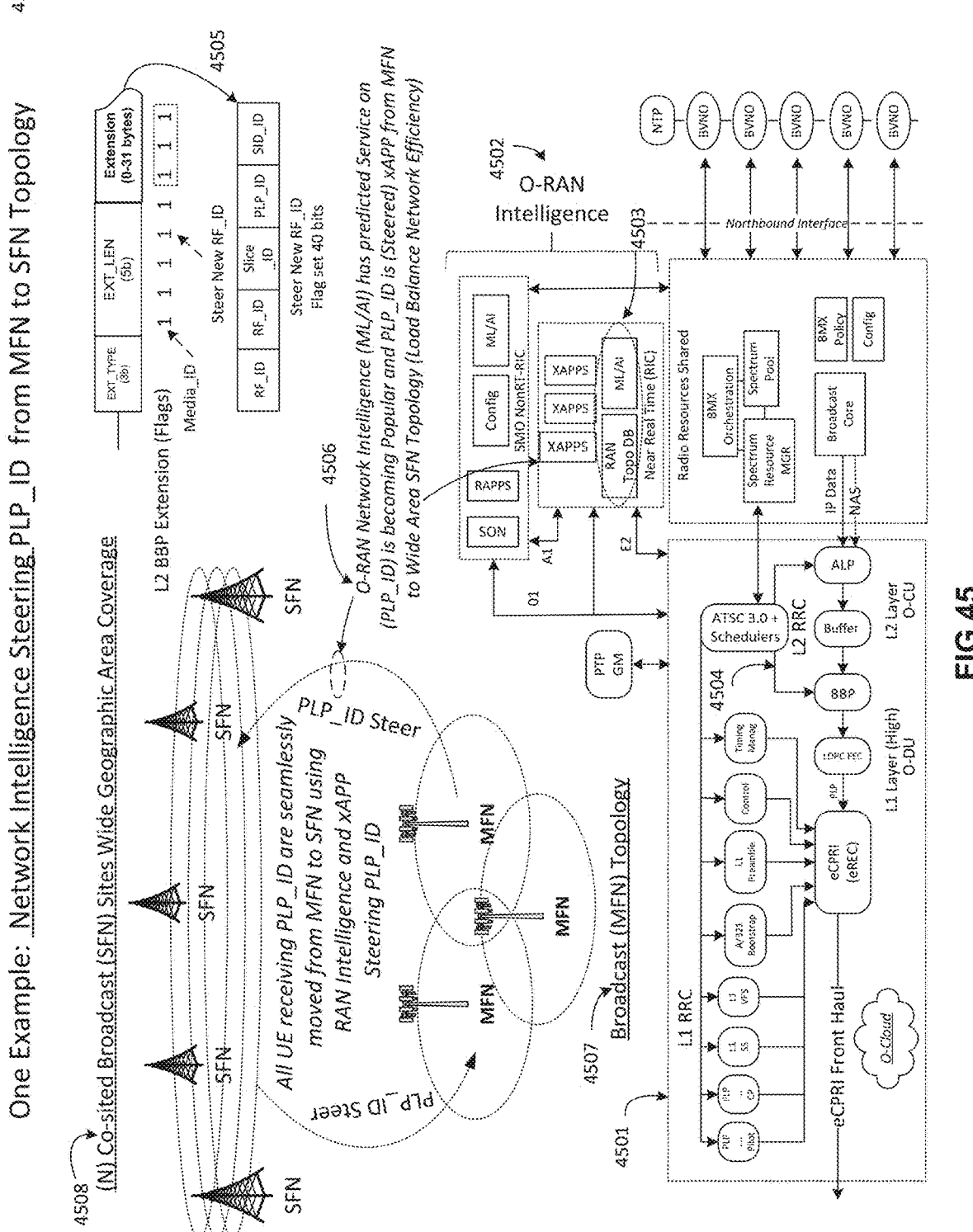
FIG. 45 illustrates Intelligence in Broadcast RAN steering PLP (service) from MFN to SFN topology based on Machine Learning (ML)/Artificial Intelligence (AI) and xAPP in the near real-time Radio Interface Controller (MC) via E2 interface to ATSC 3.0+schedulers using shared broadcast radio resources, according to some aspects of this disclosure.

FIG. 45 illustrates an example, 4500, of using L2 RRC signaling, as in 3800, and RAN intelligence to steer or move a PLP_ID and service being received. The use case is 4502 RAN intelligence Machine Learning (ML)/Artificial Intelligence (AI) which has predicted a service on a specific PLP_ID, according to some aspects of this disclosure. The Self Organizing Network (SON) automation shown reacts by load balancing network resources for BVNO sharing spectrum 708. The SON automation will move other 700 PLPs if needed to accommodate the load balancing, but this aspect is not discussed.

According to some aspects, the identified PLP_ID and service using L2 signaling is steered seamlessly from one RF_ID on MFN topology to another RF_ID on wide area SFN topology for all UEs currently receiving enabling load balancing for spectrum efficiency for the multiple BVNO.

According to some aspects, the 4501 is broadcast physical layer and RAN intelligence 4502 Service Management and Orchestration (SMO) non-real time radio interface controller (MC) with ML/AI and with a Self-Organizing Network (SON) application running as an rAPP.

According to some aspects, 4503 shows the near-real time RIC with ML/AI and a PLP steering application running as an xAPP. Using O-RAN 01, A1, E2 interfaces for interworking 4501 broadcast physical layer, with real-time schedulers and 4504 insertion of L2 layer signaling 3800 and specific 4505 syntax (40 bits) and flag bits shown. This enables all current UE to seamlessly move to a RF_ID under automated load balancing SON.

According to some aspects, 4506 indicates O-RAN intelligence 4502 that has predicted the service on PLP_ID in current slice, which may become extremely popular, and PLP_ID is steered. By the steering xAPP for SON rAPP, moving service to the 4505 RF_ID from current MFN topology 4507 to wide coverage area of SFN topology 4508 can be seamless for all users UE.

Figure 46:
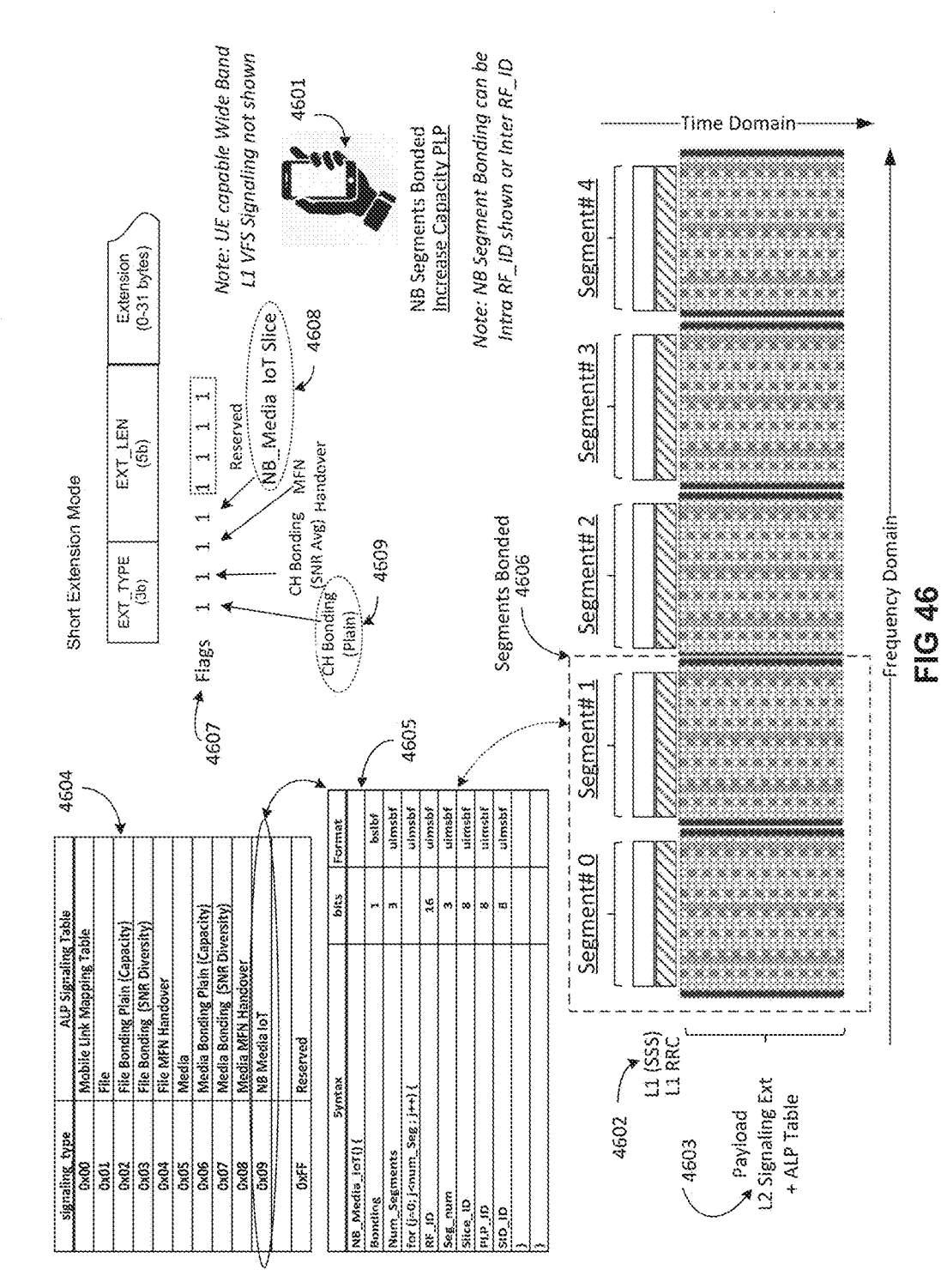
FIG. 46 illustrates one example of narrow band media plain bonding to increase service capacity by bonding two segments and using L1 and L2 signaling, according to some aspects of this disclosure.

FIG. 46 illustrates an example system 4600 of previously discussed example 3400 with NB reception, and now using Intra RFID plain bonding NB segments to increase capacity of a service on PLP_ID using the L1 and L2 RRC signaling 3800, according to some aspects of this disclosure.

According to some aspects, the UE 4501 which is capable WB and L1 VFS signaling is now receiving two NB segments that are plain bonded 4606 on the same RF_ID for increased service capacity. Showing example 3400 can also have some NB segments bonded and other NB segments RF_ID for IoT, wearables and greater battery savings including 3500 and D-DRX.

According to some aspects, the 4602 is NB L1 Segment Slice Start (SSS) and RRC signaling. In some aspects, 4603 is the wideband orthogonal payload symbols and L2 BBP plus L2 ALP signaling, as discussed in 3500. The 4604 is ALP link layer signaling table and 4605 syntax for 4606 bonding NB segments when 4607 flag bits 4608, 4809 are set. The NB Segment bonding can be both Intra and Inter RF_ID with intra-RF_ID bonding, as shown in 4600.

Figure 47:
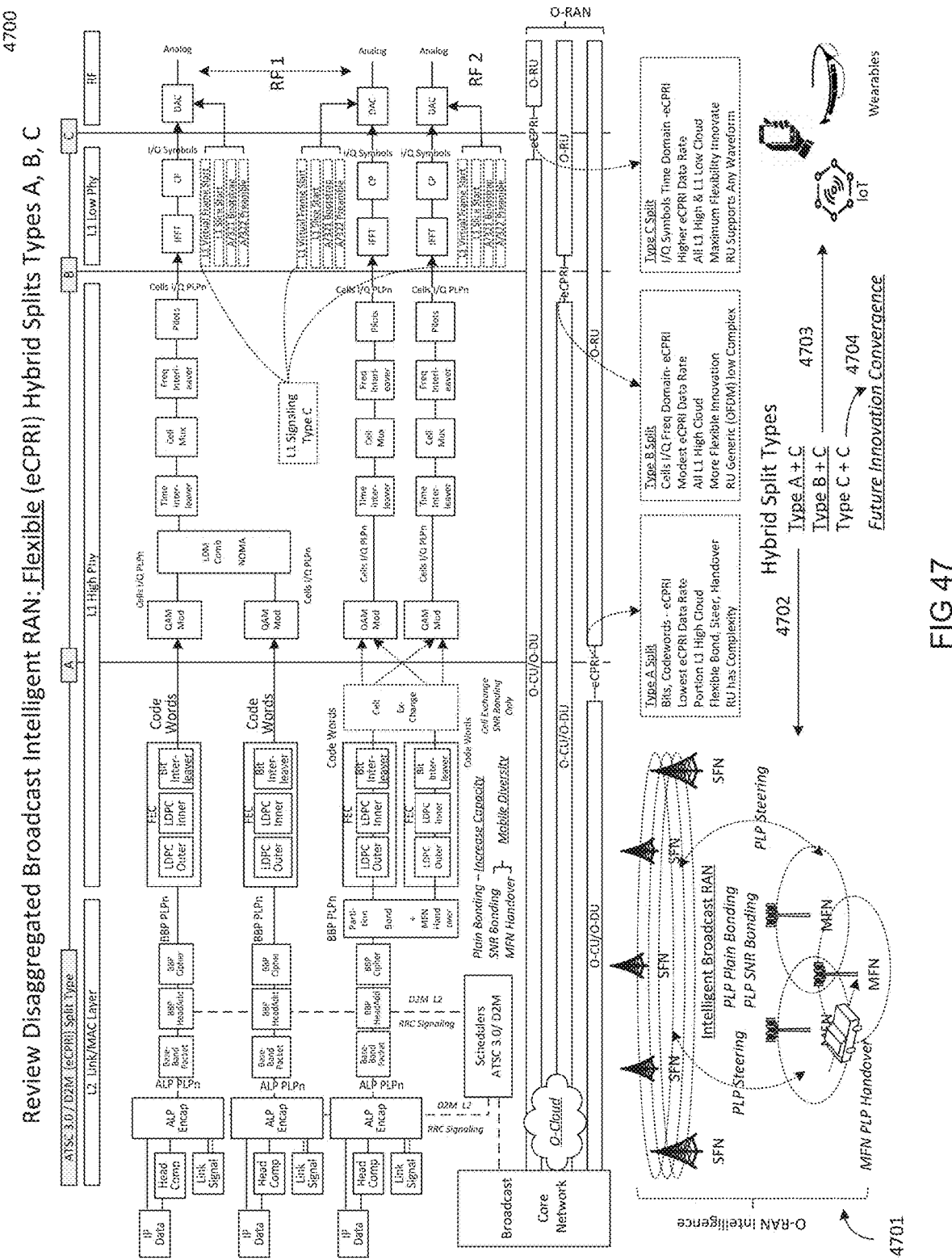
FIG. 47 illustrates ATSC 3.0 and D2M Broadcast Intelligent RAN and broadcast core network and the flexible eCPRI split types for use cases current, near term and future, according to some aspects of this disclosure.

FIG. 47 illustrates a system 4700 for reviewing system 800 after introducing several use cases of the intelligent and disaggregated broadcast physical layer RAN with eCPRI hybrid split type options shown, according to some aspects of this disclosure.

According to some aspects, the majority of the 4701 use cases introduced use 4702 hybrid split type A+C. This keeps eCPRI front haul data rate low, while increasing flexibility with portions L1 layer high processed in cloud. Furthermore, using extended ATSC A/321, A/322 and A/330 standards as baseline Non 3.0 broadcast, provides to enable L1 and L2 signaling using ATSC standards for the virtual frame reception paradigm and to enable forward compatibility.

According to some aspects, the convergence 4704 is agnostic to waveform broadcast. This offers maximum flexibility with all L1 layer high and L1 layer low processed in cloud used on a slice by slice basis. This can bring value to the broadcast spectrum and potential for BVNO and MNO cooperative business models for consumers. The hybrid split type B+C 4703 is discussed with respect to system 4800.

Figure 48:
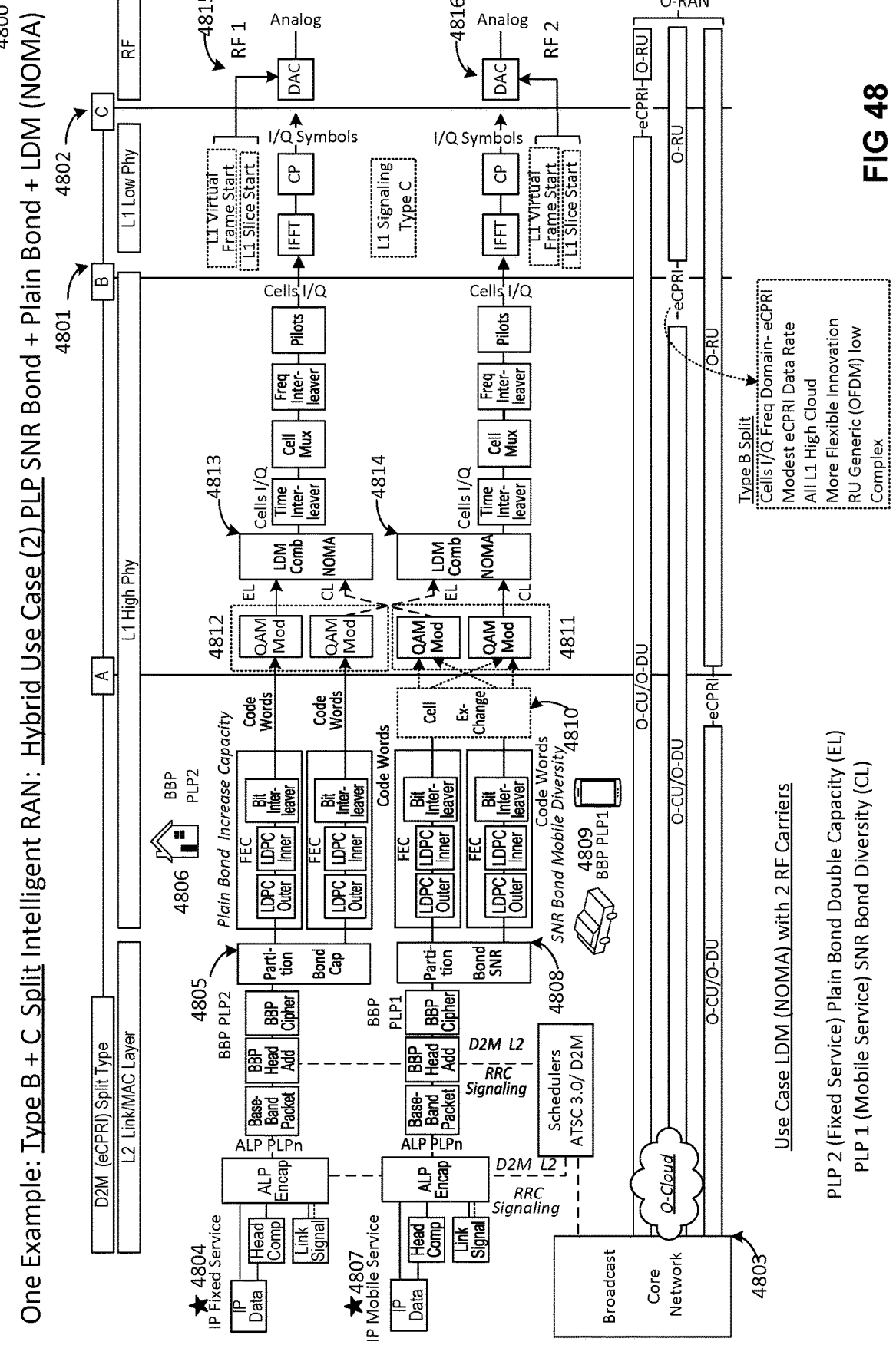
FIG. 48 illustrates one example of hybrid use case of (2) PLP+SNR bonding+plain bonding using Layered Division Multiplexing (LDM) (Non-Orthogonal Multiple Access (NOMA)) on (2) RF carriers in intelligent broadcast RAN, according to some aspects of this disclosure.

FIG. 48 illustrates an example system 4800 of a hybrid split type B+C 4801, 4802 use case of intelligent broadcast RAN, according to some aspects of this disclosure. In some aspects, 4800 enables more flexibility and innovation with all the broadcast L1 layer high processed in the cloud aligned O-RAN principles, which are to be discussed.

According to some aspects, this is an example of a hybrid use case using two PLP and SNR bonding mobile service and plain bonding fixed service. Further, these are combined using Layer Division Multiplex (LDM) in power domain of the two RF carriers in intelligent RAN with broadcast core network 4803.

In some aspects, IP input data fixed service 4804 is encapsulated using ALP and BBP, both with L2 RRC signaling. The BBP streams and 16 bit counter is then partitioned 4805 evenly into two identical LDPC (FEC) chains and input to QAM mappers 4812, as shown. Furthermore, capacity can be increased using plain bonding 4300, 4400 for 4806 PLP2 fixed service.

In some aspects, IP input data for SNR bonding mobile service 4807 is encapsulated using ALP and BBP, both with L2 RRC signaling. According to some aspects, the BBP streams and 16 bit counter is then partitioned 4808 evenly into two identical LDPC (FEC) chains for 4100, 4200 SNR diversity PLP1 4809, and then input to 4810 cell or subcarrier exchange with output to QAM mappers 4811, as shown.

In some aspects, then LDM combiner 4813 multiplexes in power domain an output 4812 termed enhanced layer (EL), which is used for fix service and injected below in power of the one cross coupled output 4811 termed core layer (CL) having the most power and used for mobile service.

In some aspects, the outputs I/Q cells 4813 and remaining L1 layer high is processed in the cloud and then sent via eCPRI 4801 to RU at transmitter site. According to some aspects, the L1 layer low is processed into I/Q symbols in the time domain in RU. According to some aspects, the L1 signaling is processed in the cloud as type C split and outputs I/Q symbols in time domain sent via eCPRI 4802 to RU.

In some aspects, in RU, both the I/Q symbols in time domain from 4802 L1 signaling and the slices in time domain are multiplexed into virtual frame using 700 control signaling and timing via eCPRI the signal is then converted to RF 1 4815 and broadcast.

In some aspects, LDM combiner 4814 then multiplexes in power domain an output termed core layer (CL) 4811 having the most power for mobile service, with a cross-coupled output 4812 termed enhanced layer (EL) and injected below CL in power and used for fixed service.

According to some aspects, the 4814 outputs I/Q cells and remaining L1 layer high is processed in the cloud then sent via eCPRI 4801 to RU at transmitter site. The L1 layer low is processed into I/Q symbols in the time domain in RU. The L1 signaling is processed in the cloud as type C split and outputs I/Q symbols in time domain sent via eCPRI 4802 to RU.

According to some aspects, in RU, both the I/Q symbols in time domain from 4802 L1 signaling and the slices in time domain are multiplexed into virtual frame using control signaling 700 and timing via eCPRI the signal is then converted to RF 2 4816 and broadcast.

Figure 49:
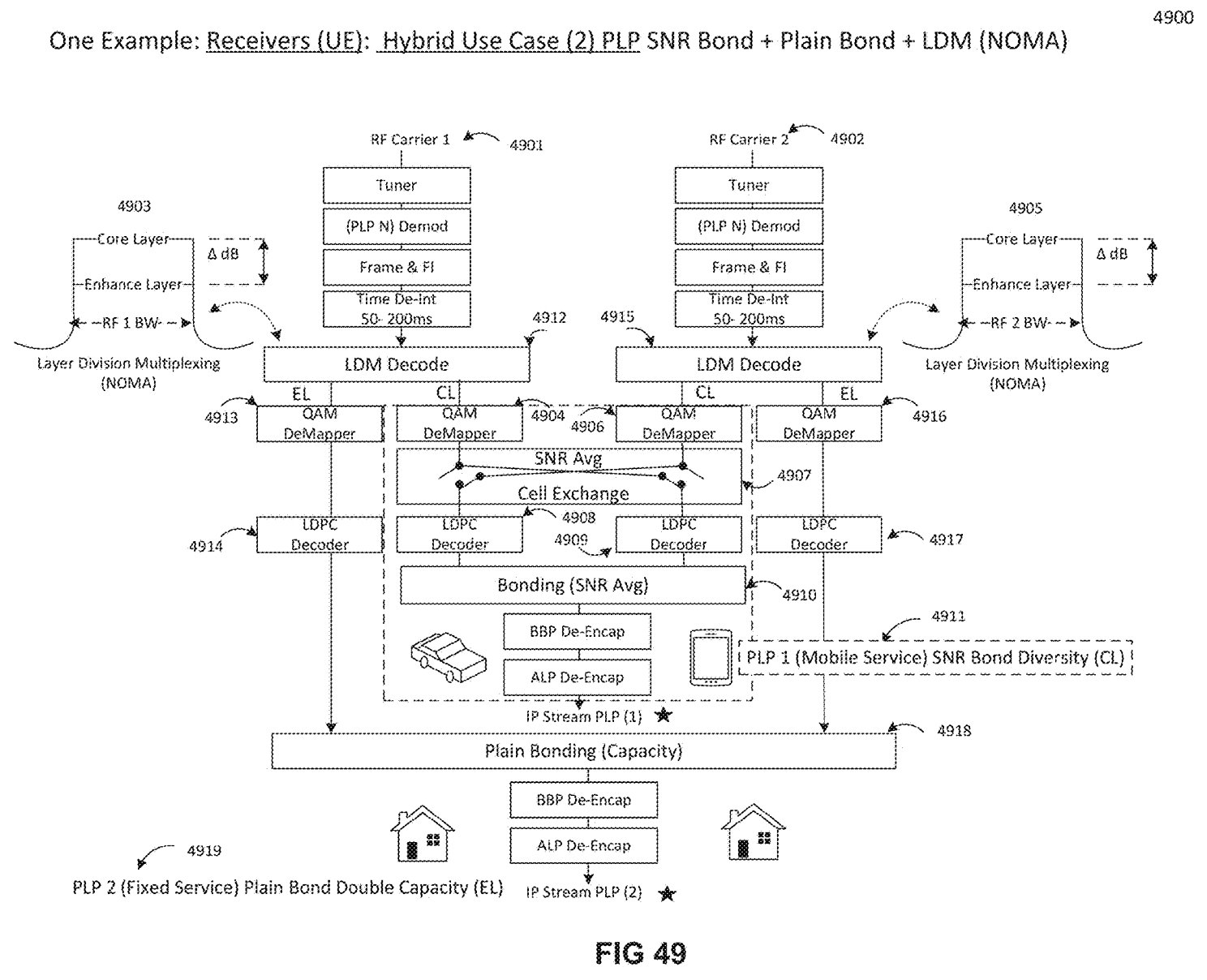

FIG. 49 illustrates an example, 4900, of the receivers at UE for 4800 hybrid use case with two PLP and SNR bonding and plain bonding using LDM (Non-Orthogonal Multiple Access (NOMA)) on two RF carriers, according to some aspects of this disclosure.

The 4901 is RF 1 in example 4815 broadcast. The receiver chain 4901 inputs 4903 LDM (NOMA) signal with CL 4811 and with EL 4812 injected below CL in the power domain to 4912 LDM decoder.

In some aspects, the 4902 is RF 2 in example 4816 broadcast. The receiver chain 4902 inputs 4905 LDM (Non-Orthogonal Multiple Access (NOMA)) signal with CL 4811 and with EL 4812 injected below CL in the power domain to 4915 LDM decoder.

According to some aspects, the PLP1 mobile receiver UE 4911 is discussed first. The CL signals 4903, 4905 bypasses the LDM decoders 4912, 4915. Furthermore, the 4901 UE is agnostic to EL) which is treated as a slight increase in AWGN noise proportional to the injection level used for EL, according to some aspects.

According to some aspects, the CL signals 4904, 4906 is input QAM de-mappers which outputs are used 4907 cell exchange to enable frequency diversity (SNR Averaging) across 4901, 4902. The 4908, 4909 LDPC decoders output BBP streams which are then bonded 4910 using BBP 16 bit counter values.

According to some aspects, the IP stream PLP1 is then recovered with benefit of SNR diversity for increased robustness in mitigating mobile fading for 4807.

According to some aspects, In some aspects, the 4903, 4905 LDM EL signals injected below CL in power domain is now discussed with respect 4919 receiver (UE) and PLP 2 plain bonding for increased capacity for fixed service 4804.

In some aspects, the 4903, 4905 signals are input to LDM decoders 4912, 4915 of the 4919 UE. The EL signals are recovered by first receiving and cancelling out (CL) as defined A/322 and A/327 RP.

According to some aspects, the recovered EL signals are input to QAM de-mappers 4913, 4916 shown. Then LDPC decoders 4914, 4917 recover the BBP streams that are then bonded 4918 using BBP 16 bit counter values to increase capacity fixed service 4804, and the IP stream 4804 is then recovered as shown.

It should be appreciated that use cases other than 4800 and 4900 are possible with the input IP steams 4804, 4807 being associated with same service and using spatially scalable source coding (encoder cloud), which produces a base layer signal and an enhancement layer signal, such as in HEVC, etc. in use today.

According to some aspects, the base layer signal has a lower spatial resolution signal and enhanced layer coding has higher spatial resolution of same base layer signal. The base layer can be received first and then enhancement layer can be received, and they are combined at UE such as fixed service 4919 and this produces increased resolution of base layer signal when spatial decoding is used UE.

According to some aspects, the base layer signal alone can also be received by mobile receiver (UE) 4911 with source decoder without the high spatial resolution of the enhanced layer signal available. Also, mobile use case such as vehicles can support receiving both layers, and when the signal strength fades reception, the more robust base layer would continue seamlessly.

So, one service can be broadcast and received in mobile and fixed environments for consumers with increased spectrum efficiency BVNO using intelligent broadcast RAN.

Figure 50:
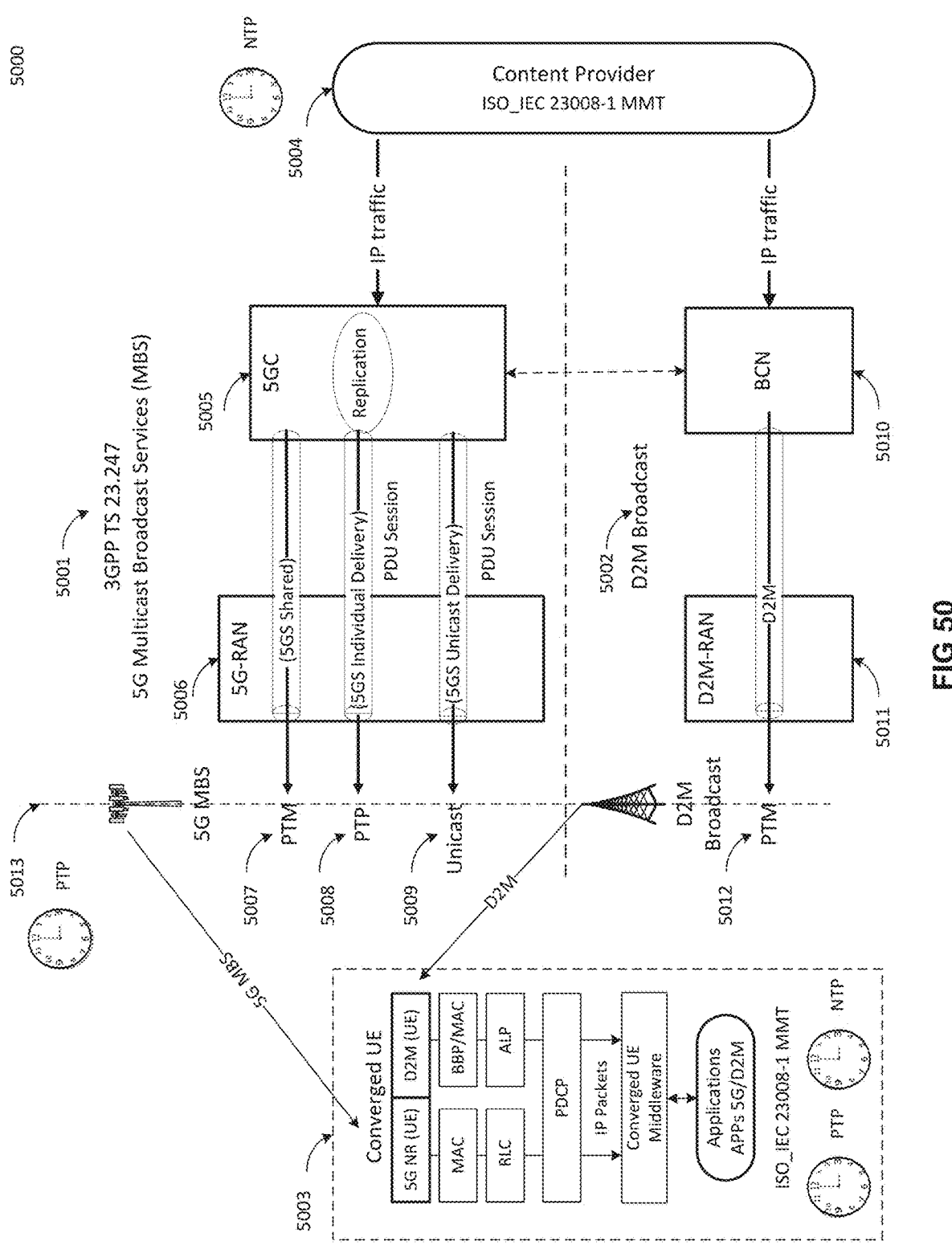
FIG. 50 illustrates one example of heterogeneous service convergence 3GPP 5G Multicast and Broadcast Services (MBS) and Non-3GPP D2M broadcast with a converged UE and middleware that abstracts delivery channels from the upper layer applications.

FIG. 50 illustrates an example system 5000 of heterogeneous service convergence of 3GPP 5G Multicast and Broadcast Services (MBS) and Non-3GPP D2M broadcast with a converged UE and middleware that abstracts delivery channels from the upper layer applications, according to some aspects of this disclosure.

According to some aspects, 5G MBS 5001 as described in, for example, 3GPP TS 23.247 interworks with Non-3GPP D2M broadcast 5002 and converged UE 5003, which has applications and can use International Standards Organization and International Electrotechnical Commission (ISO_IEC) 23008-1 Moving Pictures Experts Group (MPEG) Media Transport (MMT) application transport protocol on converged UE 5003 and at content provider 5004.

According to some aspects, 5005 is a 5G Core and 5006 is a 5G MBS RAN, which supports point to multipoint (PTM) 5007 and point to point (PTP) 5008 and Unicast 5009 services which are available on converged UE 5003.

According to some aspects, 5010 is a broadcast Core and 5011 is a Non-3GPP D2M RAN that supports PTM broadcast services 5012 on converged UE 5003. According to some aspects, PTP epoch 5013 is used for physical frame alignment 5G MBS frames and D2M frames at respective antenna air interfaces in heterogeneous network, which is to be discussed with respect fo FIG. 51.

Figure 51:
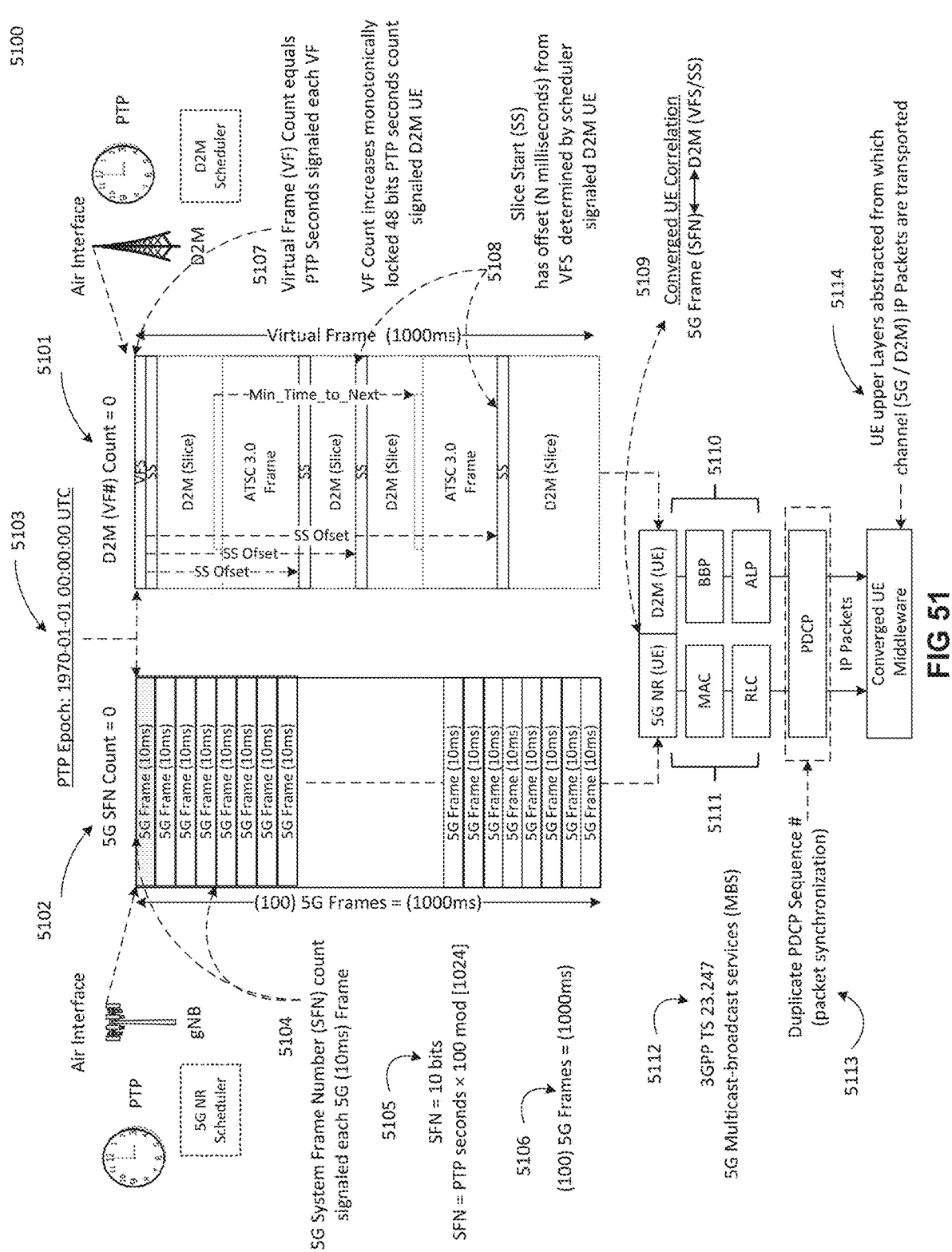
FIG. 51 illustrates one example of service convergence 3GPP 5G MBS and Non-3GPP D2M broadcast with a converged UE with middleware that abstracts delivery channels. With synchronization 5G MBS frames and D2M virtual frames aligned Precision Time Protocol (PTP) epoch and Packet Data Convergence Protocol (PDCP) packet sequence number synchronization, according to some aspects of this disclosure.

FIG. 51 illustrates an example of system 5100 for service convergence with 3GPP 5G MBS 5102 and Non-3GPP D2M broadcast 5101 with a converged UE 5109 with middleware that abstracts delivery channels, according to some aspects of this disclosure.

According to some aspects, PTP epoch 5103 is used to align phase 5102 5G system frame number SFN that is 0 zero at PTP epoch 5103. The SFN 5104 can be signaled in, for example, every 5G frame since PTP epoch. According to some aspects, 5105 shows equation for SFN since PTP epoch, which uses 10 bits and is mod [1024] count and returns to zero every 10.24 seconds since PTP epoch. Further, 5106 shows there can be 100 5G frames in 1000 ms period.

According to some aspects, the phase of D2M virtual frame number count 5101 is also aligned with PTP epoch 5103. The virtual frame number count 5107 is equal to 0 zero at PTP epoch 5103. According to some aspects, the virtual frame number count may have been monotonically increasing since PTP epoch and is signaled in each VFS symbols using 48 bits PTP seconds, which uniquely identifies each virtual frame of 1000 ms. According to some aspects, each D2M 5108 slice start (SS) is signaled using 10 bits the offset in integer milliseconds from VFS and SS is also uniquely identifiable to PTP for signaling to a UE.

According to some aspects, the converged UE 5109 has correlation 5G frame (SFN) and D2M (VFS/SS), which can be signaled at physical layers 5G MBS (e.g., Primary Synchronization Signal (PPS)/Secondary Synchronization Signal (SSS)/Broadcast Channel (BCH)) and D2M (VFS) and is independent of upper layer content data scheduled 5G/D2M in respective physical layer frames. This sets the 5G SFN and D2M VFS framing tempo on converged UE

5109 and can be used to harmonized advance converged service use cases not disclosed.

According to some aspects, 5110 is radio protocol layers on D2M that has extended L1/L2 signaling, and 5111 is radio protocols on 5G MBS 5112. Further, common Packet Data Convergence Protocol (PDCP) 5113 at layer 2, which is standard on 5G, can be used on top of ALP 5110. The PDCP 5113 with sequence number counts can be identical on 5G MBS and D2M according to some aspects, as discussed below. This enables PDCP packet synchronization in heterogeneous network 5G MBS/D2M, as discussed below.

According to some aspects, middleware 5114 on converged UE 5109 can abstract some or all applications running on the UE from the channel IP packets transverses for convergence. This also gives a user a seamless experience of the content and data for application without knowing what network was used at an instant in time. According to some aspects, the 5G Core 5005 and broadcast Core 5010 are core networks having knowledge at each instant regarding what OFDM resources are used and charging, etc. for converged services.

It should be appreciated, as shown in system 5100, that D2M can co-exist with ATSC 3.0, or as shown in system 2200, D2M can be a standalone depending on country implementing, etc. as previously discussed. Furthermore, D2M with L1/L2 signaling is independent of ATSC 3.0.

Figure 52:
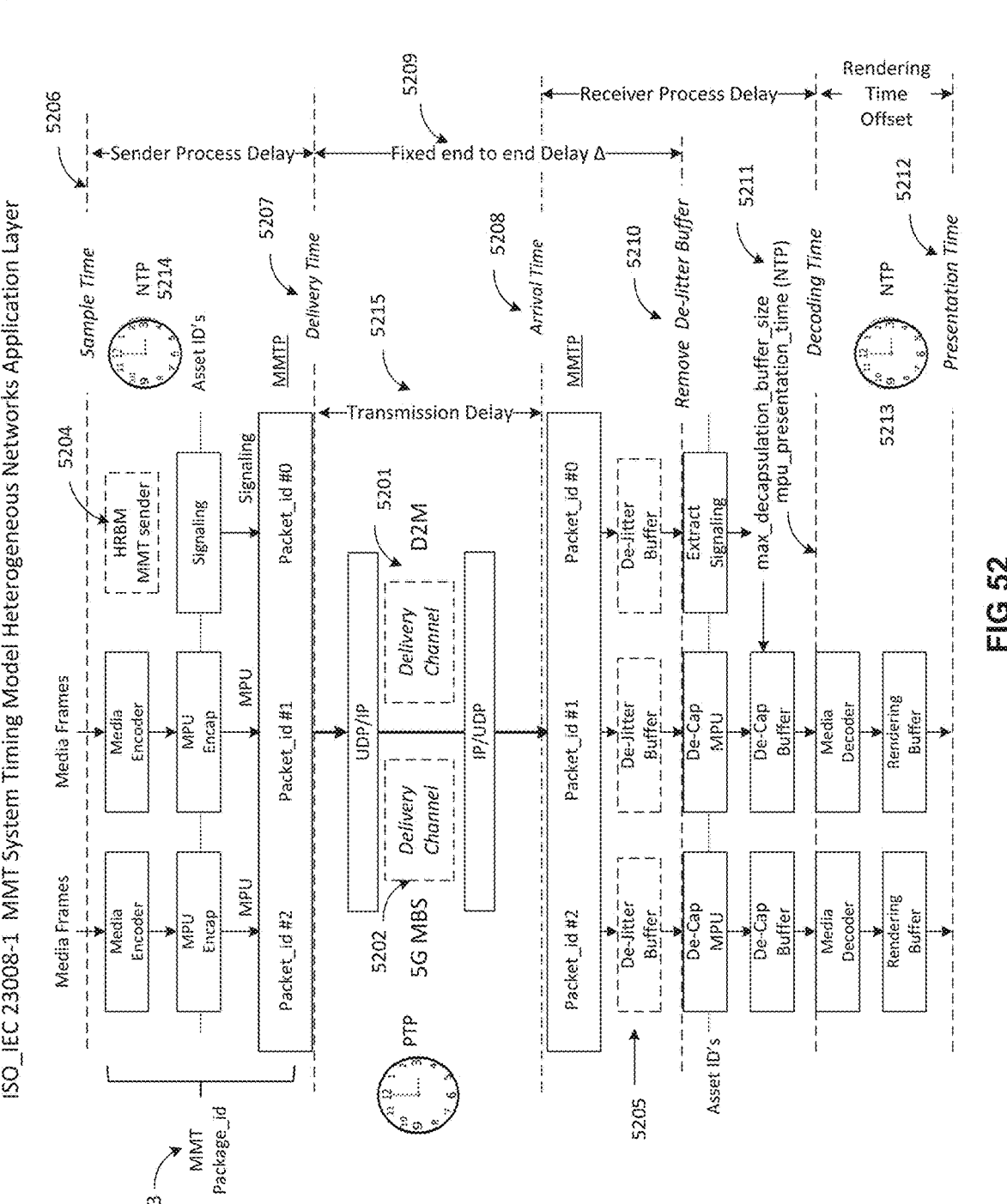
FIG. 52 illustrates one example using International Standards Organization and International Electrotechnical Commission (ISO_IEC) MMT 23008-1 standard timing model for heterogeneous networks providing application layer synchronization and synchronous media presentation time playback for converged 5G MBS and D2M network services, according to some aspects of this disclosure.

FIG. 52 illustrates an example system 5200 for ISO_IEC 23008-1 MMT timing model heterogeneous networks at application layer, according to some aspects of this disclosure. The MMT standard was adopted in ATSC 3.0 with imposed constraints that hinders use for mobility, as disclosed herein. Therefore ISO_IEC 23008-1 MMT standard as published January 2023 is referenced and used in this disclosure and is incorporated by reference in its entirety.

FIG. 52 illustrates the delivery channels 5201 D2M and 5202 5G MBS. The ISO_IEC 23008-1 MMT standard abstracts the delivery channel and may be broadcast and or broadband.

According to some aspects, MMT package_id 5203 has a unique 16 bit value 3000 and is signaled to UE using L2 signaling. The MMT package_id 5203 can be composed of MMT media assets MPU (Audio/Video) and MMT signaling each given unique packet_id, as shown in example.

According to some aspects, the MMTP protocol multiplexes some or all assets and MMTP is carried on UDP/IP with IP multicast address and UDP port # signaled to UE. The 2314 NTP time is used on MMT sender as shown which could be located at 5004 service provider.

According to some aspects, the MMT sender has hypothetical receiver buffer model 5204 that it runs when allocating and multiplexing assets at sender to ensure receiver De-Jitter buffer 5205 for each asset does not overflow. Using parameters for De-Jitter buffer are signaled to UE using MMT signaling using Packet_id 0, as shown in example.

According to some aspects, based on the hypothetical receiver buffer model, an MMT sending entity is able to determine the transmission schedule, the buffer size and the buffering delay, A, so that no packets are dropped due to buffer overflow, assuming a maximum delivery delay in the target path. According to some aspects, the MMT sending entity shall guarantee that packets that experience a transmission delay below a set threshold will be delivered to the upper layer after a constant delay and without causing the MMT receiving entity buffer to underflow or overflow.

According to some aspects, with the MMTP, at delivery time 5207 to UDP/IP network, the MMTP packet has NTP timestamp in header at the release instant of delivery time. The D2M UE using (VFS/SS) L1 signaling can quickly set NTP time when accessing channel. According to some aspects, FIG. 52 illustrates arrival time 5208 of MMTP packet at the UE for either D2M channel 5201. Having the NTP time 5213, the UE observes header MMTP packet and notes NTP instant local the NTP timestamp arrived from MMT sender. This allows the UE to measure the transmission delay 5215.

According to some aspects, the MMT sender sends signaling to UE to setup De-Jitter buffer 5205 for each asset. The signaling from MMT sender includes the fixed end to end delay Δ 5209 and the buffer size=(maximum delay–minimum delay)×maximum bitrate. Given MMT signaling and UE having measured transmission delay 5215, the de-jitter buffer is setup for each asset following HRBM used at MMT sender.

According to some aspects, the amount of time MMTP packets with sequence numbers stay in the buffers 5205 before being removed at time 5210 is deterministic. Given measured arrival time 5208 and knowing the fixed end to end delay 5209 and buffer size signaled, each asset experiences a constant fixed end to end delay. The buffers are managed by MMT sender using HRBM.

According to some aspects, at time 5210, some or all MMTP packets are removed from De-Jitter buffers 5205 and de-capsulated and sent to De-Cap buffers to wait for instant first MPU of asset is sent to decoder and rendering buffer at time 5211 the MPU presentation time (NTP) is signaled for package. The 5212 presentation time for each asset can be synchronized to the NTP timeline for synchronous playback.

According to some aspects, the characteristic of using a global NTP clock and MMT HRBM for heterogeneous networks is that the playback time of UE is deterministic and independent of delivery channel. Using HRBM, assuming N UEs, with all UEs receiving same service, then video on the screens and audio playback from these UEs will be synchronized to the eye and ear of a user.

Figure 53:
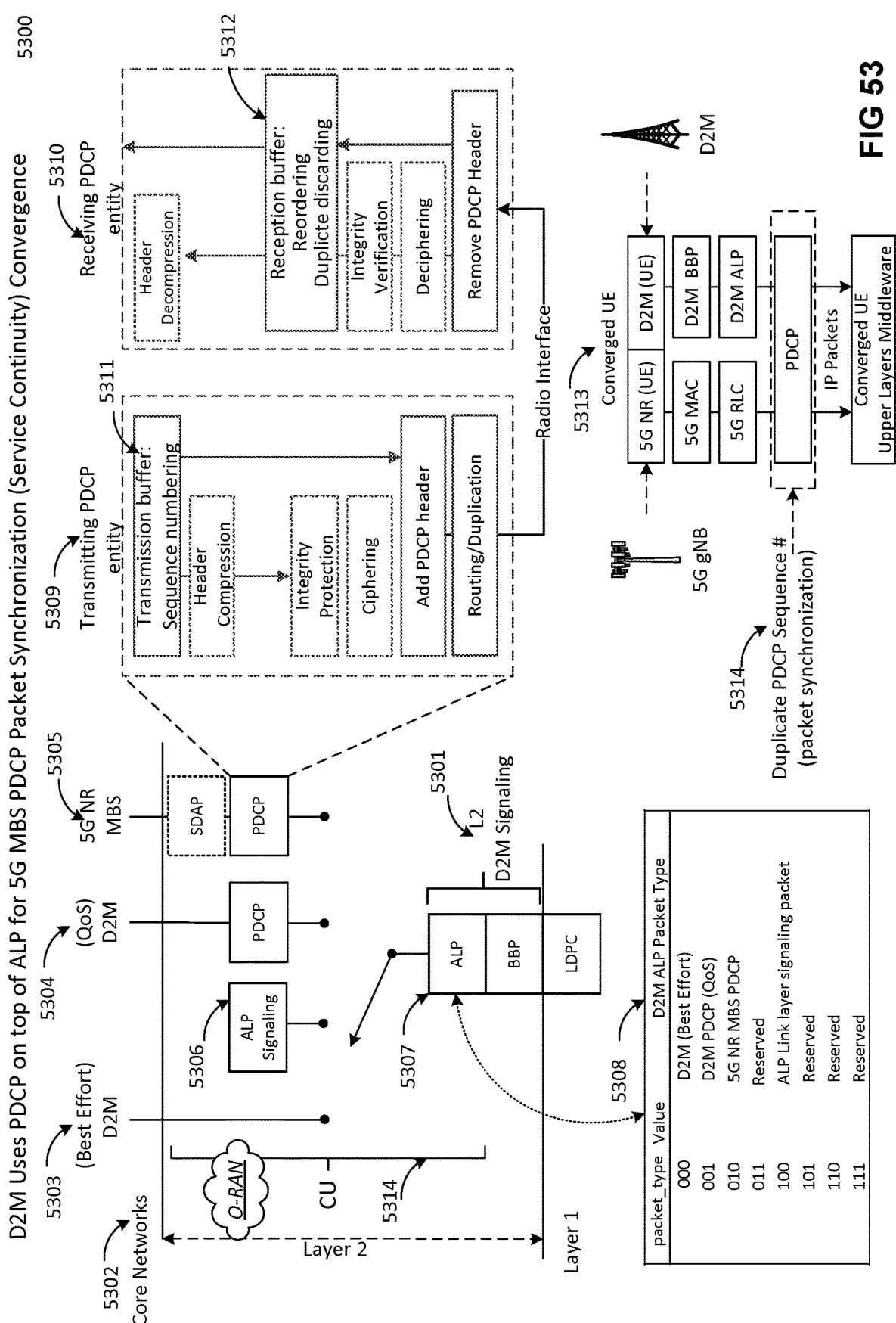
FIG. 53 illustrates disaggregated D2M extended L2 signaling for PDCP sequence number synchronization on converged UE with 5G MBS, according to some aspects of this disclosure.

FIG. 53 illustrates an example system 5300 for extension ALP L2 signaling to carry PDCP like 5G MBS for a converged UE, according to some aspects of this disclosure. According to some aspects, D2M extended L2 5301 includes an ALP protocol. Further, 5302 shows packet type inputs ALP protocol from core networks in the example. According to some aspects, FIG. 53 illustrates (best effort) D2M with no Quality of Service (QoS) 5303, D2M with QoS with PDCP 5304, 5G MBS input 5305, and extended ALP signaling 5306.

According to some aspects, the ALP 5307 dynamically switches inputs and they are encapsulated into ALP packets. FIG. 53 illustrates example D2M ALP packet type inputs 5308, and the protocol can support up to eight different input types.

According to some aspects, transmitting PDCP entity 5309 has a transmission buffer 5311 where input IP packets are buffered and a unique sequence number is inserted in header of each PDCP packet.

According to some aspects, the PDCP receiving entity 5310 has a reception buffer 5312 where any PDCP packet received out of order are re-order and any duplicate PDCP packets discarded. Lower layer re-transmission can cause duplicate PDCP packets, also in 5G dual connectivity and 5G DAPS (dual active protocol stack) for handover including cell edge PDCP the property of reception buffer 5312 is used. In addition, PDCP packet duplication using simultaneous reception with two different RATs can be used to increase reliability and reduce latency in some 5G use cases.

According to some aspects, duplicate PDCP packets and sequence numbers 5314 on converged UE 5313 will be used in part to enable seamless handover use cases between 5G MBS and D2M broadcast and vis versa, as discussed in more detail below. As will be discussed, ALP also carries L2 signaling NTP timestamp in extension header to measure D2M PDCP delivery delay to duplicate PDCP packets and sequence numbers 5314 to enable 5G MBS PDCP packets to arrive within a defined widow of time with respect to D2M PDCP packets at input to duplicate PDCP packets and sequence numbers 5314 to enable seamless handover.

In review, system 5100 for physical layer frame alignments PTP epoch and system 5200 for application layer synchronization for heterogeneous networks using MMT and NTP are disclosed. According to some aspects, system 5300 introduced packet synchronization using common PDCP packets. These methods can be used as part of end to end system architecture 5G MBS and Non-3GPP D2M convergence at the UE.

Figure 54:
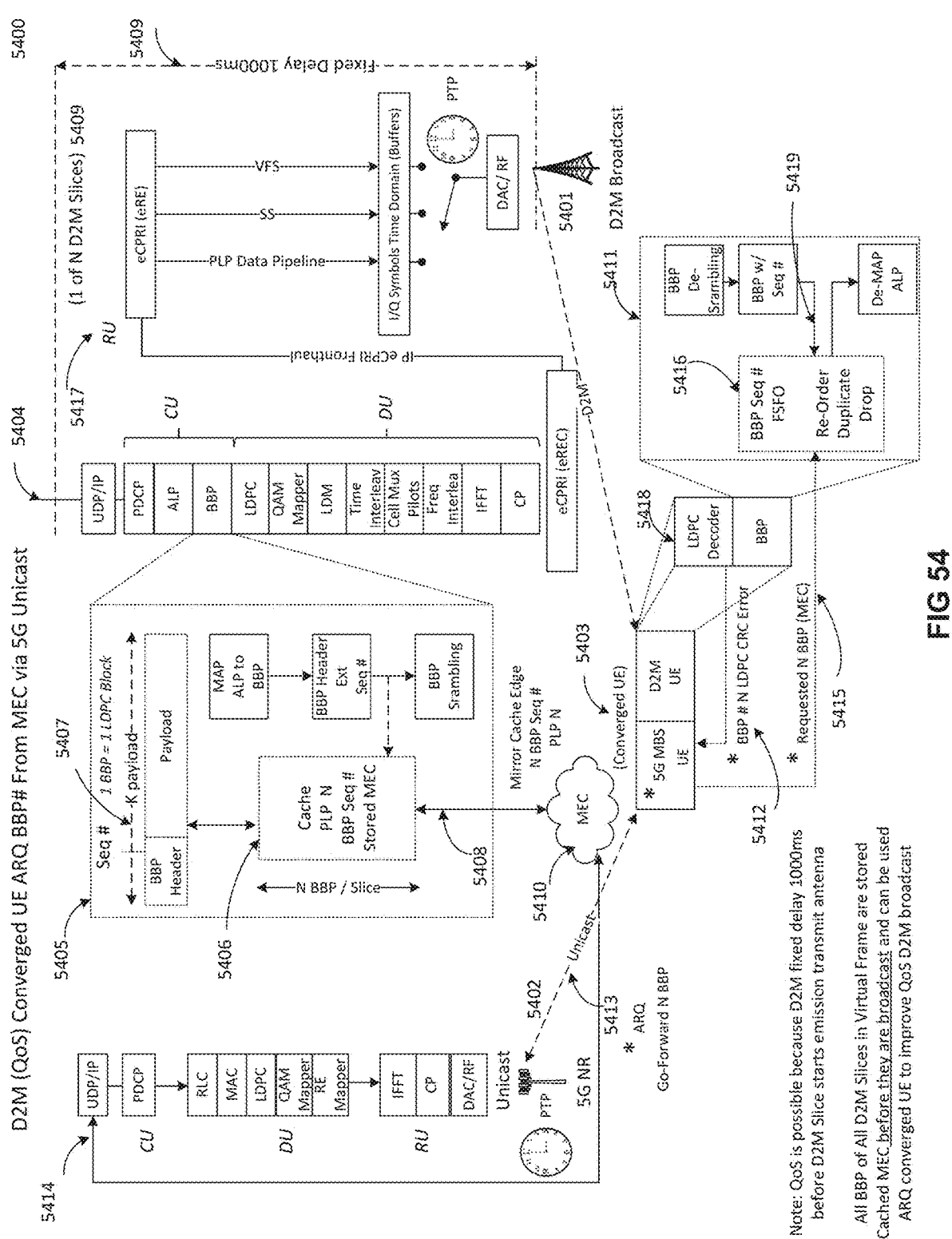
FIG. 54 illustrates D2M (Quality of Service (QoS)) Broadcast Low Density Parity Check (LDPC) frame errors detected on converged UE are mitigated with Automatic Repeat Reques (ARQ) request of missing BBP # from Mobile Edge Computing (MEC) via 5G Unicast, since one BBP equals one LDPC Frame and D2M has fixed delay 1000 ms before transmission can enable this QoS, according to some aspects of this disclosure.

FIG. 54 illustrates an example system 5400, in which D2M (QoS) broadcast LDPC block errors are detected on the converged UE, and are mitigated with ARQ request of missing BBP # from Mobile Edge Computing (MEC) via 5G Unicast, according to some aspects of this disclosure. Since one BBP equals one LDPC block and D2M has fixed delay 1000 ms before virtual frame is emitted these can enable this D2M QoS, according to some aspects of this disclosure.

According to some aspects, D2M RF emission 5401 (e.g., an antenna air interface) and is 5G MBS RF emission 5402 arrive at converged UE 5403. Furthermore, FIG. 54 illustrates D2M protocol stack 5404 with disaggregated CU/DU, RU 5417 located at transmitter site, and fixed delay 5409 (processing) 1000 ms before start of VFS and virtual frame at the antenna air interface 5401.

According to some aspects, FIG. 54 illustrates expanded view BBP block D2M 5405. Further, FIG. 54 illustrates the relationship 5407 that one BBP equals one LDPC block. Each BBP extension header has signaling including BBP # count 16 bits 3600 of each BBP emitted. According to some aspects, 5406 shows in each D2M slice some or all BBP including their BBP # are copied and sent from 5408 to mobile edge cloud (MEC) 5410, where they are stored in a mirror cache made of array BBP # for each slice in current virtual frame to be broadcasted in the future.

It may be appreciated that the delay 5409 1000 ms (e.g., processing delay) before the emission of virtual frame at antenna air interface 5401 and the additional delay on the UE including the time de-interleaver, etc. gives plenty of time to cache all BBP in cache 5410 before emission to improve D2M QoS.

Therefore, if the D2M LDPC decoder later should detect a LDPC block error, and since each LDPC block is equal one BBP and is stored in cache 5410 in advance a Automatic Repeat Reques (ARQ) for missing BBP # or blocks can be requested by converged UE 5403 using 5G Unicast, as will be discussed, to improve the D2M QoS broadcast, according to some aspects.

According to some aspects, 5418 shows D2M LDPC decoder on converged UE 5403, and 5412 shows LDPC decoder has detected a LDPC CRC error on BBP #N. Also, all BBP for slice are placed in cache 5410, in case a LDPC block error is detected by UE in future.

According to some aspects, FIG. 54 illustrates an ARQ request 5413 for the missing BBP #, or most likely a request to go-forward N BBP from BBP # with error detected is sent by converged UE 5403 using 5G unicast 5402. Since all BBP for a slice are in cache 5410 in advance of broadcast time, a request to go-forward N BBP in future and request several BBP not yet broadcast may be prudent and effective. Sometimes, LDPC block errors occur in burst across several BBP like when UE is entering a deep fade or becomes shadowed in propagation path. The UE may request just BBP # in error or a future block N BBP including BBP # in error from cache 5410 (e.g., an MEC storage).

According to some aspects, the 5G unicast 5402 gets the ARQ requested data from cache 5410 and this is shown as 5414 entering 5G unicast chain. The ARQ request of BBP # or go-forward N BBP is sent as 5402 to converged UE 5403 and delivered as 5415 to BBP block 5411 shown and to FSFO buffer 5416, which re-orders BBP and deletes duplicates received since FSFO buffer 5416 receives live BBP 5419 from LDPC decoder. If burst errors have occurred as previously mentioned during a deep fade or shadowing, and ARQ go-forward N BBP is requested this duplication BBP and re-ordering is resolved by FSFO buffer 5416 and improves QoS.

The low latency of 5G unicast from the MEC and the ARQ mechanism and protocol discussed can work synergistically on converged UE 5403 and bring QoS to D2M broadcast.

According to some aspects, as illustrated, system 5400 is related to real-time streaming media such as using MMT. Also, non-real time such as broadcast files or firmware updates over a large area is also supported. In case of files or firmware updates, this is known as datacasting and is capable of increasing QoS. The cache 5410 (e.g., an MEC storage) in case of non-real time datacasting would retain all BBP from session on datacasting for longer periods of time. The UE may request ARQ during the session or wait until say the broadcast file transfer is complete as signaled then request. Then any missing BBP # from file is requested MEC and file is completed and acknowledge successful.

According to some aspects, FSFO buffer 5416 can store all BBPs of session and then ARQ is requested to complete file transfer and acknowledge success. This may happen in non-real time and Wi-Fi could also be used to request MEC on converged UE as will be discussed with respect to FIG. 55.

The efficiency of D2M broadcast on converged UE is substantial since, the D2M LDPC codes and non-uniform constellations are optimized and approach closely the Shannon limit. Further, the D2M broadcast has time diversity (time interleaving) which is good for mobile fading, and with added ARQ LDPC block errors from shadowing can be corrected for broadcast over large geographic areas including using single frequency network topology when converged 5G MBS.

Conversely 5G MBS has some use cases for small cell and low latency that cannot be matched by D2M broadcast. So they both complement each other and bring the user a better experience and the mobile operator network and spectrum efficiency through convergence and spectrum sharing, etc.

Figure 55:
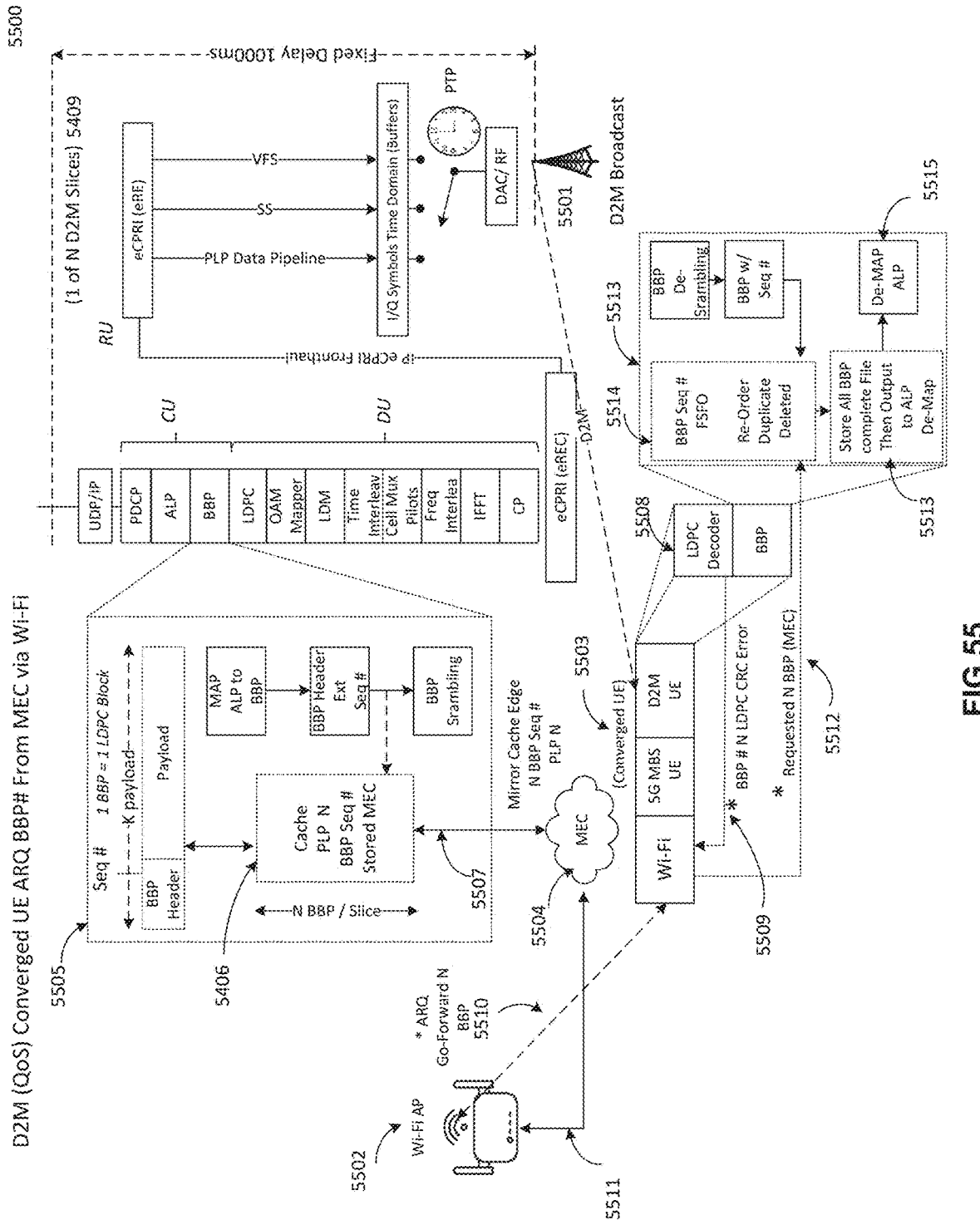
FIG. 55 illustrates D2M (QoS) Broadcast LDPC frame errors detected are mitigated on converged UE with ARQ request missing BBP # from MEC via Wi-Fi, according to some aspects of this disclosure.

FIG. 55 illustrates and example system 5500, in which D2M (QoS) Broadcast LDPC frame CRC errors that are detected are mitigated on the converged UE with ARQ request for missing BBP # from MEC via Wi-Fi, according to some aspects of this disclosure.

According to some aspects, system 5500 is related to system 5400 with the converged UE 5503 containing Wi-Fi and managed 5G MBS. The use case discussed is non real-time datacasting of files and firmware updates, etc. Also, converged UE 5503 has 5G MBS with low latency and could be used simultaneously for real-time streaming as discussed with respect to system 5400 or datacasting.

According to some aspects, the transfer of a file for datacasting can have different constraints than system 5400. The file transfer is non real-time and if just one BBP in broadcast file receives a LDPC decoding CRC error the total file no matter the size may be useless. Also, acknowledgement of successfully reception of file will be a pre-requisite to receive payment for file transmission, a converged UE 5503 provides this D2M QoS.

According to some aspects, FIG. 55 illustrates D2M RF emission 5501 and Wi-Fi access point (AP) 5502 used by converged UE 5503. MEC 5504 has mirror cache of some or all BBP of data cast sessions carried in D2M slices in virtual frame. According to some aspects, FIG. 55 illustrates expanded view 5505 of D2M BBP block, as discussed with respect to system 5400. The 5406 represents all BBP of each slice and 5507 sends these BBP immediately to MEC 5504, and they are stored in advance of being broadcast, as discussed with respect to system 5400.

According to some aspects, the data cast broadcast session starts emission 5501 with all BBP stored in advance in MEC 5504, so as to be used if the 5503 D2M 5508 LDPC decoder detects a LDPC block CRC error.

According to some aspects, 5513 shows expanded view BBP block on 5503. Further, a BBP buffer 5514 is for re-ordering BBP and deleting duplicates as discussed with respect to system 5400 of each D2M slice of data cast session. Furthermore, 5513 stores all successfully received BBP for file and acknowledge, which is to be discussed, and the completed file is assembled on converged UE 5503 and stored.

According to some aspects, when BBP LDPC CRC block error 5509 is detected in broadcast, there are two options: one option is, the converged UE 5503 immediately asks for ARQ 5510 to access point 5502 via Wi-Fi if available, and the second option is to wait until D2M L2 signaling indicates to converged UE 5503 the broadcast file transfer session is complete and then ask for any and all missing BBP #. The second option allows converged UE 5503 to receive broadcast and then when wait until it is in Wi-Fi range to complete file transfer, as now discussed.

According to some aspects, a LDPC block CRC error 5509 is detected for BBP #, or converged UE 5503 waits for D2M L2 signaling to indicate broadcast data cast session is completed. Then any missing errored BBP # is requested using ARQ 5510 and MEC 5504 via connection 5511. Then some or all missing BBP #5512 are received by 5414, and some or all BBP for complete file is stored on 5513. Then 5513 may send all BBP to D-MAP ALP 5515 and then on to the rest of converged UE 5503 reception chain and received file is stored on converged UE 5503. Then converged UE 5503 acknowledges a success the file has been received for the data cast session and this is reported via Wi-Fi access point 5502 and via connection 5511 to the MEC and stored for converged UE 5503.

According to some aspects, converged UE 5503 could be one of thousands of converged UE installed in automobiles that has to receive a firmware update. The automobiles may have been in various locations such as in parking garage underground or tunnels for part of the broadcast data cast session. The policy of network operator maybe when broadcast data casting over large geographic area that a second broadcast of data cast session is repeated in non real-time. Then all embedded converged UE 5503 in all automobiles will request all missing BBP when Wi-Fi and or 5G is available, according to some aspects.

According to some aspects, broadcast datacasting one to many thousands of UE will be more efficient than using one to one unicast knowing some converged UE 5503 may receive all the broadcast session successful others may be missing various BBP from various portions of broadcast file.

According to some aspects, a second broadcast of data cast session is an option and will de-crease the bandwidth of Wi-Fi and or 5G to complete and acknowledge reception of file. The FEC code rate and modulation used for datacasting with QoS maybe optimize for best reception over many UE instead of set for worse case condition. The second broadcast is only an option and maybe justified when file size is exceptionally large and sent to many automobiles for example. The file size could be small for many IoT devices with converged UE 5503 for another example and receive D2M QoS.

Figure 56:
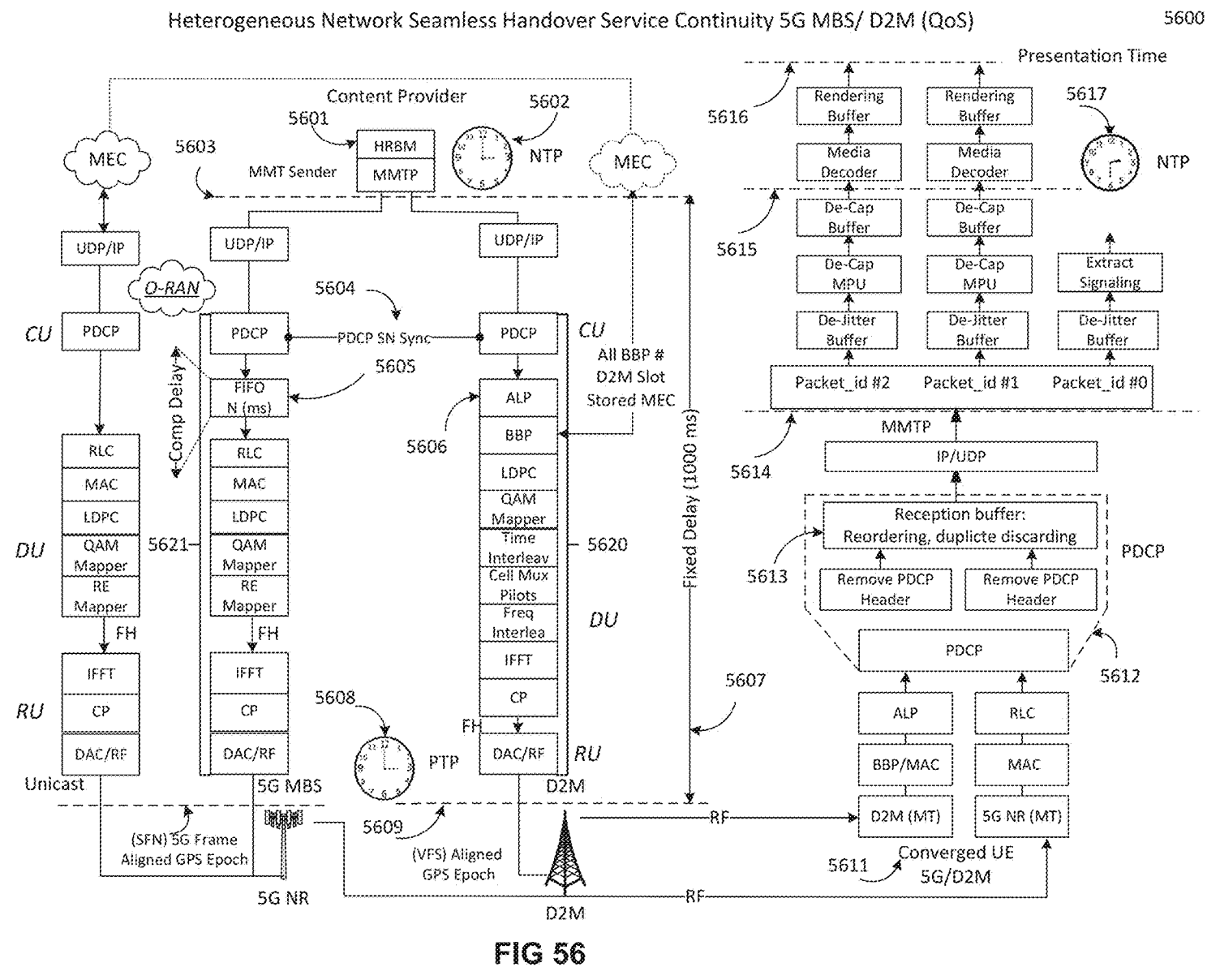

FIG. 56 illustrates an example system 5600, where D2M (QoS) broadcast seamless handover 5G MBS to D2M on the converged UE using synchronization MMT application layer, PDCP packet layer and physical layer frames, according to some aspects of this disclosure.

According to some aspects, FIG. 56 illustrates a sender entity with HRBM 5601 is located at content provider 5004 using NTP 5602. Sender entity with HRBM 5601 can be based on ISO_IEC 23008-1 MMT 5200 of FIG. 52. The MMTP may release MMTP packets over UDP/IP with NTP timestamp indicating the instant of release 5603 to radio protocol 5620 for D2M and radio protocol 5621 for 5G MBS.

According to some aspects, a common PDCP layer is used on top of ALP D2M and 5G MBS as discussed with respect to system 5500. According to some aspects, 5604 indicates that the PDCP sequence numbers are synchronized with dual protocol stack 5620, 5621 and play a role in enabling seamless handover. The converged UE 5611 has a common PDCP receiver entity 5612 for enabling seamless handover and QoS more details discussed 5700, 5800.

According to some aspects, on converged UE 5611, the 5613 PDCP reception buffer has a configurable widow size for PDCP buffer for re-ordering and discarding any duplicate PDCP received using unique sequence number synchronized 5604. The PDCP packets with identical sequence numbers on this dual protocol stack 5620, 5621 may look identical on 5611 and common PDCP reception buffer if the arrive at input 5612 to be within PDCP window size set for 5613. Furthermore, this dual active protocol stack DAPS can be used to enable seamless handover today using dual connectivity with LTE and 5G active simultaneously on 5G UE.

According to some aspects, D2M will align with these 3GPP 5G concepts for DAPS to enable seamless handover within constraints of D2M broadcast and 5G MBS. The goal for alignment will be to ensure the PDCP delay for protocol stacks 5620, 5621 and arrival time of PDCP at 5611 is within PDCP buffer widow size set by the operator. If this is achieved, 5613 will re-order PDCP and discard any duplicates and deliver a single IP/UDP/MMTP at 5614 that will allow fixed end to end delay 5615 and 5616 synchronized presentation time discussed 5200 using 5617 NTP.

According to some aspects, once both PDCP arrival times are within buffer window 5613 a seamless handover from 5G MBS to D2M or vis versa is possible for QoS on converged UE 5611. If both 5620, 5621 stay active, as Dual Active Protocol Stack (DAPS), this has higher reliability using both D2M and 5G MBS and could also be a use case. Also, after achieving the arrival of both PDCP within buffer widow PDCP 5613 either 4520, or 5621 can stop transmission and a seamless handover occurs make before break to either D2M or 5G MBS depending on the use case.

According to some aspects, 5607 shows D2M fixed delay 1000 ms before the VFS and the virtual frame with D2M slices begins at air interface of antenna 5609 which uses 5608 PTP as previously discussed. Further, 5605 shows a PDCP compensating delay adjustable first-in first-out (FIFO) (N) milliseconds which can be used to ensure PDCP arrival inside 5613 PDCP buffer window set by operator once the actual measured delay PDCP D2M to 5613 is known.

According to some aspects, ALP 5606, as will be discussed further in 5700, 5800, has a NTP timestamp in L2 signaling ALP extension header carrying PDCP. The NTP timestamp may indicate the instant ALP with PDCP encapsulated was encapsulated into BBP and this will be transmitted 5609 and allows PDCP arrival time to be measured at 5612 on converged UE 5611. The details of NTP timestamp will be disclosed in 5700, 5800.

Figure 57:
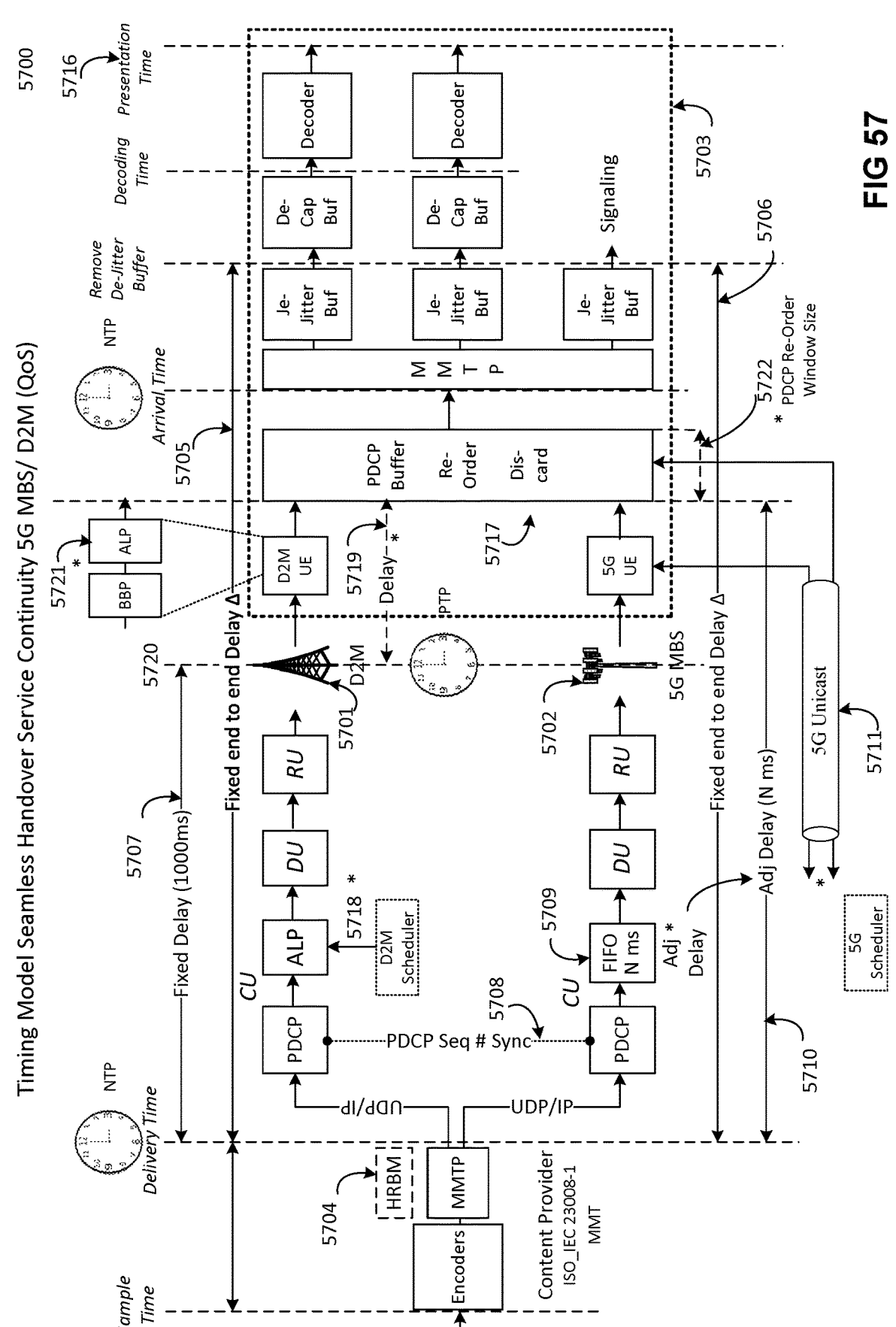
FIG. 57 illustrates timing model to achieve heterogeneous network seamless handover service continuity 5G MBS and D2M (QoS), according to some aspects of this disclosure.

FIG. 57 illustrates an example, 5700, timing model to achieve heterogeneous network seamless handover service continuity 5G MBS and D2M (QoS), according to some aspects of this disclosure.

According to some aspects, 5701 is D2M RF transmission at 5720 air interface of antenna, 5702 is 5G MBS RF transmission, 5703 is converged UE, and 5704 is MMT sender entity HRBM located at content provider. The MMTP encapsulated in UDP/IP is input PDCP of both D2M and 5G MBS. Further, 5705 is fixed end to end delay for MMT 5200, 5706 is fixed end to end delay for MMT discussed in 5200.

According to some aspects, 5708 indicates the PDCP sequence number synchronization, and 5709 is adjustable FIFO compensating delay for PDCP on 5G MBS to ensure the PDCP arrives within 5722 PDCP re-order window size set on 5717 PDCP buffer. The 5710 delay can be set 5709 once the PDCP delay 5719 D2M is measured and communicated from 5703. According to some aspects, 5707 is fixed delay (1000 ms) D2M so only 5719 delay 5719 needs to be measured and summed with 5707 to determine actual PDCP delay to 5717.

According to some aspects, 5711 5G unicast on 5703 is used to communicate back to the network status reports including D2M delay measurement to be discussed.

According to some aspects, 5718 is ALP which has L2 signaling including NTP timestamp inserted and recovered 5721 on 5703 for D2M delay measurement 5719 to be discussed in detail 5800. By knowing the window size 5722 set by operator and the measured delay 5719 the FIFO delay 5709 can be adjusted to ensure both 5G MBS and D2M PDCP with same sequence numbers are within the set PDCP buffer widow size 5722.

According to some aspects, once this is achieved PDCP buffer 5717 ensures re-ordering and duplicates are removed and a continuous stream of IP/UDP/MMTP packets is sent to MMTP for synchronized presentation 5716 as discussed in 5200.

Figure 58:
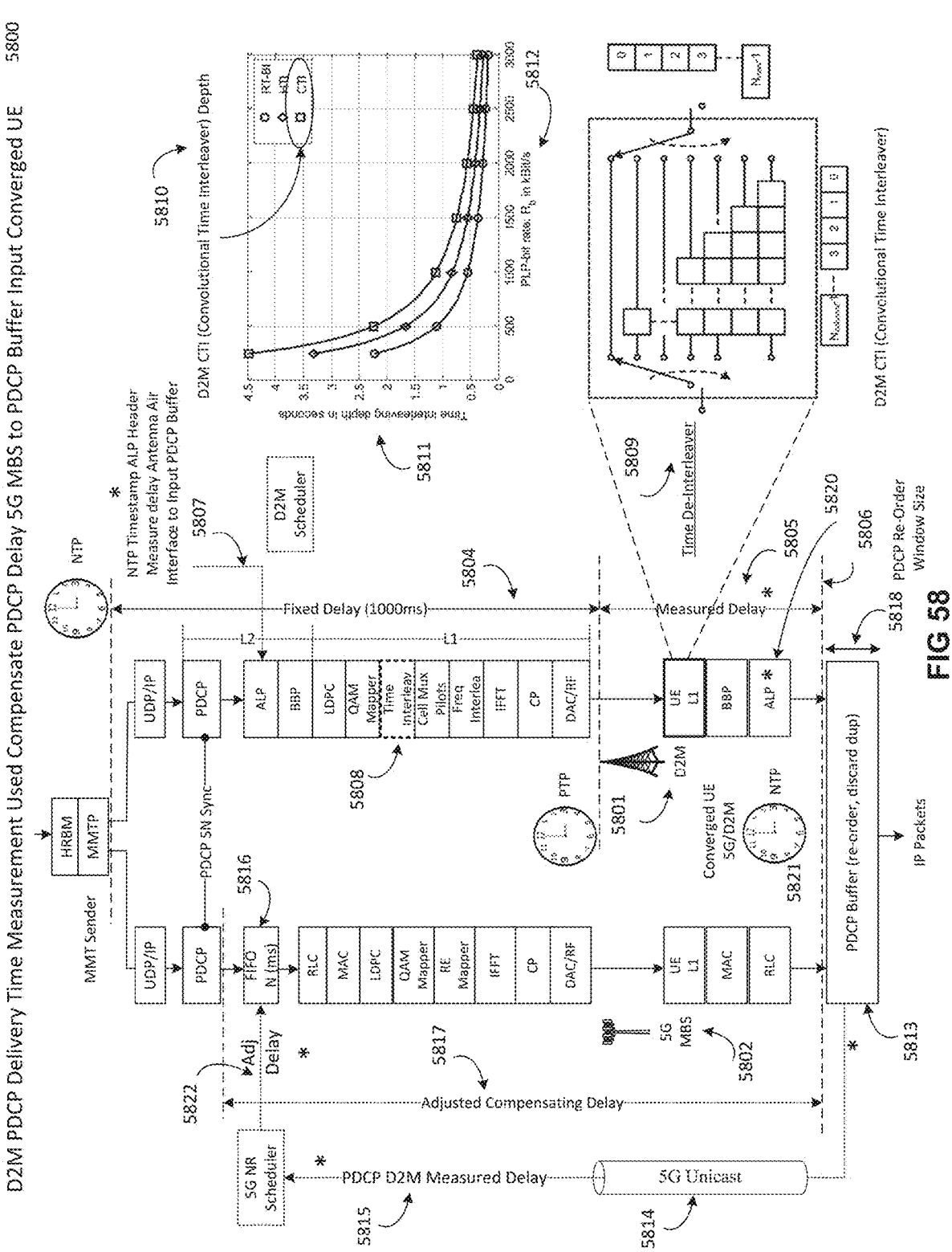
FIG. 58 illustrates D2M PDCP delivery time measurement used to adjust compensating PDCP delay 5G MBS to PDCP buffer input converged UE to enable seamless handover between 5G MBS/D2M, according to some aspects of this disclosure.

FIG. 58 illustrates an example system 5800, in which D2M PDCP delivery time measurement used to adjust compensating PDCP delay 5G MBS to PDCP buffer input converged UE to enable seamless handover between 5G MBS/D2M, according to some aspects of this disclosure.

According to some aspects, D2M RF 5801 is emitted from an antenna and 5G MBS RF 5802 is emitted from the antenna. Further, D2M fixed 1000 ms delay 5804 is a delay to air interface of antenna previously discussed, PDCP delay 5805 is a delay from air interface of antenna to 5806 input 5813 PDCP buffer that will be measured, and the timestamp 5807 using short format NTP with 16 bits for fraction of a second is inserted in ALP that encapsulates PDCP in extension header as L2 signaling. According to some aspects, the value of NTP timestamp 16 bits is set to accurate when ALP packet is emitted at air interface. The D2M scheduler may know the exact instant the D2M slot carrying ALP will be at the air interface given constant delay 5804. Each slice is offset N milliseconds from VFS, as previously discussed, and this value is used in NTP timestamp for delay measurement. According to some aspects, the first symbol in a slot will carry PDCP and the ALP L2 signaling NTP 16 bit fractions of second timestamp and scheduler has all information and when using disaggregation, as discussed, aligned O-RAN principles is feasible from cloud.

According to some aspects, the NTP timestamp ALP L2 signaling is emitted and arrives at UE and is extracted from D2M 5820 ALP extension header at NTP time observed on converged UE 5821. The difference between arrival time and value in NTP time stamp can be the delay from air interface of antenna to 5806 input to 5813 PDCP buffer. According to some aspects, the 5804 (1000 ms) plus measured delay 5805 is good estimate of total D2M PDCP delay and will be used to adjust 5816 FIFO. Using measured delay 5805 is sent via G unicast 5815 on converged UE 5821, the total delay PDCP D2M is communicated and used as in 5822 to set delay FIFO 5816.

This can bring both PDCP D2M and 5G MBS inside the PDCP re-order buffer window 5818 set and allow seamless handover and other use cases discussed using DAPS like functionality.

According to some aspects, FIG. 58 illustrates the time de-interleaver 5809 on UE, and the time interleaving for time diversity uses a convolutional interleaver specified in A/322 for each D2M slice. Furthermore, several CTI interleaver 5810 depth settings can be selected. The time interleaver delay 5811 shown in graph is a function of depth selected and PLP bitrate, etc. Therefore by measuring delay quickly, as discussed using NTP timestamp in ALP extension header, is prudent method.

What is claimed is:

1. A method, comprising:
generating a broadcast frame conforming to a first communication protocol, wherein the broadcast frame conforming to the first communication protocol comprises a slice start (SS) portion;
generating a broadcast virtual frame container comprising the broadcast frame conforming to the first communication protocol and a broadcast frame conforming to a second communication protocol, wherein the broadcast virtual frame container further comprises a virtual frame start (VFS) portion, wherein the SS portion is different from the VFS portion; and
transmitting the broadcast virtual frame container.

2. The method of claim 1, wherein the VFS portion comprises:
a first portion comprising information corresponding to user equipment (UE) synchronization, and
a second portion comprising information corresponding to UE radio resource control (RRC) signaling, wherein the second portion of the VFS portion further comprises information corresponding to identifying a start of the broadcast frame conforming to the first communication protocol and a start of the broadcast frame conforming to the second communication protocol.

3. The method of claim 1, wherein the SS portion comprises:
a first portion comprising information corresponding to a slice identifier, and

a second portion comprising information corresponding to identifying and decoding a physical layer pipe (PLP) within the broadcast frame conforming to the second communication protocol.

4. The method of claim 1, wherein the broadcast frame conforming to the second communication protocol comprises a bootstrap portion having information corresponding to identifying a start of another broadcast frame conforming to the second communication protocol in the broadcast virtual frame container.

5. The method of claim 1, further comprising:
aligning transmission of the broadcast virtual frame container with a transmission of a broadcast frame conforming to a third communication protocol.

6. The method of claim 5, wherein the broadcast frame conforming to the third communication protocol is a new radio (NR) multicast broadcast service (MBS) frame.

7. An apparatus, comprising:
a processor configured to:
generate a broadcast frame conforming to a first communication protocol, wherein the broadcast frame conforming to the first communication protocol comprises a slice start (SS) portion;
generate a broadcast virtual frame container comprising the broadcast frame conforming to the first communication protocol and a broadcast frame conforming to a second communication protocol, wherein the broadcast virtual frame container further comprises a virtual frame start (VFS) portion, wherein the SS portion is different from the VFS portion; and
transmit the broadcast virtual frame container.

8. The apparatus of claim 7, wherein the VFS portion comprises:
a first portion comprising information corresponding to user equipment (UE) synchronization, and
a second portion comprising information corresponding to UE radio resource control (RRC) signaling, wherein the second portion of the VFS portion further comprises information corresponding to identifying a start of the broadcast frame conforming to the first communication protocol and a start of the broadcast frame conforming to the second communication protocol.

9. The apparatus of claim 7, wherein the SS portion comprises:
a first portion comprising information corresponding to a slice identifier, and
a second portion comprising information corresponding to identifying and decoding a physical layer pipe (PLP) within the broadcast frame conforming to the second communication protocol.

10. The apparatus of claim 7, wherein the broadcast frame conforming to the second communication protocol comprises a bootstrap portion having information corresponding to identifying a start of another broadcast frame conforming to the second communication protocol in the broadcast virtual frame container.

11. The apparatus of claim 7, wherein the processor is further configured to:
align transmission of the broadcast virtual frame container with a transmission of a broadcast frame conforming to a third communication protocol.

12. The apparatus of claim 11, wherein the broadcast frame conforming to the third communication protocol is a new radio (NR) multicast broadcast service (MBS) frame.

13. A method, comprising:

receiving a broadcast virtual frame container comprising a broadcast frame conforming to a first communication protocol and a broadcast frame conforming to a second communication protocol;

parsing a virtual frame start (VFS) portion of the broadcast virtual frame container; and parsing a slice start (SS) portion of the broadcast frame conforming to the first communication protocol, wherein the SS portion is different from the VFS portion.

14. The method of claim 13, wherein the parsing the VFS portion further comprises:

parsing a first portion of the VFS portion to identify information corresponding to user equipment (UE) synchronization, and parsing a second portion of the VFS portion to identify information corresponding to UE radio resource control (RRC) signaling, wherein the second portion of the VFS portion further comprises information corresponding to identifying a start of the broadcast frame conforming to the first communication protocol and a start of the broadcast frame conforming to the second communication protocol.

15. The method of claim 13, wherein the parsing the SS portion comprises:

parsing a first portion to identify information corresponding to a slice identifier, and parsing a second portion to identify information corresponding to identifying and decoding a physical layer pipe (PLP) within the broadcast frame conforming to the second communication protocol.

16. The method of claim 13, further comprising:

receiving a broadcast frame conforming to a third communication protocol, wherein the broadcast frame conforming to the third communication protocol is time-aligned with the broadcast virtual frame container.

17. The method of claim 16, wherein the broadcast frame conforming to the third communication protocol is a new radio (NR) multicast broadcast service (MBS) frame.

* * * * *